US008428331B2

(12) United States Patent
DiMarzio et al.

(10) Patent No.: US 8,428,331 B2
(45) Date of Patent: Apr. 23, 2013

(54) PHASE SUBTRACTION CELL COUNTING METHOD

(75) Inventors: Charles A. DiMarzio, Cambridge, MA (US); William C. Warger, II, Boston, MA (US)

(73) Assignee: Northeastern University, Boston, MA (US)

( * ) Notice: Subject to any disclaimer, the term of this patent is extended or adjusted under 35 U.S.C. 154(b) by 1203 days.

(21) Appl. No.: 11/890,801

(22) Filed: Aug. 7, 2007

(65) Prior Publication Data
US 2008/0032325 A1 Feb. 7, 2008

Related U.S. Application Data

(60) Provisional application No. 60/835,951, filed on Aug. 7, 2006.

(51) Int. Cl.
*G06K 9/00* (2006.01)
(52) U.S. Cl.
USPC ............................. 382/133; 382/134; 702/21
(58) Field of Classification Search ........................ None
See application file for complete search history.

(56) References Cited

U.S. PATENT DOCUMENTS

| | | | |
|---|---|---|---|
| 5,883,717 A | 3/1999 | DiMarzio et al. | |
| 6,020,963 A | 2/2000 | DiMarzio | |
| 6,537,829 B1 * | 3/2003 | Zarling et al. | 436/514 |
| 2002/0085293 A1 * | 7/2002 | Stuckey | 359/831 |
| 2005/0198602 A1 * | 9/2005 | Brankner | 716/8 |

OTHER PUBLICATIONS

Warger, "The Fusion of Optical Quadrature and Differential Interference Contrast Microscopy to Produce Accurate Cell Counts in Live Mouse Embryos", Master's Thesis, Northeastern University (2005), pp. 1-222.
Hnida et al., "Computer-controlled, multilevel, morphometric analysis of blastomere size as biomarker of fragmentation and multinuclearity in human embryos", European Society of Human Reproduction and Embryology, vol. 19 (2) (2004), pp. 288-293.
Hogenboom et al., "Three-dimensional images generated by quadrature interferometry", Optics Letters, vol. 23 (10) (1998), pp. 783-785.
Maleki et al., "Phase-retrieval and intensity-only reconstruction algorithms for optical diffraction tomography", Journal of the Optical Society of America, vol. A10 (5) (1993), pp. 1086-1092.
Warger et al., "Combining Optical Quadrature and Differential Interference Contrast to facilitate embryonic cell counting with Fluorescence Imaging for confirmation", Imaging, Manipulation, and Analysis of Biomolecules and Cells: Fundamentals and Applications III, SPIE Proceedings, vol. 5699 (2005), pp. 334-341.
Chang, "A Contour Signature Method for Counting Cells in Embryos using Quadrature Tomographic Microscopy Images", Master's Thesis, Northeastern University (2005), pp. 1-40.
Tsai, "Accurate Image Registration for Quadrature Tomographic Microscopy", MICCAI Proceedings (2005), pp. 935-942.
Newmark et al., "Determination of the Number of Cells in Preimplantation Embryos by Using Noninvasive Optical Quadrature Microscopy in Conjunction with Differential Interference Contrast Microscopy", Microscopy and Microanalysis, vol. 13 (2007), pp. 118-127.
Townsend et al., "Quantitative Phase Measurements Using a Quadrature Tomographic Microscope", Three-Dimensional and Multidimensional Microscopy: Image Acquisition and Processing X, SPIE Proceedings, vol. 4964 (2003), pp. 59-65.
Warger et al., "Accurate cell counts in live mouse embryos using optical quadrature and differential interference contrast microscopy", Proceedings of SPIE, vol. 6090 (2006), pp. 30-41.

* cited by examiner

*Primary Examiner* — Allison Ford
*Assistant Examiner* — Susan E Fernandez
(74) *Attorney, Agent, or Firm* — McLane, Graf, Raulerson & Middleton, P.A.

(57) ABSTRACT

A method and device are provided for counting cells in a sample of living tissue, such as an embryo. The method involves obtaining a microscopic image of the unstained tissue that reveals cell boundaries, such as a differential interference contrast (DIC) image, and an optical quadrature microscopy (OQM) image which is used to prepare an image of optical path length deviation (OPD) across the cell cluster. The boundaries of individual cells in the cell cluster are modeled as ellipses and used, together with the maximum optical path length deviation of a cell, to calculate ellipsoidal model cells that are subtracted from the OPD image. The process is repeated until the OPD image is depleted of phase signal attributable to cells of the cell cluster, and the cell count is obtained from the number of cells subtracted. The method is capable of accurately and non-invasively counting the number of cells in a living embryo at the 2-30 cell stage, and can be employed to assess the developmental stage and health of human embryos for fertility treatments.

34 Claims, 21 Drawing Sheets

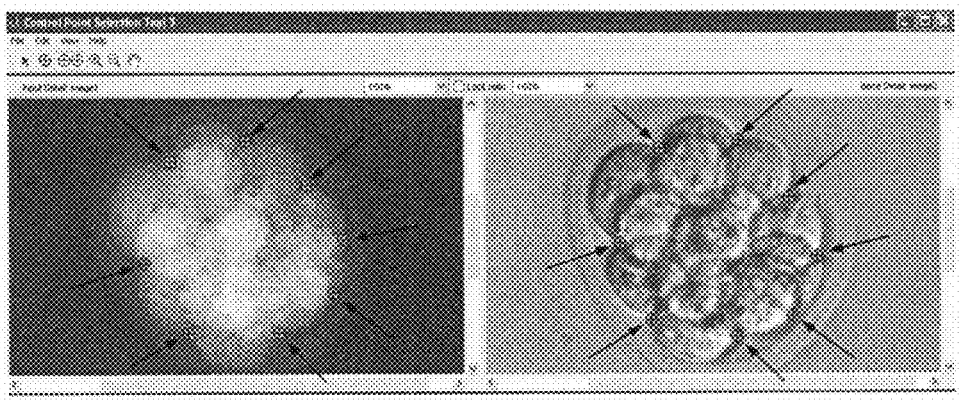
*FIG. 3A*  *FIG. 3B*

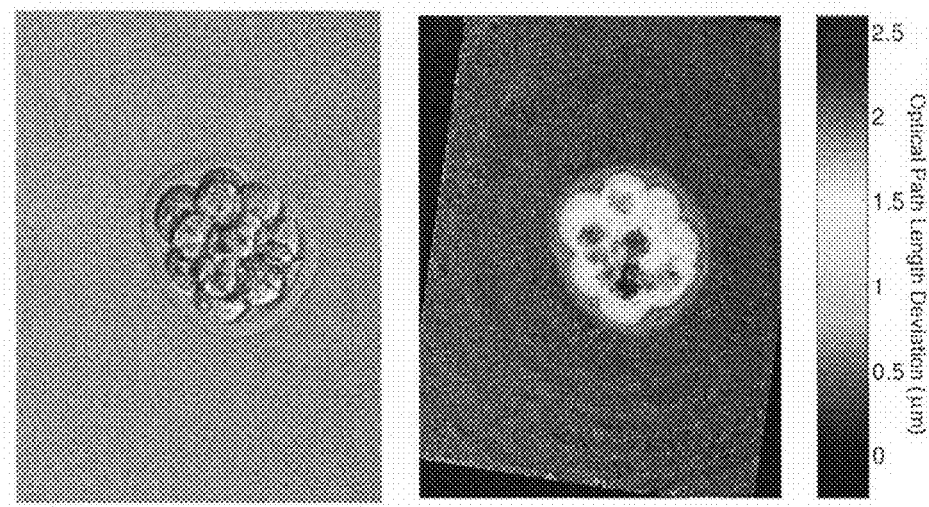
*FIG. 4A*  *FIG. 4B*
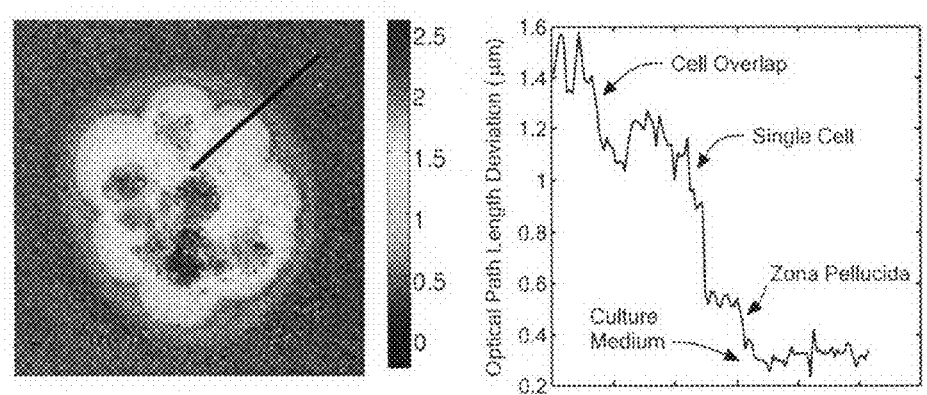
*FIG. 5A*  *FIG. 5B*

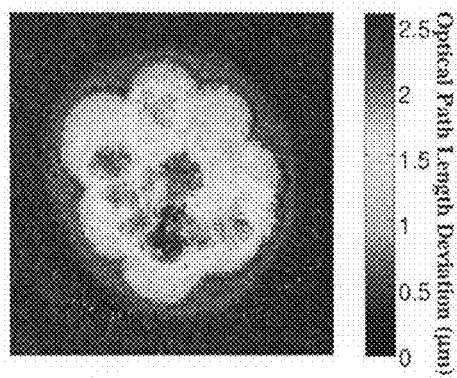
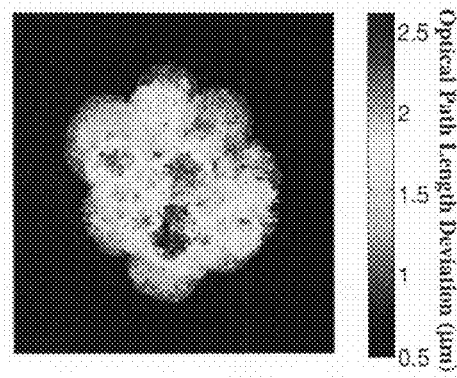
*FIG. 6A*    *FIG. 6B*
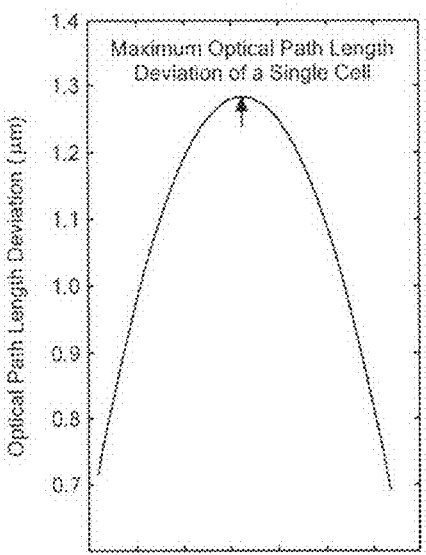
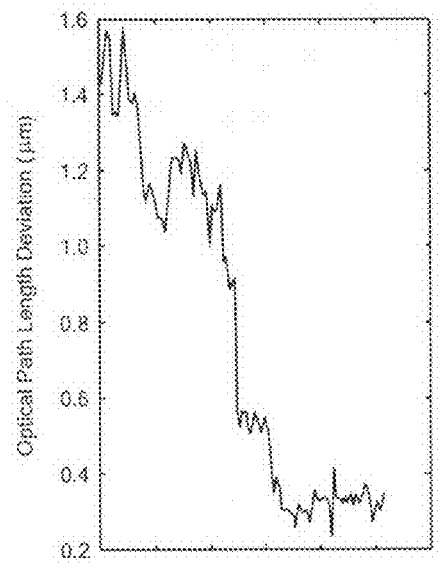
*FIG. 7A*    *FIG. 7B*

PHASE SUBTRACTION CELL COUNTING METHOD

CROSS REFERENCE TO RELATED APPLICATIONS

This application claims the benefit under 35 U.S.C. §119(e) of U.S. Provisional Application No. 60/835,951, filed Aug. 7, 2006, the disclosure of which is incorporated by reference herein.

STATEMENT REGARDING FEDERALLY SPONSORED RESEARCH OR DEVELOPMENT

Part of the work leading to the present invention was carried out with support from the United States Government provided under a grant from the National Science Foundation, Award Number EEC-9986821. Accordingly, the United States Government has certain rights in the invention.

BACKGROUND

Present imaging techniques for living cells and tissues are unable to produce accurate cell counts in cell clusters such as tissue samples and developing embryos past about eight cells in an aggregate, or past the eight cell stage of a living embryo non-invasively. Accurate cell counts of living embryos is important in the process of in vitro fertilization (IVF). In order to increase the success rate of IVF, doctors transfer multiple embryos back into the mother, with the transfer of three embryos having long been the standard. However, studies have shown that the transfer of two embryos does not decrease the overall ongoing pregnancy rate so there is a slow change toward reducing the standard. Even with the transfer of two embryos many IVF clinics report an overall pregnancy rate of only 30-40% (CDC, 2004; Gerris et al., 2002), with 20-40% of these successful births resulting in multiple pregnancies (Gerris et al., 2002; De Neubourg et al., 2002; ESHRE, 2001; Martin & Park, 1999). Multiple pregnancies increase the risks of cerebral palsy, preterm delivery, low birth weight, congenital malformations, and infant death (Gardner et al., 1995; Guyer et al., 1997; Kiely et al., 1998; Kinzler et al., 2000; Pharoah et al., 1996; Senat et al., 1998; Spellacy et al., 1990; Stromberg et al., 2002). Therefore, there is a worldwide effort to identify one healthy embryo for transfer back to the mother (Gurgan & Demirol, 2004).

One reason for the low success rate of IVF is the uncertainty of knowing whether an embryo is healthy enough to produce a successful pregnancy. To assess the quality of the embryo during the preimplantation period, the number of cells and the overall morphology of the embryo are recorded over the observation period (De Neubourg et al., 2002). Developments in embryo culture systems have allowed for viable embryos to develop in vitro into the blastocyst stage, consisting of more than 30 cells in a mouse embryo, on day 5 or 6 (Gardner & Lane, 1997). With the extended observation time, better decisions can be made on the quality of the embryo, and slightly better percentages of pregnancies have been recorded.

The rate of cell development during the one to eight cell stage is an important criterion for choosing a high quality embryo. However, available imaging technology makes obtaining this information non-invasively impossible past the eight cell stage. Fertility centers presently use differential interference contrast (DIC) microscopy to image embryos non-invasively. This method shows distinct cell boundaries within the focal plane when multiple cells do not lie in the path to the microscope objective. Some cell edges can be detected when only a couple cells overlap because embryos are optically transparent, allowing two layers of four cells to be imaged. However, cell boundaries cannot be detected for multiple layers of cells, making it impossible to produce accurate cell counts past the eight cell stage with DIC. As a result of insufficient imaging capabilities, the criteria for a high quality embryo at the blastocyst stage are primarily based on the morphology of the sample and the rate of development. Therefore, there is a need for an instrument that can non-invasively count the number of cells during embryo development up to the blastocyst stage in order to help physicians make better determinations regarding embryo quality. The availability of such an instrument would increase the success of single embryo transfer and reduce the motivation for multiple embryo transfers.

SUMMARY OF THE INVENTION

The invention provides a method and a device for counting unstained cells in a cell cluster, such as a tissue sample, an embryo, or an assemblage or colony of developing stem cells or progenitor cells. The method can be applied to groups of untreated living cells which have a positional relationship to one another that is stable over a period of at least several minutes, providing sufficient time for images to be prepared using at least two different imaging modalities. The method is suitable for accurately counting the number of cells in a living embryo, such as a mammalian embryo at the blastomere or morula stage. Since the method is non-invasive, it is well suited for assessing the relative health and stage of development of human or non-human animal embryos prepared by in vitro fertilization prior to implantation in the uterus. The method can also be employed to monitor the growth and development of a culture of cells, such as a colony of stem cells, over time, and is especially well suited to the evaluation of the growth and development of clusters of cells suspended in a culture medium. Preferably, the cells of a cluster for cell counting with a method according to the invention are similar in size and shape to one another. The method can accommodate some non-uniformity of cell size and shape, and can count clusters containing more than one cell type.

In one aspect, the invention provides a cell counting method that includes the steps of: (a) providing a microscope capable of first and second imaging modalities, wherein the first imaging modality is a full-field phase imaging technique and the second imaging modality provides cell boundary information for the unstained tissue sample; (b) obtaining a first image of the tissue sample using the first imaging modality and a second image of the tissue sample using the second imaging modality, wherein the first image is an image of optical path length deviation (OPD); (c) fitting an ellipse to the boundary of a cell in the second image; (d) determining the maximum optical path length deviation of the cell in the first image; (e) combining the ellipse with the maximum optical path length deviation to produce an ellipsoidal model cell of optical path length deviation; (f) subtracting the model cell from the OPD image to obtain a subtracted OPD image; and (g) repeating steps (c), (e), and (f), wherein for each repetition of step (f) the model cell is subtracted from the previous subtracted OPD image, until model cells corresponding to all cell boundaries detectable in the DIC image have been subtracted from the OPD image. The cell count for the tissue sample is taken as the total number of model cells subtracted.

In different embodiments, the first imaging modality is optical quadrature microscopy (OQM), polarization interferometry, digital holography, Fourier phase microscopy, Hilbert phase microscopy, quantitative phase microscopy, or diffraction phase microscopy. Embodiments of the second imaging modality include differential interference contrast microscopy (DIC), Hoffman interference contrast microscopy, and brightfield microscopy.

Another aspect of the invention is a method of counting cells in an embryo. In different embodiments, the embryo can have a cell number in the range of 2-30 cells or in the range of 8-26 cells. In one embodiment, the embryo is human. In other embodiments, the embryo is a mammalian species such as horse, cow, pig, goat, sheep, primate, dog, cat, rat, or mouse. In still other embodiments, the embryo is a non-mammalian animal species. In a different embodiment the tissue sample is a stem cell colony.

An embodiment of the cell counting method of the invention further includes the step of (b1) performing image registration of the DIC and OPD images from step (b) by selecting a plurality of landmarks in one image, selecting a plurality of matching landmarks in the other image, and applying an image registration algorithm to create a single coordinate system for both images.

Another aspect of the invention is a method of determining the maximum optical path length deviation of a cell. The method includes the steps of: (d1) plotting the phase values along a line from outside the cell boundary through the center of the cell; (d2) fitting a parabola to the plotted values from (d1); (d3) selecting a minimum phase value from outside the tissue sample; and (d4) subtracting the minimum phase value from the maximum of the parabolic fit to obtain the maximum optical path length deviation of the cell.

Yet another aspect of the invention is a method of further counting cells in a tissue sample when all cells with detectable boundaries in a DIC image have been subtracted from the OPD image according to steps (a) through (g) described above, yet the subtracted OPD image still reveals residual phase signal representing further cells. The method includes the steps of: (h) fitting an ellipse to the boundary of a cell in the subtracted QPD image; (i) producing an ellipsoidal model cell of the cell; (j) subtracting the ellipsoidal model cell from the subtracted QPD image to obtain a new subtracted OPD image; and (k) repeating steps (h)-(j) until no further cell boundaries can be detected in the subtracted OPD image. The cell count for the tissue sample is the total number of model cells subtracted in step (f) plus the total number of model cells subtracted in step (j).

Still another aspect of the invention is a method of cell counting in which one or more steps of the method are partially or fully automated. Automation is provided by one or more image analysis algorithms, such as edge detection, blob detection, and/or feature extraction. In some embodiments, cell boundary detection is automated by using an edge detection algorithm applied to both DIC and OPD images and using a feature extraction algorithm to identify the plurality of landmarks in one image and matching landmarks in the other image. In certain embodiments, the processes of selecting a cell, detecting the cell's boundary, and/or fitting an ellipse to the cell boundary are automated by edge detection and other image analysis algorithms. In one embodiment, the total cell count is reached when blob detection fails to detect at least a preset threshold value of residual phase in the subtracted OPD image.

In another aspect, an approximate cell count of a tissue sample is determined. One embodiment includes the steps of: (a) providing a microscope capable of first and second imaging modalities, wherein the first imaging modality is a full-field phase imaging technique and the second imaging modality provides cell boundary information for the unstained tissue sample; (b) obtaining a first image of the tissue sample using the first imaging modality and a second image of the tissue sample using the second imaging modality, wherein the first image is an image of optical path length deviation (OPD); (c) fitting an ellipse to the boundary of a cell in the second image; (d) determining the maximum optical path length deviation of the cell in the first image; (e) combining the ellipse with the maximum optical path length deviation to produce an ellipsoidal model cell of optical path length deviation; (f) determining the perimeter of the entire tissue sample in the DIC image; (g) determining the total OPD of the entire tissue sample within the perimeter; (h) determining the total OPD of the ellipsoidal model cell; and (i) dividing the total OPD of the entire tissue sample by the total OPD of the ellipsoidal model cell to provide the approximate cell count.

In a further aspect, the cell counting method can be varied to improve its accuracy. In one embodiment all cells are assumed to have the same maximum OPD, while in another embodiment the maximum OPD is measured for each individual cell. In one embodiment, all cells are assumed to have a cell volume within a certain range, e.g., within a factor of 2 of the average blastomere volume. In another embodiment, cells outside the specified range are detected and subtracted, i.e., counted. In yet another embodiment, such cells having aberrant volume are analyzed and counted as either polar bodies or cell fragments.

Yet another aspect of the invention is a microscope capable of at least first and second imaging modalities. The first imaging modality is optical quadrature microscopy and the second imaging modality is selected from differential interference contrast (DIC) microscopy, epi-fluorescence microscopy, and brightfield microscopy. In one embodiment, the microscope includes first and second dichroic beamsplitters. The first dichroic beamsplitter introduces sample incident light from the optical quadrature signal path and from the illumination source for the second imaging modality. The second dichroic beamsplitter splits light transmitted or emitted by the sample into a first signal path and a second signal path. The first signal path leads to an imaging device for the second imaging modality, and the second signal path leads to a recombining beamsplitter which recombines light from the signal and reference paths for optical quadrature microscopy. In another embodiment, the microscope can perform optical quadrature microscopy, DIC microscopy, and epi-fluorescence microscopy.

BRIEF DESCRIPTION OF THE DRAWINGS

FIG. 3 shows the selection of points along the perimeter of a mouse embryo used to register the DIC image to the optical quadrature image. FIG. 3A (left) shows the optical quadrature image. FIG. 3B (right) shows the DIC image.

FIG. 4A shows a DIC image of a mouse embryo, and FIG. 4B shows the corresponding OPD image (4B). The images are viewed side-by-side to determine the locations of visible cells that are not overlapped and are approximately the same size as other visible cells.

FIG. 4B is presented in grayscale, but the original image was a color image, with the color determined by the optical path length deviation according to the color gradient scale shown on the right side of the figure. In the original color image, the bottom of the scale is dark blue, corresponding to the outermost regions of the image, showing only cell culture medium. The top of the scale is red, corresponding to the regions of the image having the greatest optical path length deviation, i.e., the nucleus near the center of a single cell or a region of the embryo where cells overlap.

FIG. 5A shows an OPD image with selected normal line.

FIG. 5B is a plot of optical path length deviation for points along the normal line in FIG. 5A. Labels show the physical representation of the plot.

FIG. 6A shows an OPD image of a mouse embryo with original color scale.

FIG. 6B shows the same OPD image with minimum color scale value set to the minimum optical path length deviation of a single cell.

FIG. 7A shows a parabola fitted from selected points of the OPD data for a single cell, as shown in 7B.

$$\frac{x^2}{a^2} + \frac{y^2}{b^2} + \frac{z}{c} = 1$$

and color scale set from 0 to the maximum optical path length deviation of a single cell.

Figure 11:
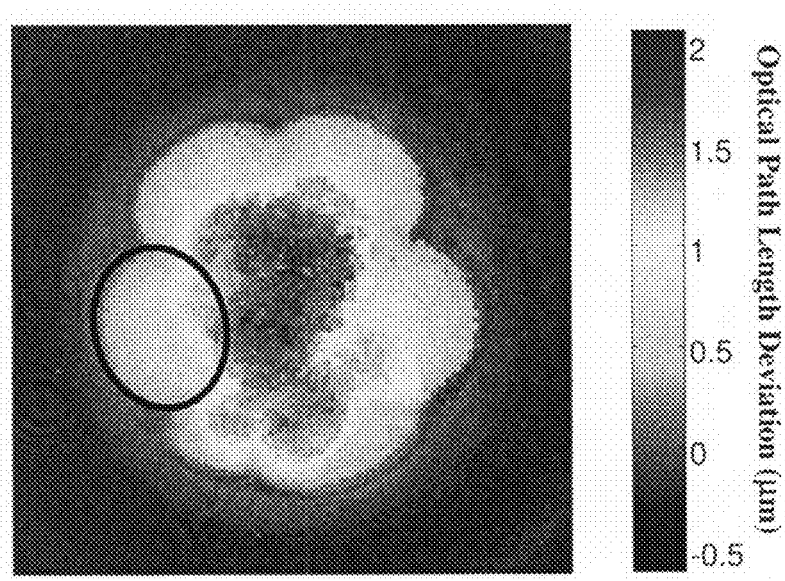
FIG. 11 shows an original OPD image of a mouse embryo with an elliptical boundary around a cell and the color scale set from the minimum to the maximum optical path length deviation of the image.
Figure 12A:
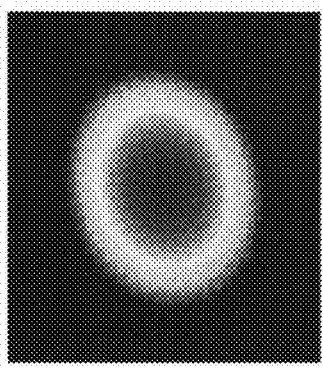
FIG. 12A shows the image of an ellipsoid with the equation.
Figure 12B:
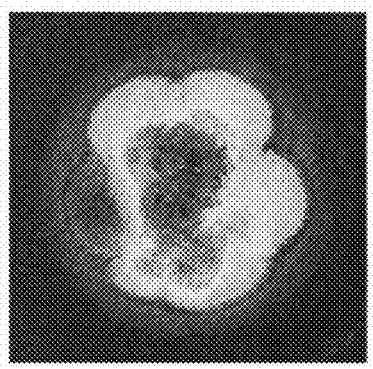

FIG. 12B shows the result of subtraction of the ellipsoid of FIG. 12A from the original OPD image shown in FIG. 11.

Figure 13A:
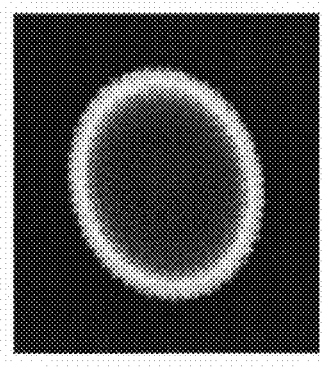

FIG. 13A shows an image of an ellipsoid with the equation:

$$\left(\frac{x^2}{a^2} + \frac{y^2}{b^2}\right)^{\frac{5}{2}} + \frac{z}{c} = 1$$

and color scale set from 0 to the maximum optical path length deviation of a single cell.

Figure 13B:
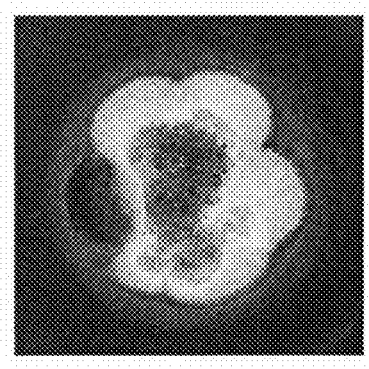

FIG. 13B shows the result of subtraction of the ellipsoid of FIG. 13A from the original OPD image shown in FIG. 11.

Figure 14:
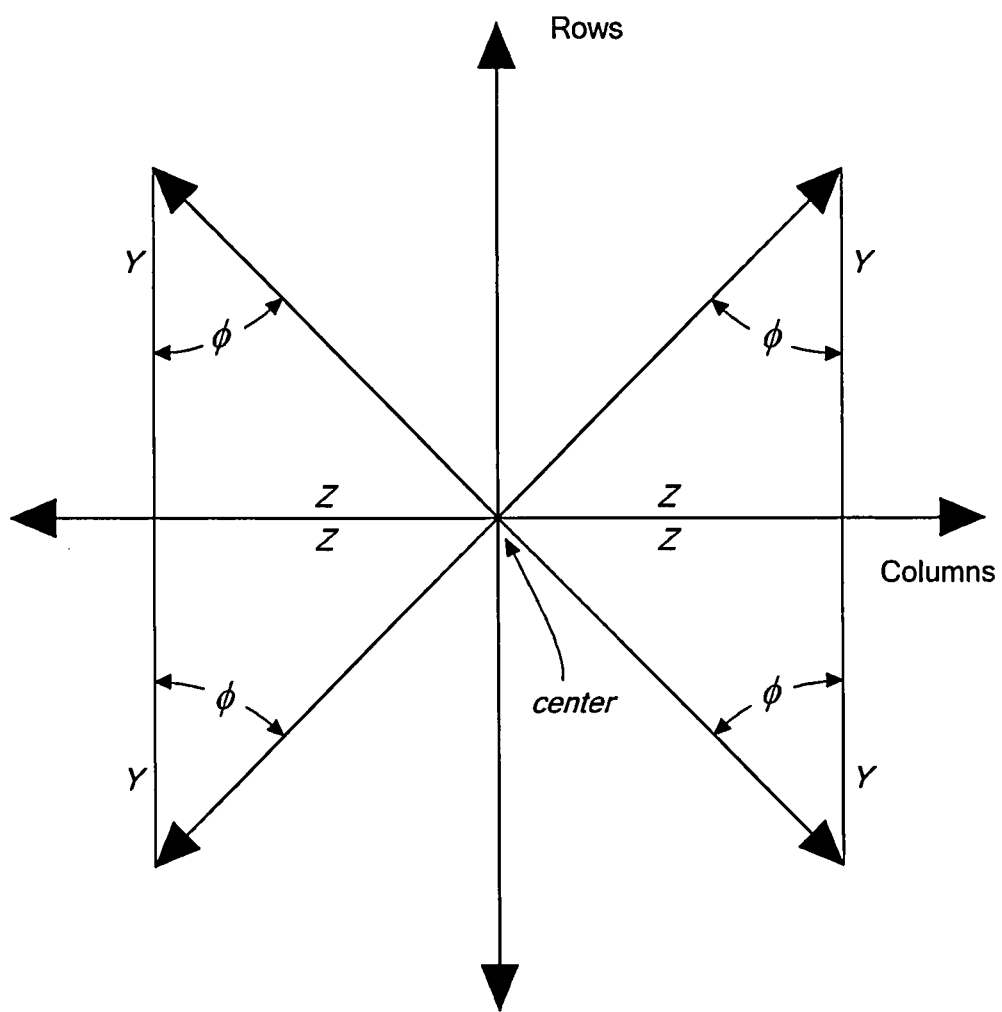

FIG. 14 shows a graphical representation for determination of the rotation angle ($\phi$) for each point within the ellipsoid.

Figure 15A:
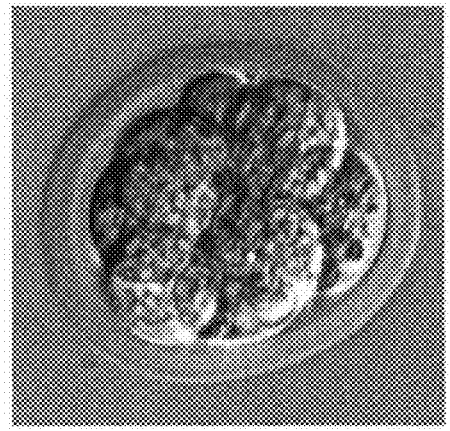

FIG. 15A shows a DIC image of an 8-cell mouse embryo.

Figure 15B:
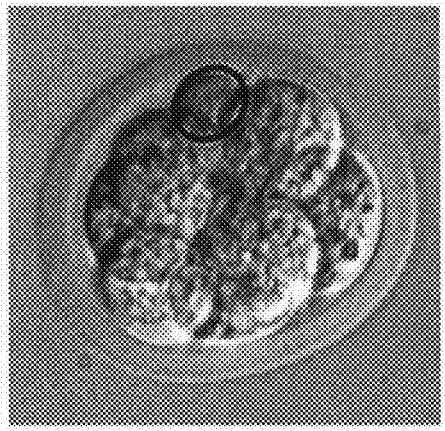

FIG. 15B shows the same image in which the boundary of a polar body has been marked.

Figure 16A:
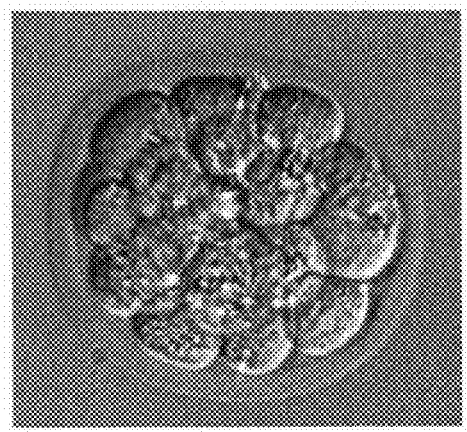

FIG. 16A shows a DIC image of a 21-cell mouse embryo.

Figure 16B:
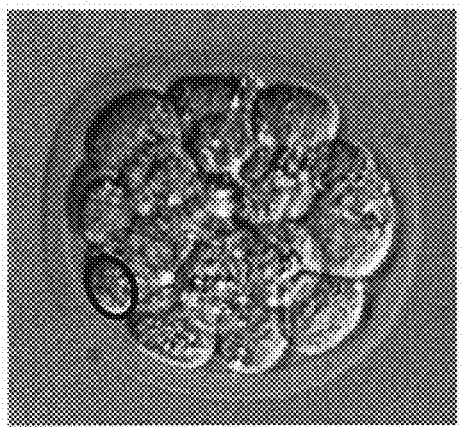

FIG. 16B shows the same image, with the boundary of a polar body marked.

Figure 17:
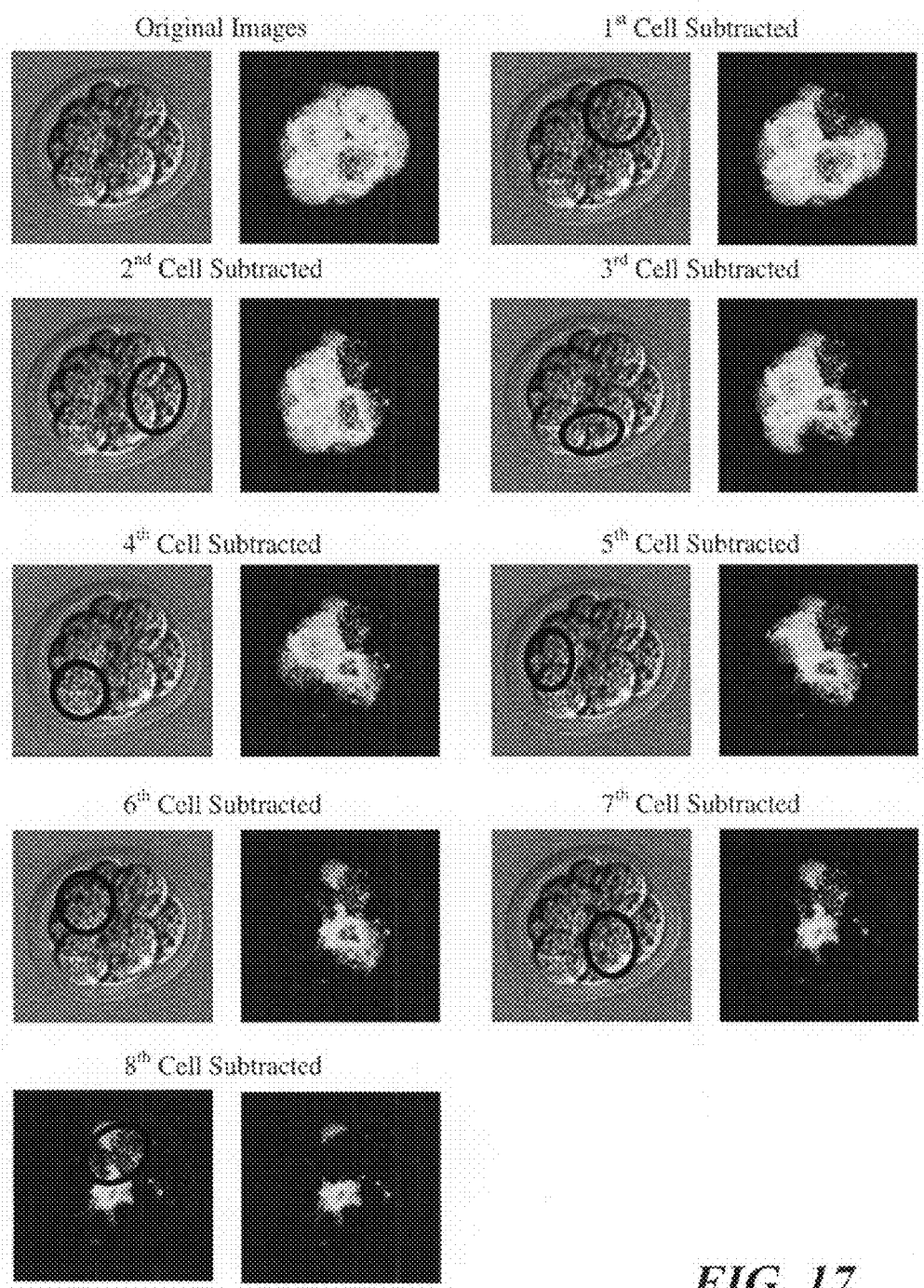

FIG. 17 shows a cell counting result for an 8-cell mouse embryo. For each cell subtraction, the image on the left shows the selected cell boundary, and the image on the right shows the subtraction of the model cell from the OPD image.

Figure 18A:
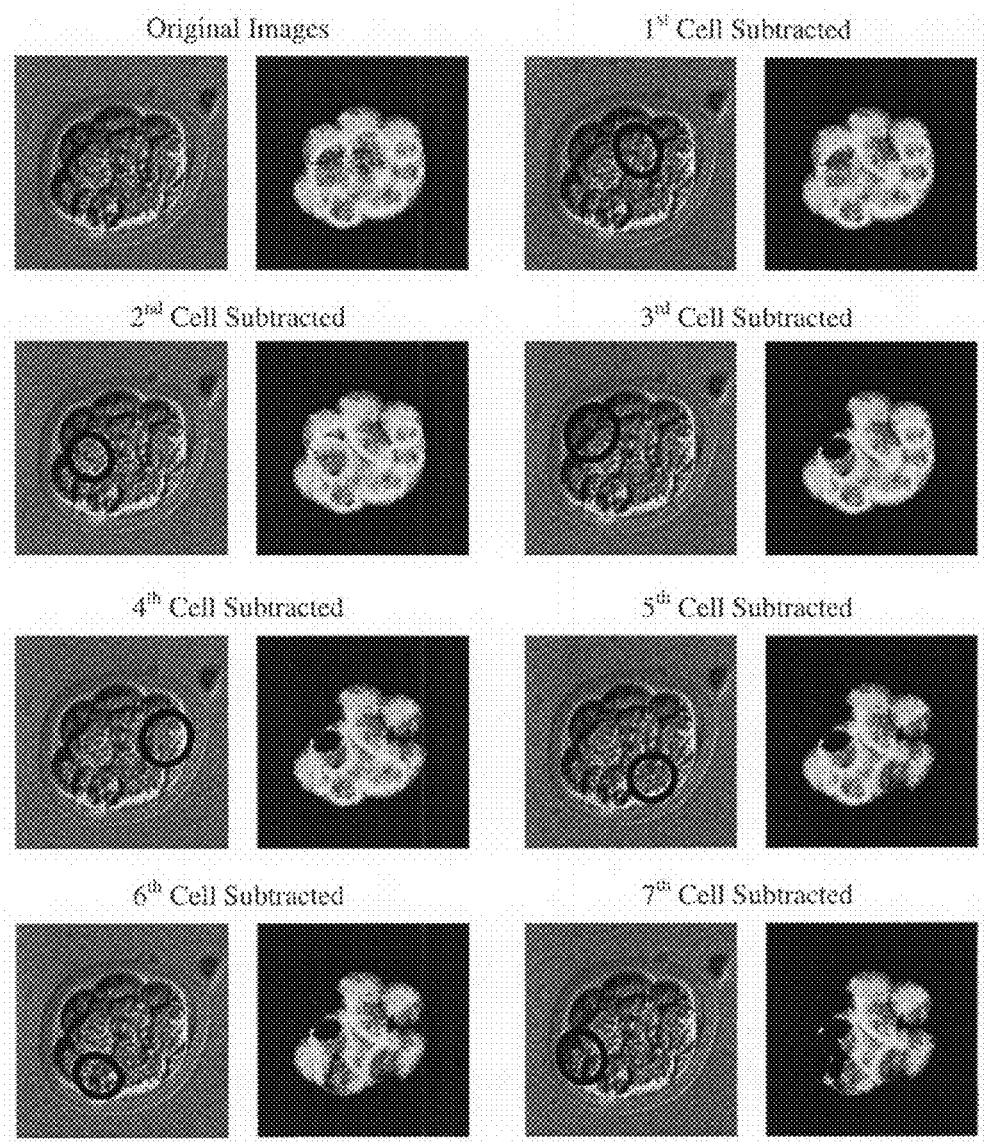
Figure 18B:
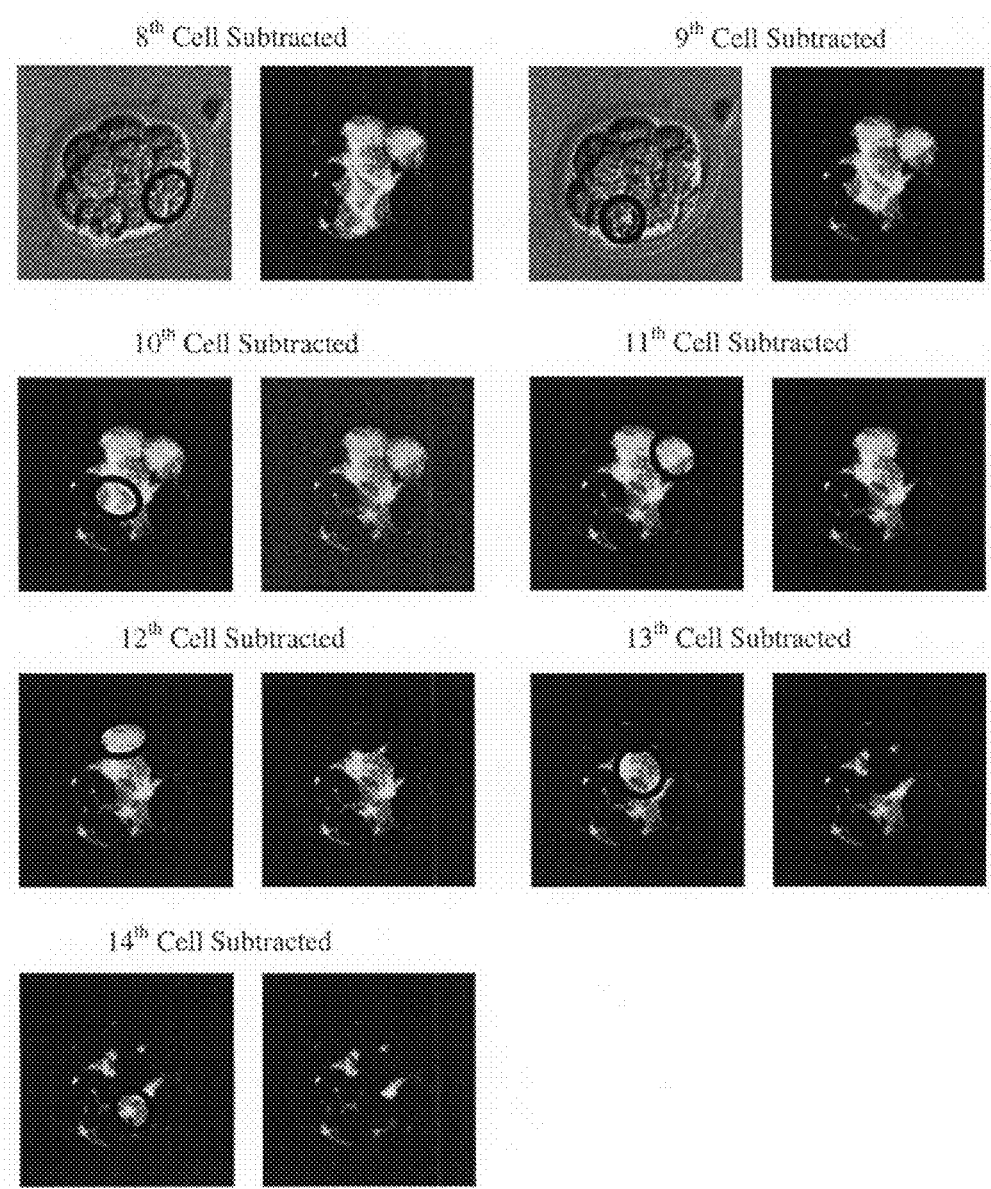

FIGS. 18A and 18B show a cell counting result for a 14-cell mouse embryo. For each cell subtraction, the image on the left shows the selected cell boundary, and the image on the right shows the subtraction of the model cell from the OPD image.

Figure 19A:
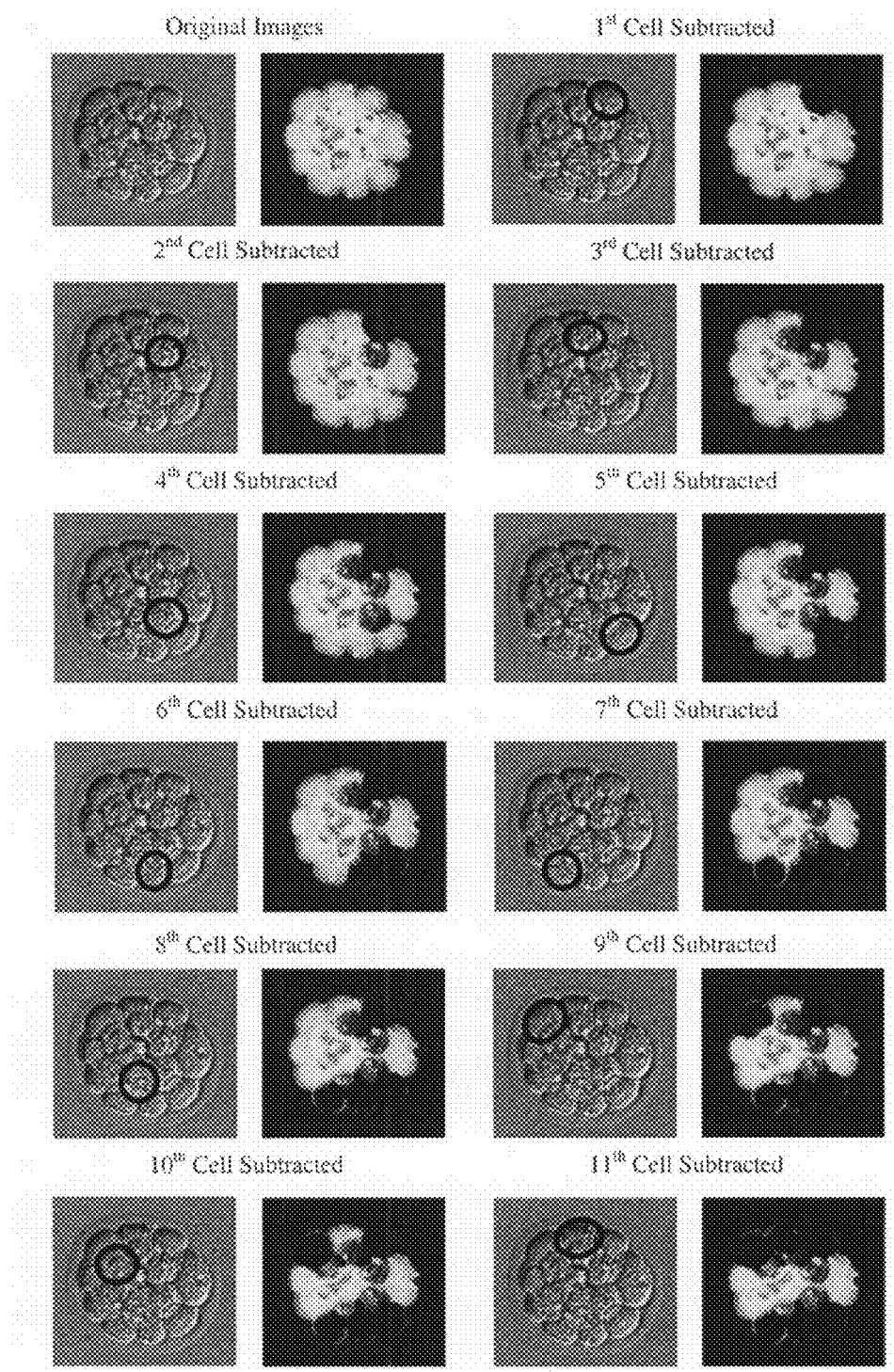
Figure 19B:
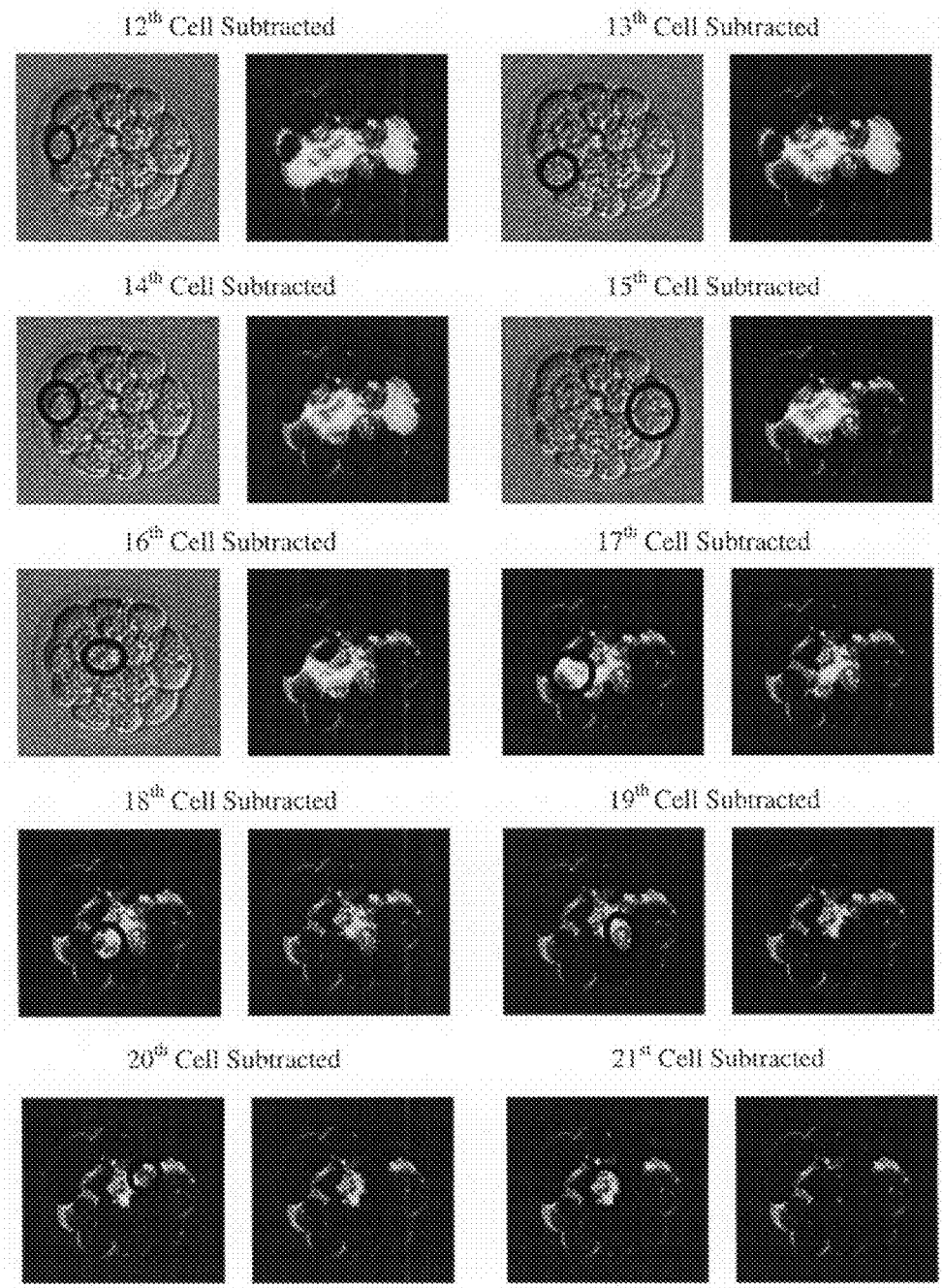

FIGS. 19A and 19B show a cell counting result for a 21-cell mouse embryo. For each cell subtraction, the image on the left shows the selected cell boundary, and the image on the right shows the subtraction of the model cell from the OPD image.

Figure 20A:
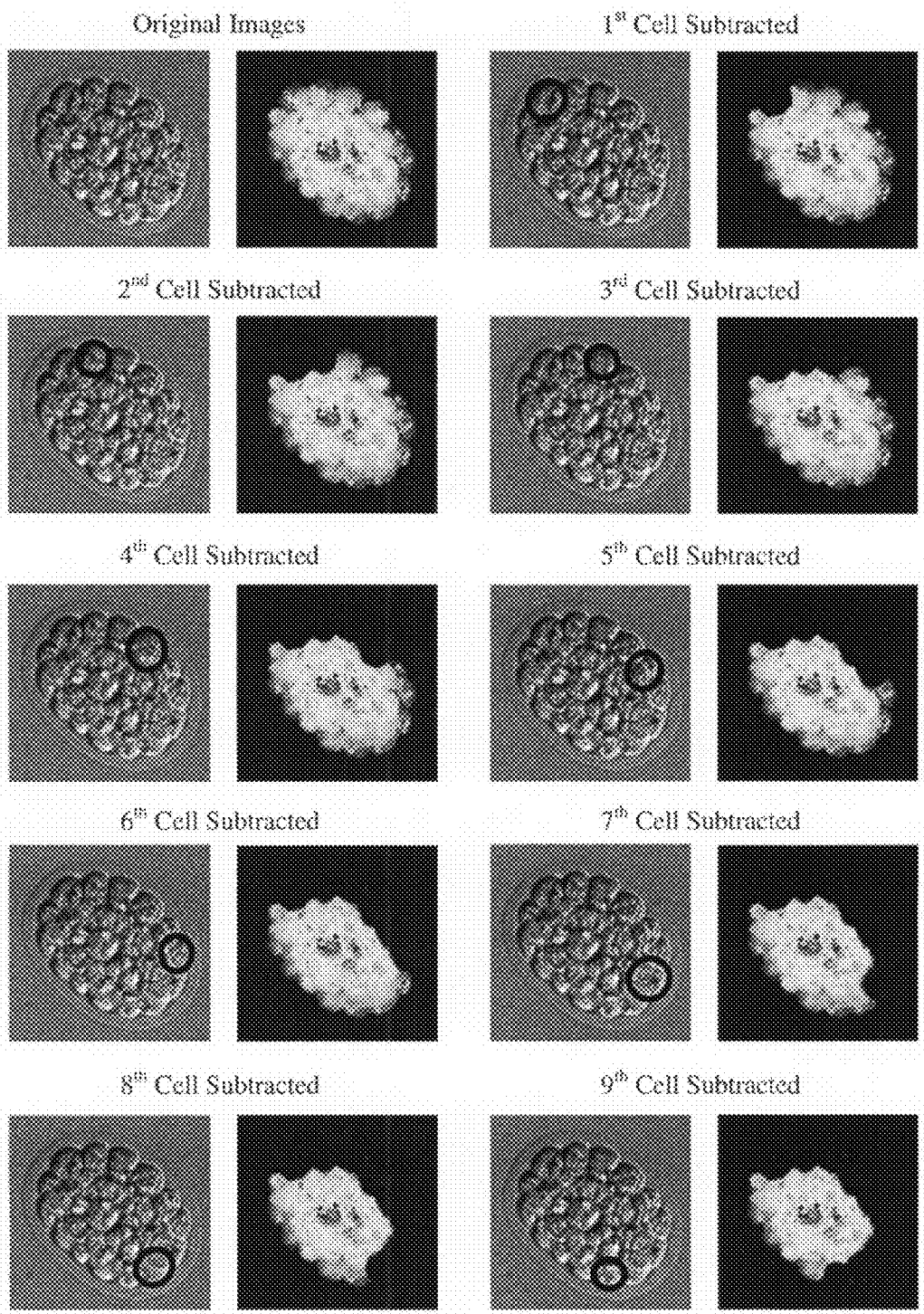
Figure 20B:
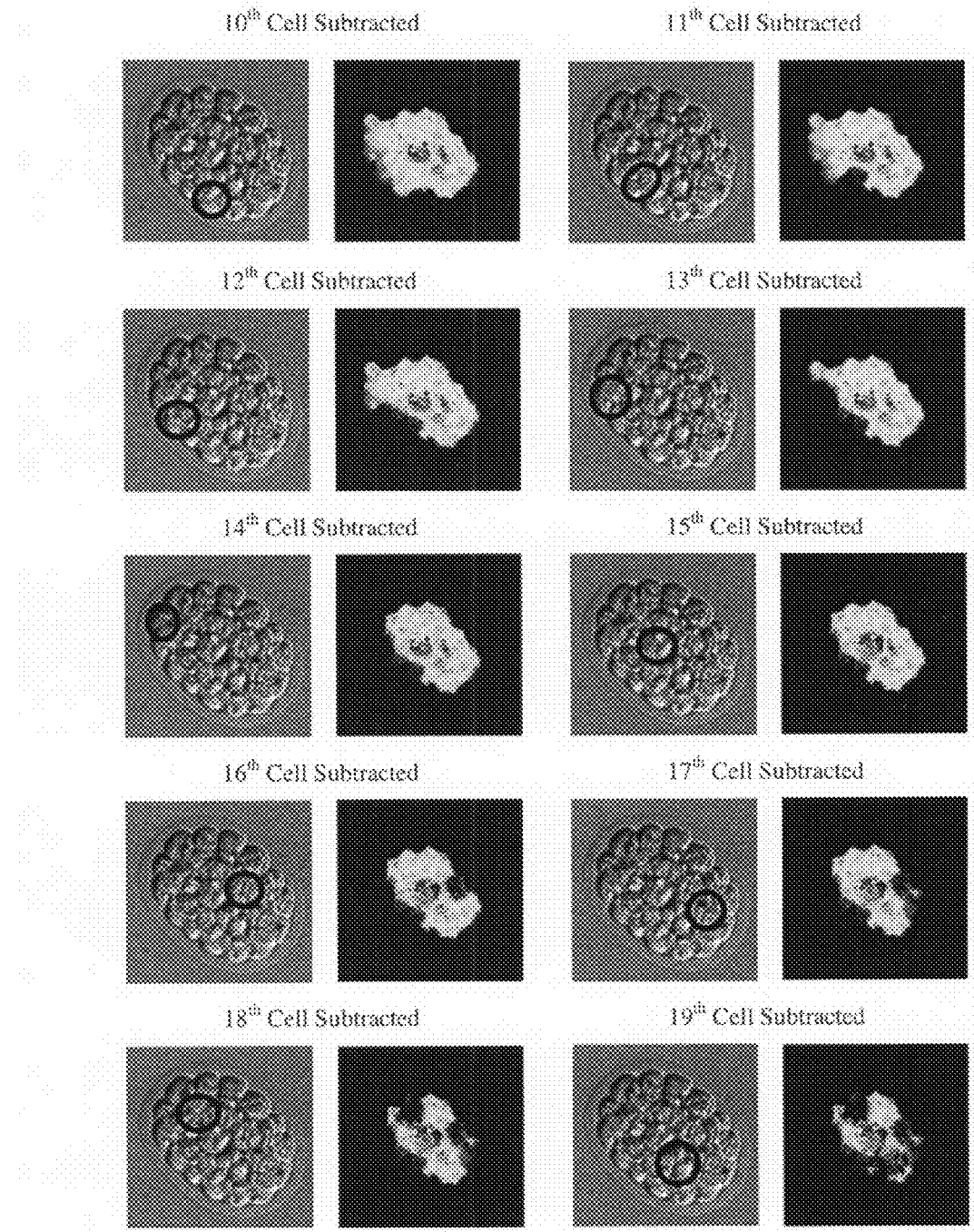
Figure 20C:
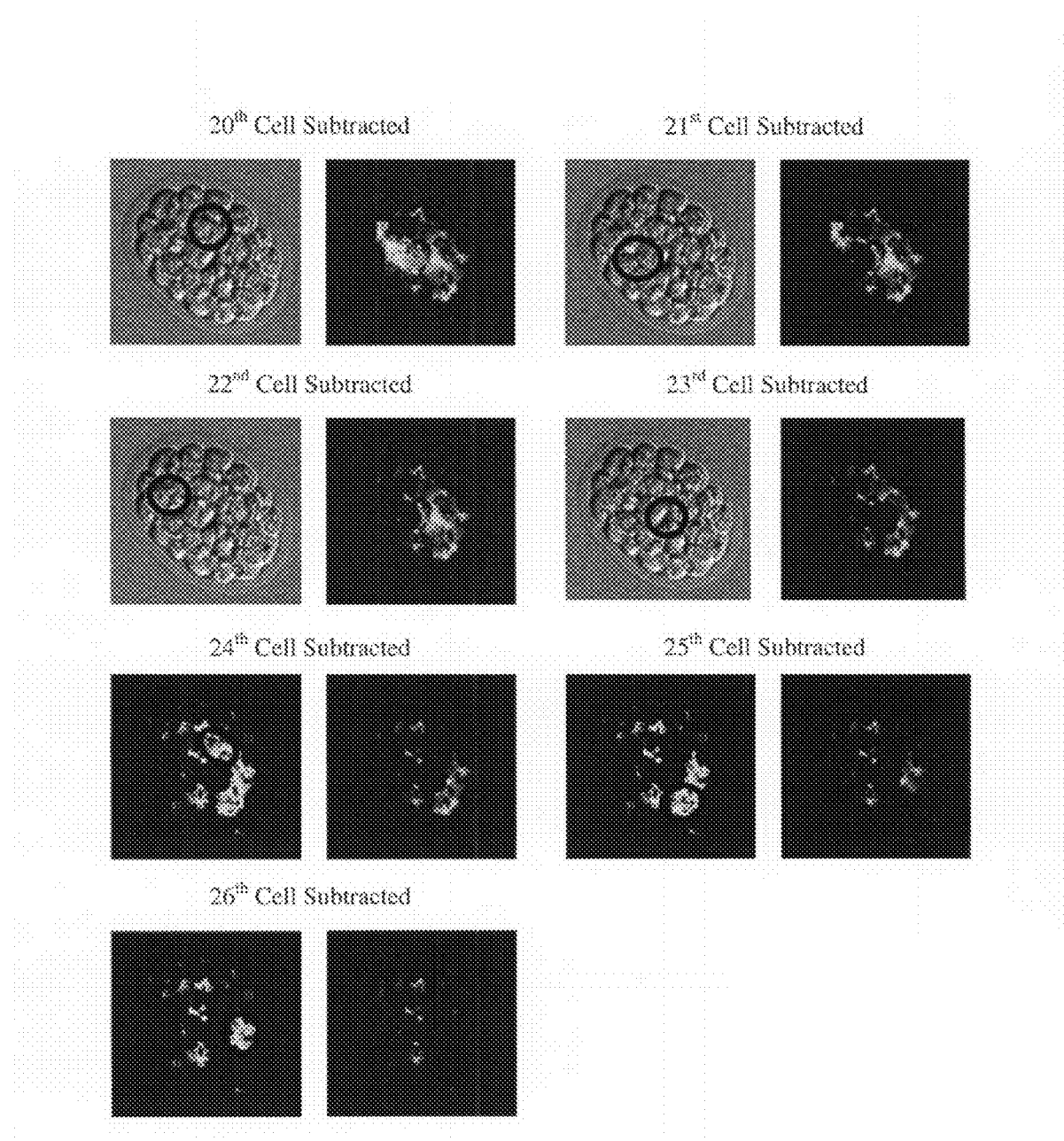

FIGS. 20A, 20B, and 20C show a cell counting result for a 26-cell mouse embryo. For each cell subtraction, the image on the left shows the selected cell boundary and the image on the right shows the subtraction of the model cell from the OPD image.

Figure 21A:
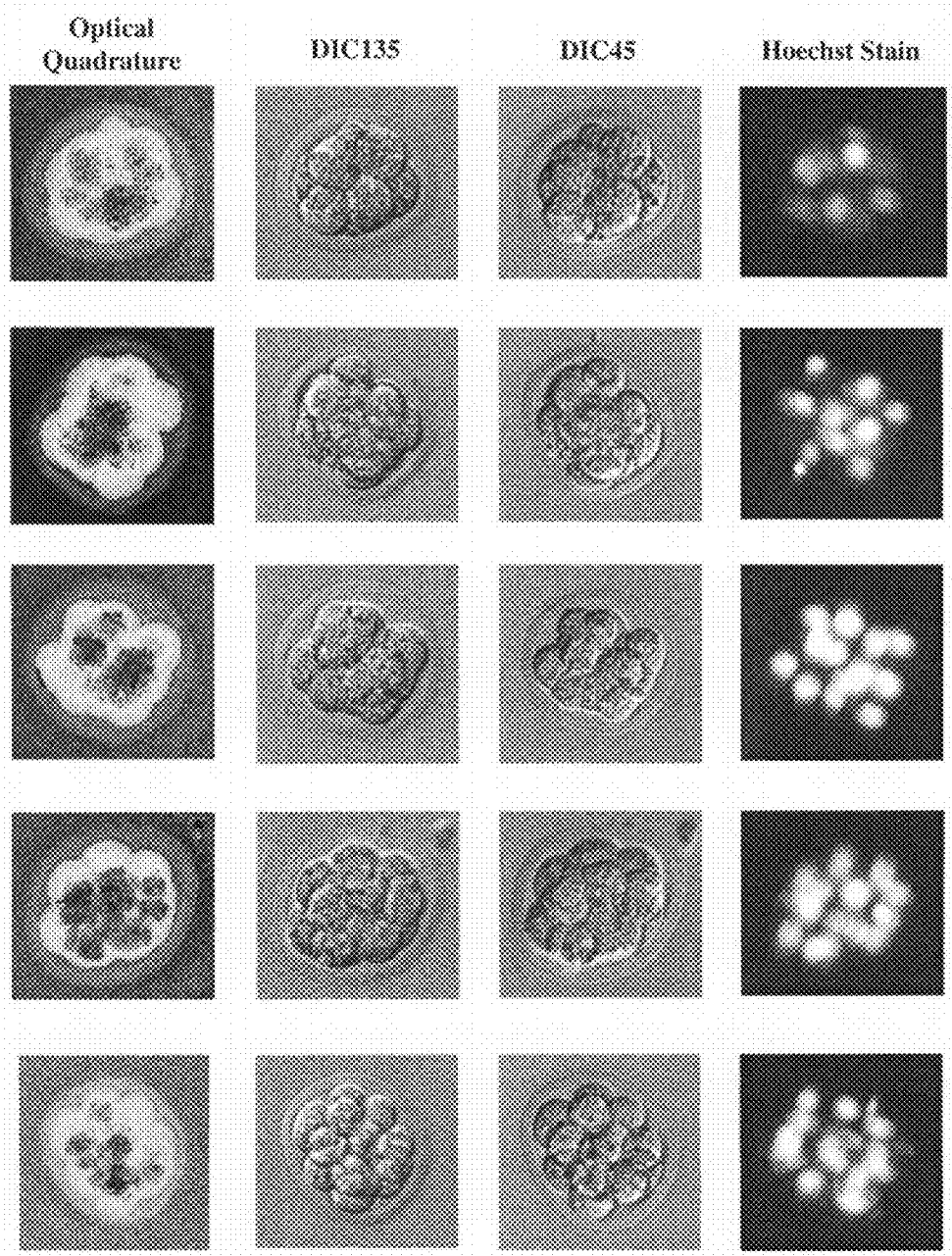
Figure 21B:
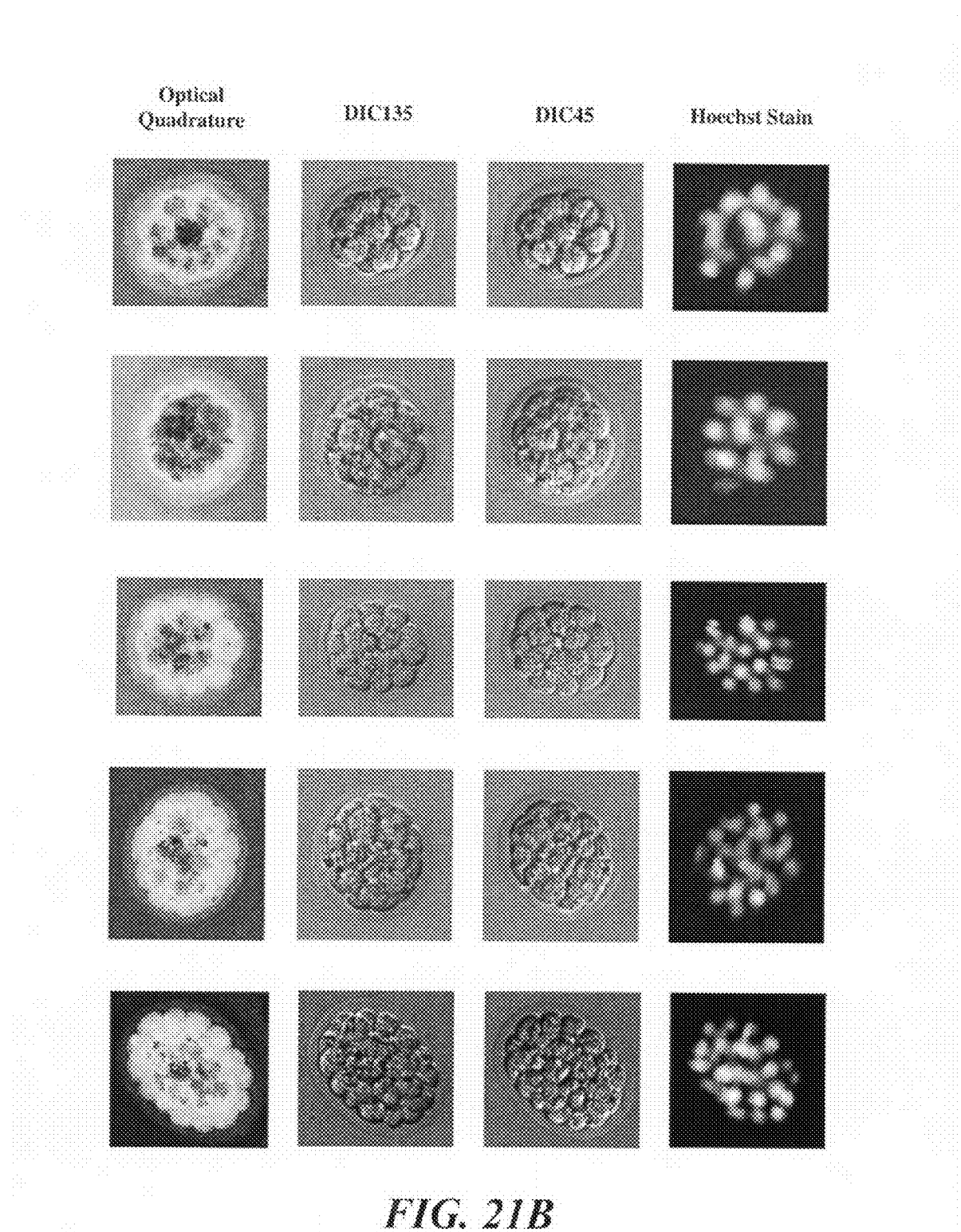

FIGS. 21A and 21B show ten of the focused images from the 81 live mouse embryos in the data set. The images are unregistered, and their order from left to right is: optical quadrature image, DIC image with 90° rotation of the polarizer (DIC135), DIC image without rotation of the polarizer (DIC45), and epi-fluorescence image of Hoechst stained nuclei.

Figure 22:
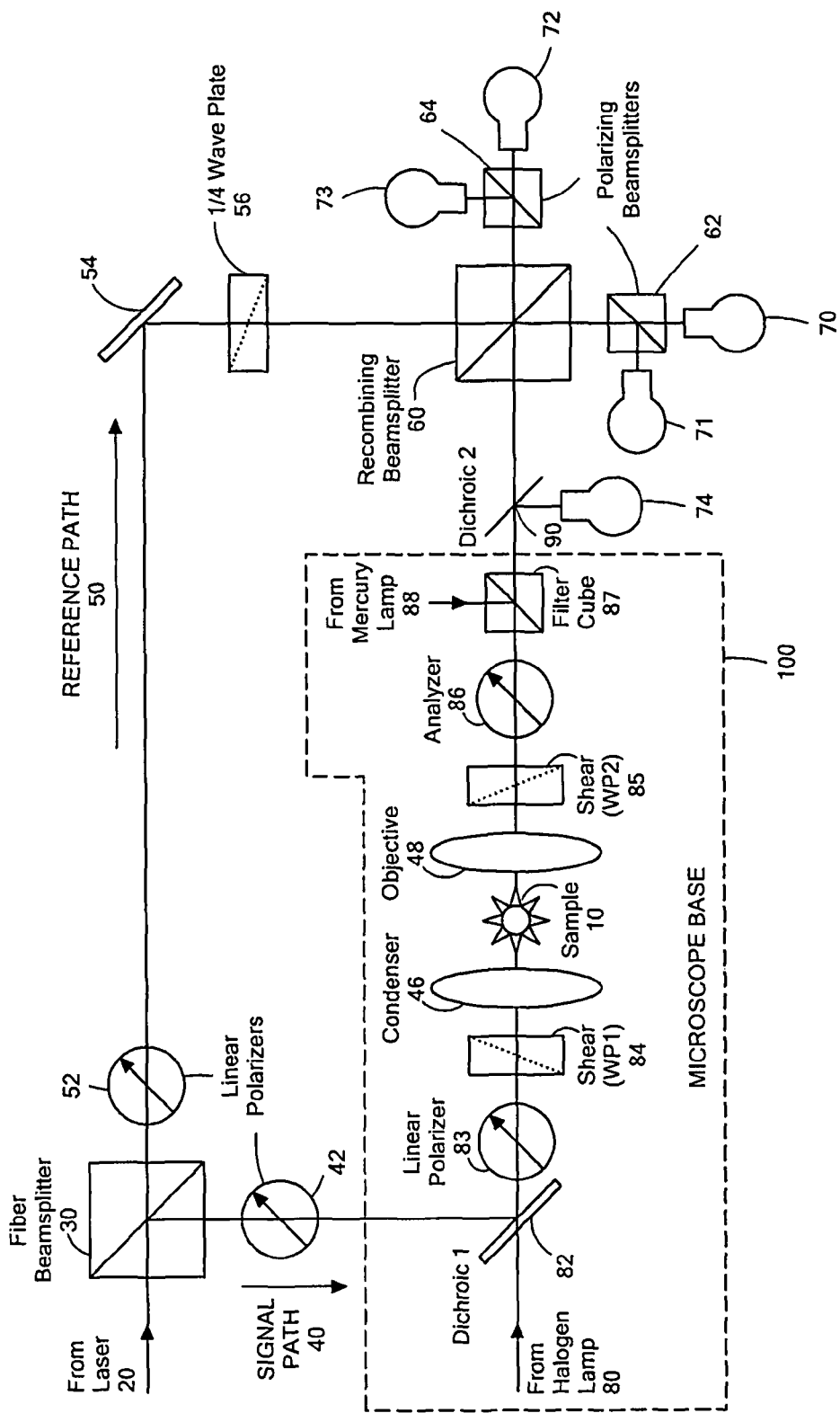

FIG. 22 shows a schematic representation of an optical quadrature microscope outfitted for both DIC and epi-fluorescence.

DETAILED DESCRIPTION OF THE INVENTION

An accurate and non-invasive method and device for counting cells in a tissue sample or a cluster of cells, such as a living embryo, has been developed. The method involves a combination of a first imaging modality providing three-dimensional structural information of an unstained tissue specimen, such as optical quadrature microscopy (OQM), and a second imaging modality that provides easily detectable cell boundaries, such as differential interference contrast (DIC) microscopy. The method produces accurate cell counts of live embryos at the blastomere or morula stage ranging from 2 to at least 30 cells in a mouse embryo, and therefore is suitable for use in fertility clinics or livestock production facilities practicing in vitro fertilization. The individual steps of the cell counting method can be partially or fully automated, such that minimal or no operator input is required.

A preferred first imaging modality is OQM. Alternatives to OQM as the first imaging modality include a variety of full-field phase imaging techniques, such as polarization interferometry (A. A. Lebedeff et al., "Polarization interferometry and its applications," Rev. Opt. 9, p. 385, 1930), digital holography (see, e.g., E. Cuche et al., "Digital holography for quantitative phase-contrast imaging," Optics Letters 24, pp. 291-293, 1999; F. Charriere et al., "Cell refractive index tomography by digital holographic microscopy," Optics Letters 31, pp. 178-180, 2006; C. J. Mann, et al. "High-resolution quantitative phase-contrast microscopy by digital holography", Optics Express, 13, pp. 8693-8698, 2005; P. Ferraro, et al. "Quantitative phase-contrast microscopy by a lateral shear approach to digital holographic image reconstruction", Optics Letters, 31, pp. 1405-1407, 2006), Fourier phase microscopy (G. Popescu et al., "Fourier phase microscopy for investigation of biological structures and dynamics," Optics Letters 29, pp. 2503-2505, 2004), Hilbert phase microscopy (T. Ikeda et al., "Hilbert phase microscopy for investigating fast dynamics in transparent systems," Optics Letters 30, pp. 1165-1167, 2005), phase shifting interferometry (Guo & Devaney, 2004; I. Yamaguchi et al., "Phase-shifting digital holography," Optics Letters 22, pp. 1268-1270, 1997), quantitative phase microscopy (A. Dubois et al., "Sinusoidally phase-modulated interference microscope for high-speed high-resolution tomographic imagery," Optics Letters 26, pp.

1873-1875, 2001), Jamin-Lebedeff interferometry (Francon & Mallick, 1971; Spencer, 1982; Slayter & Slayter, 1992), and other interferometry techniques (see, e.g., C. J. Schwarz, et al. "Imaging interferometric microscopy", Optics Letters, 28, pp 1424-1426, 2003; G. Popesku, et al., "Diffraction phase microscopy for quantifying cell structure and dynamics", Optics Letters, 31, pp. 775-777, 2006; and M. Shribak and S. Inoue, "Orientation-independent differential interference contrast microscopy," Appl. Opt. 45, 460-469, 2006).

OQM is an interferometric imaging modality that measures the amplitude and phase of a light beam that travels through a cell or tissue sample, such as an embryo. The phase is transformed into an image of optical path difference, or optical path length deviation (OPD), which is based on differences in refractive index caused by cellular components. Thus, an OPD image is a map of a cell or tissue based largely on differences in refractive index. An OPD image provides three-dimensional information concerning the structures within a cell and/or the arrangement of cells within a cell cluster, such as a piece of tissue or an embryo.

A preferred second imaging modality is DIC microscopy. Alternatives to DIC as the second imaging modality include ordinary brightfield microscopy and Hoffman modulation contrast.

DIC microscopy displays distinct cell boundaries because it provides high contrast for a steep gradient of refractive index, such as occurs at a cell boundary. However, DIC reveals cell boundaries only for cells within the depth of field; clear cell boundary definition is only provided when other cells do not lie in the path to the objective. Therefore, DIC alone generally is not capable of identifying cell boundaries, and enabling cell counting, in clusters having too many cells, such as embryos beyond the 8-cell stage. By combining DIC with OQM, the strengths of the two methods are combined to allow accurate cell counting in clusters of up to at least 30 cells.

Figure 1:
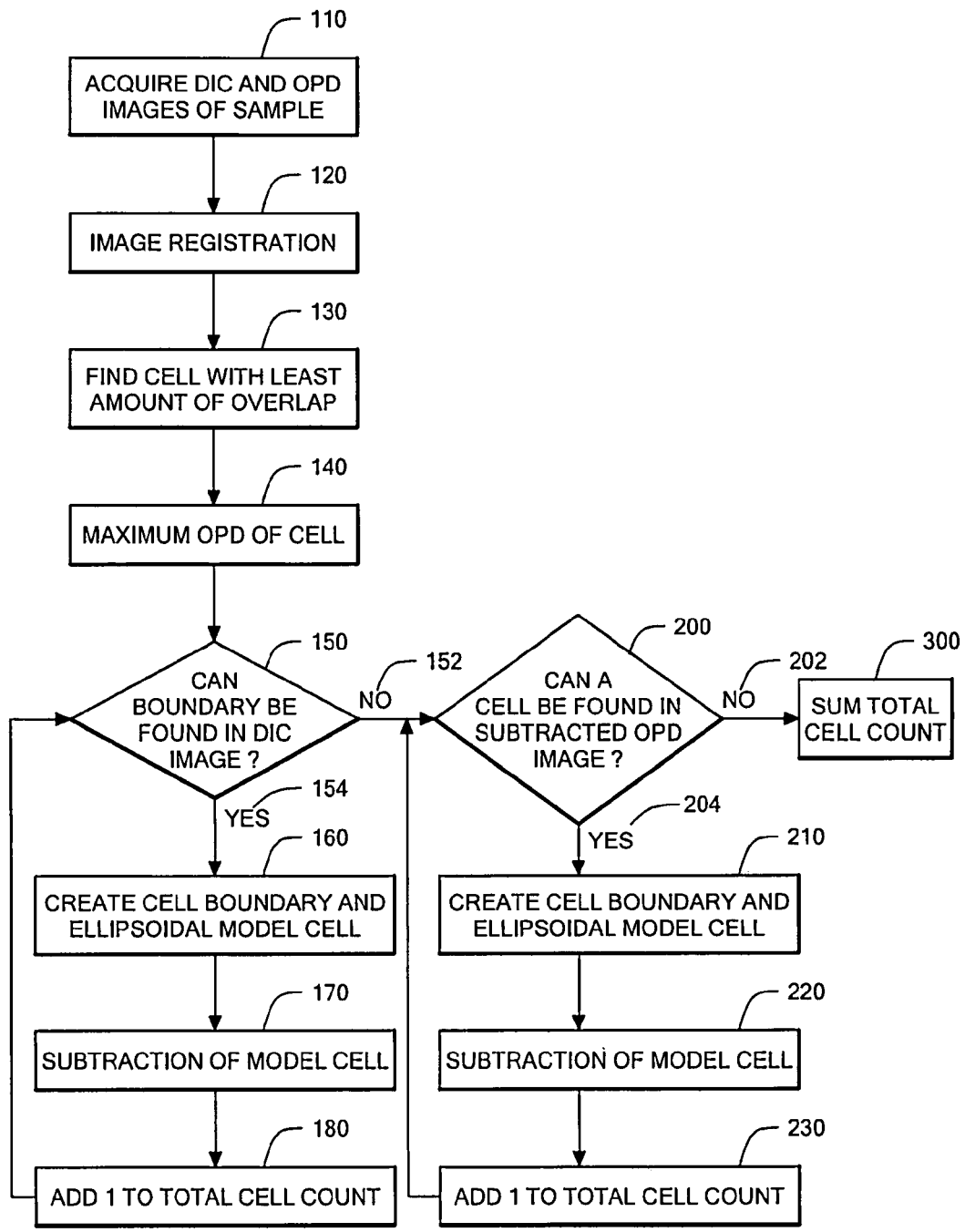
FIG. 1 shows a flow chart depicting a method of cell counting according to the invention.

The overall scheme of a cell counting method according to the invention is depicted in FIG. 1. The first step 110 is to acquire both DIC and OPD images of the cell or tissue sample. Microscope systems capable of acquiring such images are described in U.S. Pat. Nos. 5,883,717 and 6,020,963, which are hereby incorporated by reference in their entireties, and in Example 1 below. In the next step, image registration 120 is applied to place both images into the same coordinate system. A first cell is then selected for analysis 130, so that parameters can be determined that will assist in identifying the remaining cells. Preferably, the first cell identified is an easily identifiable cell having little overlap with other cells of the sample. More preferably, the image of the cell in the DIC image overlaps with other cells across less than 50% of the cell's area. The first cell selected preferably is of similar size and shape to the rest of the cells to be counted. A cell that is atypically large or small, or has an atypical form, orientation, or location within the sample should be rejected and another cell should be chosen. Then, the maximum OPD value of the first cell is determined 140. In some embodiments of the counting method, this maximum OPD value will be assumed to be the same for all cells to be counted in the sample. The boundary of the first cell is marked or detected 150 and fitted to an ellipse in the DIC image. Using the fitted ellipse and the maximum OPD information, an ellipsoidal model cell is determined 160 and subtracted 170 from the OPD image to form a subtracted OPD image. The subtracted cell is counted 180. This process of cell boundary detection 150, model cell calculation 160, and model cell subtraction 170 is continued until no further cell boundaries can be reliably detected 152 in the DIC image, and then a similar process is continued using the subtracted OPD image 200-230, until all phase signal attributable to cells in the tissue sample has been subtracted 202, leaving only the OPD value of the culture medium and the zona pellucida. At that point, the total cell count is summed 300.

The cell counting method can be applied to cell clusters, i.e., groups of untreated living cells (as well as treated living cells or non-living cells) which have a stable positional relationship with respect to one another. Typically, clusters of cells stick together due to the natural adherence of the cells to one another, as is the case in a tissue, an embryo, or a developing colony of cells. The cluster of cells to be counted should have a stable form that is fairly constant over a period of at least several minutes, e.g., 1, 2, 3, 5, 10, or 20 minutes, providing sufficient time for images to be prepared using at least the two different imaging modalities required for the method. The method is suitable for accurately counting the number of cells in a living embryo, such as a mammalian embryo at the blastomere or morula stage. The method does not appear to harm the embryos (Newmark et al., 2007) and is therefore suitable for assessing the relative health and stage of development of embryos prepared by in vitro fertilization. The method can also be employed to monitor the growth and development of a culture of cells, such as a colony of stem cells, over time, and is especially well suited to the evaluation of the growth and development of clusters of cells suspended in a culture medium. The counting method can be used to non-invasively monitor the growth and development of stem cells, which often form clusters or masses that undergo changes in cell number and shape over a period of time, reflecting their development into a tissue that can be used, for example, for transplantation to a patient. Preferably, the cells of a cluster for cell counting with a method according to the invention are similar in size and shape to one another. However, the method can accommodate some non-uniformity of cell size and shape, and can count clusters containing more than one cell type. For example, polar bodies or cell fragments within an embryo can be detected and counted separately from the blastomere cells of the embryo. If a cell cluster for counting with the method contains cells of more than one shape or size class, then a selection of different fitting algorithms can be used for each cell counted, and the equation that provides the best fit can be used to determine the model cell for subtraction from the OPD image. Cells fitted to each different geometry can be counted separately, to provide a count of two or more cell types in the same cell cluster. Alternatively, all cell geometries can be counted together for an overall cell count. The number of cells in a cluster that can be counted with the method is generally from 2 to about 30 cells. However, the use of more careful fitting routines, for example by testing for a variety of different (i.e., non-ellipsoidal) cell shapes when determining either cell boundaries or model cell volumes, can extend the method to count greater numbers of cells in a cluster, e.g., up to as many as 50 or 100 cells or more.

Optical Quadrature Microscopy

Optical quadrature microscopy, also known as quadrature interferometry, was developed by Charles DiMarzio and colleagues (Hogenboom et al., 1998; DiMarzio, 2000; U.S. Pat. Nos. 5,883,717 and 6,020,963). The technique was developed to measure the amplitude and phase of a three-dimensional object, e.g., a cell or group of cells, without having to change the focus of the microscope or introduce multiple light sources. A Mach-Zehnder interferometer configuration is used with a coherent illumination source, e.g., a 632.8 nm HeNe laser. A HeNe laser is suitable because it is a cheap and readily available laser source with sufficient coherence length; other light sources can be used, however. Additional laser sources include other helium-neon lasers such as green and yellow, argon ion lasers, helium-cadmium lasers, and laser diodes with a coherence length longer than the optical path difference caused by the sample. Any wavelength that transmits through the sample can be used, but, the alternative wavelengths must be tested to ensure the method is not toxic to the sample. A wavelength of 632.8 nm is suitable because it is long enough not to excite transitions within a living cell or tissue sample, but short enough so that the absorption of the aqueous medium in which the cell(s) or tissue is suspended is negligible. A Mach-Zehnder interferometer separates the light source into signal and reference paths that are then recombined to create interference between the beams. Four cameras, preceded by multiple beamsplitters, are used to read the four interferograms, which are computationally processed to produce an image of the magnitude and phase of the sample. The phase of the complex amplitude is then unwrapped using a 2-D phase unwrapping algorithm. Multiplying the phase image by $$\frac{\lambda}{2\pi}$$

produces an image of optical path length. Since the total index of refraction and thickness of the tissue sample are unknown, the images are interpreted as images of optical path length deviation (OPD).

Figure 2:
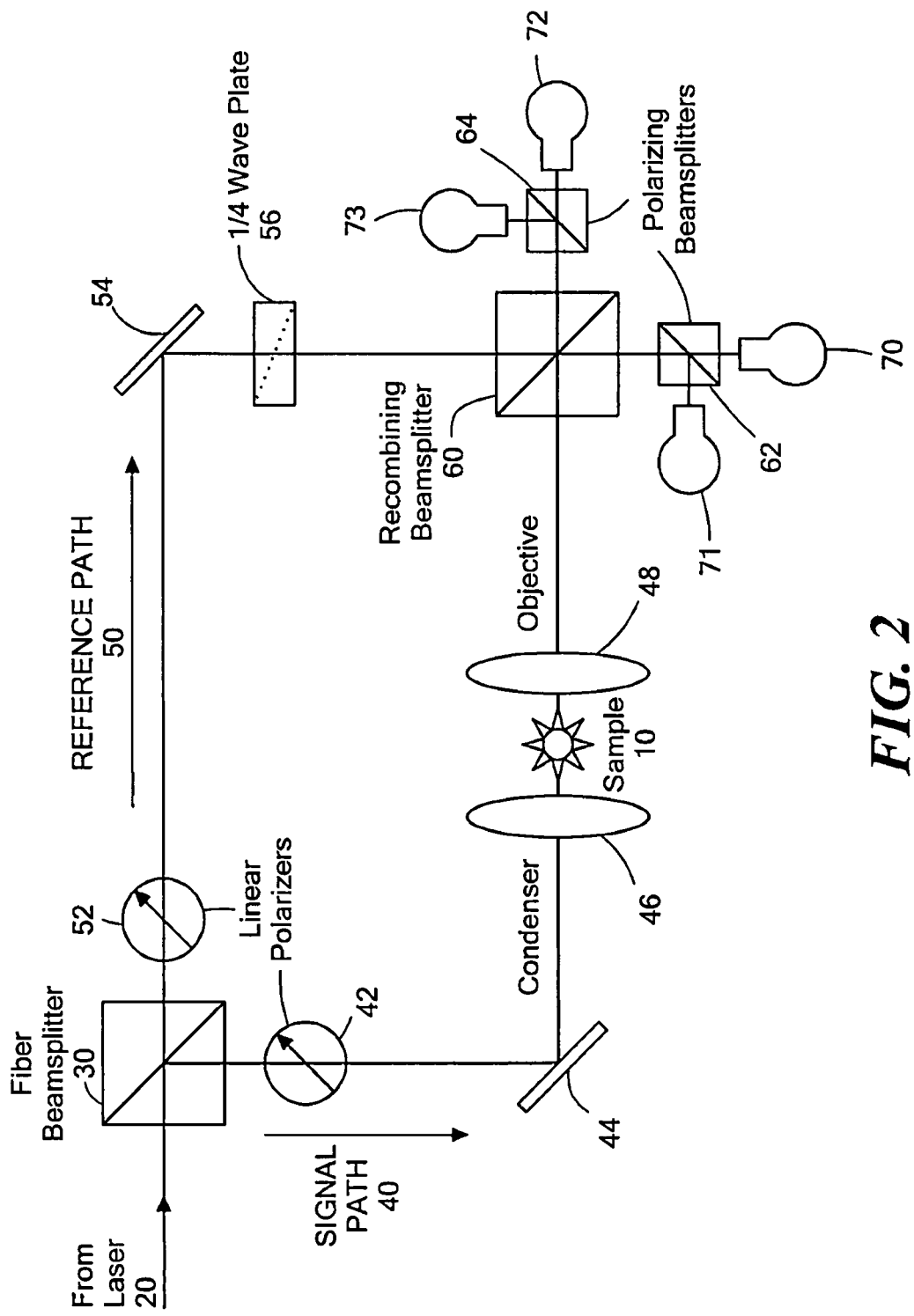
FIG. 2 shows a Mach-Zehnder interferometer configuration for optical quadrature microscopy.

A Mach-Zehnder interferometer configuration such as shown in FIG. 2 employs fiber beamsplitter 30 to separate light from illumination source 20 into two independent paths. The path that travels through sample 10 is signal path 40, and the path that does not travel through the sample is reference path 50, also referred to as the local oscillator. Light in each of the signal and reference paths first passes through linear polarizers 42 and 52, respectively. In each path the light is then reflected at 45 degrees to direct it through the sample or through ¼ wave plate 56. The sample is positioned between condenser 46 and objective 48 as in an ordinary microscope. The signal and reference paths travel approximately the same distance, at least within the coherence length of the light source. For example, when using a HeNe laser with a coherence length of 20 cm, the two paths must be within 20 cm of each other. The signal and reference paths are recombined at recombining beamsplitter 60. The two paths interfere producing an interference pattern (also known as a fringe pattern). The interference pattern is captured by a detector, such as a CCD, and imaged. After passing through the recombining beamsplitter, the light passes through polarizing beamsplitters 62 and 64 and is captured by CCDs 70 (camera 0), 71 (camera 1), 72 (camera 2), and 73 (camera 3). The fringe pattern consists of alternating dark and light bands, or fringes, and is generally processed in four steps: (1) phase evaluation, (2) phase unwrapping, (3) elimination of additional terms, and (4) rescaling (Dorrio & Fernández, 1999). Phase evaluation produces a phase map from the spatial distribution of the phase. Phase unwrapping is required to produce a quantitative image of the phase map because phase cycles between 0 and $2\pi$ radians and does not produce a value directly proportional to the optical path length. Additional terms may be introduced into the fringe pattern by irregularities within the setup that may be removed mathematically. Rescaling takes the image of phase and mathematically develops an image that may be more meaningful to the user, such as distance. The fringe pattern is also helpful in determining the quality of the setup. Perfectly circular fringes are a result of properly aligned optics and overlapping wavefronts. In contrast, elliptical or egg shaped fringes may result from lenses that are not perpendicular to the direction of light propagation of the light source, although such fringes may also be caused by the shape of an observed object such as a cell.

Optical quadrature is based on two signals 90° out of phase. The following equations begin with the electric field supplied by a lossless light source, such as a HeNe laser, and continue through the polarization components and sample until reaching the detectors. The image is then reconstructed providing only the magnitude and phase induced by the sample.

The electric field ($E_L$) supplied by the HeNe laser source can be represented by the equation:

$$E_L = E_0 e^{j(\omega t + \phi)} \quad (3.2.1)$$

where $E_0$ and $\phi$ are the magnitude and phase of the output light. The field travels through a single mode fiber to a 50/50 fiber-coupled beamsplitter where the field is split into two independent paths, signal ($E_{sig}$) and reference ($E_{ref}$):

$$E_{ref} = \frac{1}{\sqrt{2}}(E_0 e^{j(\omega t + \phi)}) \quad (3.2.2)$$

$$E_{sig} = \frac{1}{\sqrt{2}}(E_0 e^{j(\omega t + \phi)}). \quad (3.2.3)$$

The $$\frac{1}{\sqrt{2}}$$

factor comes from the properties of a lossless 50/50 beamsplitter. A 50/50 beamsplitter divides the irradiance of the incident light into 50% in one direction and 50% in another. The irradiance is the square of the field, so for a 50/50 beamsplitter the output field is the square root of half the incident irradiance, or $$\frac{1}{\sqrt{2}}$$

the incident field. The phase is assumed to be the same for polarizations.

Assuming the laser is not linearly polarized, the reference and signal fields must pass through linear polarizers oriented at 45° to produce:

$$\vec{E}_{ref} = \frac{1}{\sqrt{2}}(E_R e^{j(\omega t + \phi)}) \cdot (\vec{x} + \vec{y}) \quad (3.2.4)$$

$$\vec{E}_{sig} = \frac{1}{\sqrt{2}}(E_S e^{j(\omega t + \phi)}) \cdot (\vec{x} + \vec{y}). \quad (3.2.5)$$

This orientation of the linear polarizer provides equal amounts of S, perpendicular, and P, parallel, polarized light, leading to the same field for the $\vec{x}$ and $\vec{y}$ directions. If a polarized laser is coupled with polarization maintaining fiber (PM fiber), these fields will be produced after the 50/50 beamsplitter and the linear polarizers are not required.

The linearly polarized signal path travels through the sample on the microscope thereby changing the field:

$$\vec{E}_{sig} = \frac{1}{\sqrt{2}}(AE_S e^{j(\omega t+\phi+\alpha)}) \cdot (\vec{x}+\vec{y}) \quad (3.2.6)$$

where A is the multiplicative change in amplitude and α is the change in phase induced by the sample. Therefore the calculated magnitude and phase of the object to be found by optical quadrature is $Ae^{j\alpha}$.

The linearly polarized reference path travels through a quarter-wave plate, or retarder, whose optical axis is oriented at 45° with respect to the polarization axis of the incident light to produce circularly polarized light:

$$\vec{E}_{ref} = \frac{1}{\sqrt{2}}(E_R e^{j(\omega t+\phi)}) \cdot (\vec{x}+j\vec{y}). \quad (3.2.7)$$

The linearly polarized light can be thought of as two orthogonal waves, one in the $\vec{x}$ direction and one in the $\vec{y}$ direction, that travel with the same phase velocity. The birefringence of the quarter-wave plate separates the two waves into the ordinary and extraordinary waves. Since the optical axis of the quarter-wave plate is perpendicular to the direction of propagation, the two waves continue to travel parallel to each other but with different phase velocities within the material. Once the waves exit the quarter-wave plate their phase velocities are the same but a change in phase has been introduced that is dependent on the thickness of the quarter-wave plate (d):

$$\delta = 2\pi N = \pm\frac{2\pi \cdot d(n_e - n_o)}{\lambda} \quad (3.2.8)$$

where δ is the change in phase, $n_e$ and $n_o$ are the indices of refraction for the extraordinary or ordinary waves, λ is the wavelength of the laser, and N is retardation of the plate (N=¼ for a quarter-wave plate). Orienting the quarter-wave plate with the optical axis parallel or perpendicular to the direction of linear polarization will have no effect on the state of polarization and result in linear polarization.

The signal and reference beams enter two sides of the recombining 50/50 beamsplitter and interfere. Remembering that the 50/50 beamsplitter divides the input power:

$$\vec{E}_{sig}^2 + \vec{E}_{ref}^2, \quad (3.2.9)$$

the output power must also be equal to (3.2.9) to preserve conservation of energy. Setting the field of one output equal to:

$$\frac{1}{\sqrt{2}}(\vec{E}_{sig} + \vec{E}_{ref}) \quad (3.2.10)$$

results in an output power of:

$$\left|\frac{1}{\sqrt{2}}(\vec{E}_{sig} + \vec{E}_{ref})\right|^2 = \frac{1}{2}(E_{sig}^2 + E_{sig}E_{ref}^* + E_{sig}^*E_{ref} + E_{ref}^2) \quad (3.2.11)$$

for that path since the fields are complex. Therefore, to produce a total output power equal to (3.2.9) the output power of the second path must be:

$$\frac{1}{2}(E_{sig}^2 - E_{sig}E_{ref}^* - E_{sig}^*E_{ref} + E_{ref}^2). \quad (3.2.12)$$

Taking the square root of (3.2.12) results in the field for the second path being set to:

$$\frac{1}{\sqrt{2}}(\vec{E}_{sig} - \vec{E}_{ref}). \quad (3.2.13)$$

Only output (3.2.10) will be carried through the rest of the equations to show that optical quadrature is based on two signals 90° out of phase and not dependent on the number of cameras. Output (3.2.10) is provided from the field:

$$\frac{1}{\sqrt{2}}\left(\frac{1}{\sqrt{2}}(AE_S e^{j(\omega t+\phi+\alpha)}) \cdot (\vec{x}+\vec{y}) + \frac{1}{\sqrt{2}}(E_R e^{j(\omega t+\phi)})\right) \cdot (\vec{x}+j\vec{y}). \quad (3.2.14)$$

The resulting quadrature signals can be expressed by:

$$\frac{1}{2}(AE_S e^{j(\omega t+\phi+\alpha)} + E_R e^{j(\omega t+\phi)}) \cdot \vec{x} \quad (3.2.15)$$

$$\frac{1}{2}(AE_S e^{j(\omega t+\phi+\alpha)} + jE_R e^{j(\omega t+\phi)}) \cdot \vec{y} \quad (3.2.16)$$

To capture these signals with a single detector, a linear polarizer can be placed in the path. The polarizer would be oriented to block (3.2.16) and an image of (3.2.15) is acquired. Then the polarizer would be rotated to the orthogonal position to block (3.2.15) and an image of (3.2.16) is acquired. However, this method allows the sample to move during the time between images and requires extra steps by the user. To acquire images simultaneously for (3.2.15) and (3.2.16) two detectors must be used with a polarizing beamsplitter in the path. The polarizing beamsplitter allows the P polarization, (3.2.15), to transmit and reflects the orthogonal S polarization, (3.2.16). The two detectors simultaneously acquire images of the mixed signal and reference (M) with intensities:

$$\left|\frac{1}{2}(AE_S e^{j(\omega t+\phi+\alpha)} + E_R e^{j(\omega t+\phi)})\right|^2 = \quad (3.2.17)$$

$$M_0 = \frac{1}{4}(A^2 E_S E_s^* + AE_S E_R^* e^{j\alpha} + AE_R E_s^* e^{-j\alpha} + E_R E_R^*)$$

$$\left|\frac{1}{2}(AE_S e^{j(\omega t+\phi+\alpha)} + jE_R e^{j(\omega t+\phi)})\right|^2 = \quad (3.2.18)$$

$$M_1 = \frac{1}{4}(A^2 E_S E_s^* + jAE_S E_R^* e^{j\alpha} + jAE_R E_s^* e^{-j\alpha} + E_R E_R^*).$$

Images of pure reference (R) without signal can be acquired by blocking the signal path before the recombining beamsplitter giving the powers:

$$R_0 = \left|\frac{1}{\sqrt{2}}(E_R e^{j(\omega t+\phi)})\right|^2 = \frac{1}{4}(E_R E_R^*) \quad (3.2.19)$$

$$R_1 = \left|j\frac{1}{\sqrt{2}}(E_R e^{j(\omega t+\phi)})\right|^2 = \frac{1}{4}(E_R E_R^*). \quad (3.2.20)$$

Removing the block from the signal path and placing it before the recombining beamsplitter in the reference path allows images of pure signal (S) with powers:

$$S_0 = \left|\frac{1}{\sqrt{2}}(AE_S e^{j(\omega t+\phi+\alpha)})\right|^2 = \frac{1}{4}(A^2 E_S E_S^*) \quad (3.2.21)$$

$$S_1 = \left|\frac{1}{\sqrt{2}}(AE_S e^{j(\omega t+\phi+\alpha)})\right|^2 = \frac{1}{4}(A^2 E_S E_S^*). \quad (3.2.22)$$

The quadrature image ($E_r$) is reconstructed using the equation:

$$E_r = \sum_{n=0}^{1} j^n \frac{M_n - R_n - S_n}{\sqrt{R_n}} \quad (3.2.23)$$

where $\sqrt{R_n}$ normalizes the values of the separate detectors. Substituting the appropriate values (3.2.23) becomes:

$$E_r = \frac{AE_S E_R^* e^{j\alpha}}{|E_R|}. \quad (3.2.24)$$

To remove the additional terms and be left with only $Ae^{j\alpha}$, the process must be repeated with the sample removed from the signal path to create a blank image. The blank signal before the recombining beamsplitter is:

$$\vec{E}_{blanksig} = \frac{1}{\sqrt{2}}(E_{BS} e^{j(\omega t+\phi)}) \cdot (\vec{x}+\vec{y}). \quad (3.2.25)$$

The reference in the sample image is also used in the blank image, so mixing (3.2.25) with the reference (3.2.7) results in the mixed field ($E_{blankmix}$):

$$\vec{E}_{blankmix} = \frac{1}{2}\big((E_{BS} e^{j(\omega t+\phi)}) \cdot (\vec{x}+\vec{y}) + (E_R e^{j(\omega t+\phi)})\big) \cdot (\vec{x}+j\vec{y}) \quad (3.2.26)$$

following the recombining beamsplitter. Reconstructing the blank quadrature image ($E_{blank}$) using (3.2.23) provides:

$$E_{blank} = \frac{E_S E_R^*}{|E_R|}. \quad (3.2.27)$$

Finally, dividing the quadrature image of the sample (3.2.24) by the quadrature image of the blank (3.2.27) provides the magnitude and the phase of the sample:

$$\frac{E_r}{E_{blank}} = Ae^{j\alpha}. \quad (3.2.28)$$

Since there are no sectioning capabilities the user must remember the calculated amplitude and phase is the integral of contributions through the entire sample. This is important when determining the location of the blank image. Everything that is the same in both the blank and the sample images, such as the glass side or the culture medium, will not contribute to the amplitude and phase calculated in (3.2.28). However, this assumes that the thickness and the material properties are perfectly uniform. Any imperfection in the glass or foreign substance in the culture medium will contribute to the amplitude and phase calculated in (3.2.28).

The two detector configuration only takes advantage of half the reference and signal intensities. Placing two extra detectors on the second output of the recombining beamsplitter collects all the light from the reference and signal paths. The configuration of four detectors, collecting both outputs of the recombining beamsplitter, is called "balanced detection" because the conjugate intensities are also collected. See bottom right portion of FIG. 1.

Once again, the fields going into the recombining beamsplitter are:

$$\vec{E}_{ref} = \frac{1}{\sqrt{2}}(E_R e^{j(\omega t+\phi)}) \cdot (\vec{x}+j\vec{y}) \quad (3.3.1)$$

$$\vec{E}_{sig} = \frac{1}{\sqrt{2}}(AE_S e^{j(\omega t+\phi+\alpha)}) \cdot (\vec{x}+\vec{y}). \quad (3.3.2)$$

The resulting outputs of the recombining beamsplitters are:

$$\frac{1}{\sqrt{2}}\big(\vec{E}_{sig}+\vec{E}_{ref}\big) \quad (3.3.3)$$

$$\frac{1}{\sqrt{2}}\big(\vec{E}_{sig}-\vec{E}_{ref}\big) \quad (3.3.4)$$

as explained above. Each of the fields in (3.3.3) and (3.3.4) is separated into their orthogonal components by polarizing beamsplitters and captured by four individual detectors. The intensities seen on the (3.3.3) path are:

$$\left|\frac{1}{2}(AE_S e^{j(\omega t+\phi+\alpha)} + E_R e^{j(\omega t+\phi)})\right|^2 = \quad (3.3.5)$$

$$M_0 = \frac{1}{4}(A^2 E_S E_S^* + AE_S E_R^* e^{j\alpha} + AE_R E_S^* e^{-j\alpha} + E_R E_R^*)$$

$$\left|\frac{1}{2}(AE_S e^{j(\omega t+\phi+\alpha)} + jE_R e^{j(\omega t+\phi)})\right|^2 = \quad (3.3.6)$$

$$M_1 = \frac{1}{4}(A^2 E_S E_S^* - jAE_S E_R^* e^{j\alpha} + jAE_R E_S^* e^{-j\alpha} + E_R E_R^*)$$

and the intensities seen on the (3.3.4) path are:

$$\left|\frac{1}{2}(AE_S e^{j(\omega t+\phi+\alpha)} - E_R e^{j(\omega t+\phi)})\right|^2 = \quad (3.3.7)$$

$$M_2 = \frac{1}{4}(A^2 E_S E_S^* - AE_S E_R^* e^{j\alpha} - AE_R E_S^* e^{-j\alpha} + E_R E_R^*)$$

$$\left|\frac{1}{2}(AE_S e^{j(\omega t+\phi+\alpha)} - jE_R e^{j(\omega t+\phi)})\right|^2 = \quad (3.3.8)$$

$$M_3 = \frac{1}{4}(A^2 E_S E_S^* - jAE_S E_R^* e^{j\alpha} - jAE_R E_S^* e^{-j\alpha} + E_R E_R^*).$$

Taking the summation $$E_r = \sum_{n=0}^{n=3} j^n M_n \quad (3.3.9)$$

rejects all the common modes without subtracting the pure signal and pure reference images as seen by $$E_r = \frac{1}{4}(A^2 E_S E_S^* + AE_S E_R^* e^{j\alpha} + AE_R E_S^* e^{-j\alpha} + E_R E_R^* + \quad (3.3.10)$$
$$jA^2 E_S E_S^* + AE_S E_R^* e^{j\alpha} - AE_R E_S^* e^{-j\alpha} + jE_R E_R^* +$$
$$-A^2 E_S E_S^* + AE_S E_R^* e^{j\alpha} + AE_R E_S^* e^{-j\alpha} - E_R E_R^* +$$
$$-jA^2 E_S E_S^* + AE_S E_R^* e^{j\alpha} - AE_R E_S^* e^{-j\alpha} - jE_R E_R^*)$$

$$E_r = AE_S E_R^* e^{j\alpha}. \quad (3.3.11)$$

The image constructed in (3.3.11) is divided by a blank image constructed in the same manner with the object moved out of the field of view providing the magnitude and phase of the sample:

$$\frac{E_r}{E_{blank}} = Ae^{j\alpha}. \quad (3.3.12)$$

This method of reconstruction is called "common mode rejection" because every term in (3.3.10) that has equal magnitude and phase on each of the four detectors is automatically subtracted by summation with the complex conjugate.

Additional noise terms can be added into the equations to account for the noise within the system. The considered noise terms include noise within the laser ($E_N$), and multiplicative fixed pattern noise terms that incorporate imperfections within the beamsplitters and multiple reflections in the optics ($E_C$). The field collected by each of the four CCDs has its own fixed pattern noise term indicated by the number following the "C" in the subscript.

The equation for the electric field from the laser now includes a noise term ($E_N$) from fluctuations within the laser cavity:

$$E_L = E_0 e^{j(\omega t + \phi)} + E_N e^{j\omega t}. \quad (3.4.1)$$

The fiber-coupled beamsplitter can be considered lossless so no additional loss term is added to the fields when they are split into the reference and signal paths. After the reference beam is converted into circular polarization by the quarter-wave plate and the signal beam is linearly polarized, the fields become:

$$E_{ref} = \frac{1}{\sqrt{2}} (E_R e^{j(\omega t + \phi)} + E_N e^{j\omega t}) \cdot (\vec{x} + j\vec{y}) \quad (3.4.2)$$

$$E_{sig} = \frac{1}{\sqrt{2}} (E_S e^{j(\omega t + \phi)} + E_N e^{j\omega t}) \cdot (\vec{x} + \vec{y}). \quad (3.4.3)$$

The linearly polarized signal beam passes through the sample on the microscope inducing a magnitude and phase ($Ae^{j\alpha}$) into (3.4.3):

$$E_{sig} = \frac{1}{\sqrt{2}} (AE_S e^{j(\omega t + \phi + \alpha)} + AE_N e^{j(\omega t + \alpha)}) \cdot (\vec{x} + \vec{y}). \quad (3.4.4)$$

The two fields in (3.4.3) and (3.4.4) enter the recombining beamsplitter and the mixed fields:

$$\frac{1}{\sqrt{2}} (\vec{E}_{sig} + \vec{E}_{ref}) \quad (3.4.5)$$

$$\frac{1}{\sqrt{2}} (\vec{E}_{sig} - \vec{E}_{ref}) \quad (3.4.6)$$

are output along two paths. Each of the fields is separated into its conjugate components by polarizing beamsplitters and captured by separate detectors. A multiplicative fixed pattern noise ($E_C$) is introduced into each field from imperfections in the individual beamsplitters and cameras. The resulting intensities of the mixed fields (M) captured by the detectors are:

$$M_0 = \left| \frac{1}{2} (AE_S e^{j(\omega t + \phi + \alpha)} + AE_N e^{j(\omega t + \alpha)} + E_R e^{j(\omega t + \phi)} + E_N e^{j\omega t}) E_{C0} \right|^2 \quad (3.4.7)$$

$$= \frac{1}{4} E_{C0}^2 (A^2 E_S E_S^* + A^2 E_S E_N^* e^{j\phi} + AE_S E_R^* e^{j\alpha} + AE_S E_N^* e^{j(\phi + \alpha)} + A^2 E_N E_S^* e^{-j\phi} + A^2 E_N E_N^* + AE_N E_R^* e^{-j(\phi - \alpha)} + AE_N E_N^* e^{j\alpha} + AE_R E_S^* e^{-j\alpha} + AE_R E_N^* e^{j(\phi - \alpha)} + E_R E_R^* + E_R E_N^* e^{j\phi} + AE_N E_S^* e^{-j(\phi + \alpha)} + AE_N E_N^* e^{-j\alpha} + E_N E_R^* e^{-j\phi} + E_N E_N^*)$$

$$M_1 = \left| \frac{1}{2} (AE_S e^{j(\omega t + \phi + \alpha)} + AE_N e^{j(\omega t + \alpha)} + jE_R e^{j(\omega t + \phi)} + jE_N e^{j\omega t}) E_{C1} \right|^2 \quad (3.4.8)$$

$$= \frac{1}{4} E_{C1}^2 (A^2 E_S E_S^* + A^2 E_S E_N^* e^{j\phi} - jAE_S E_R^* e^{j\alpha} - jAE_S E_N^* e^{j(\phi + \alpha)} + A^2 E_N E_S^* e^{-j\phi} + A^2 E_N E_N^* - jAE_N E_R^* e^{-j(\phi - \alpha)} - jAE_N E_N^* e^{j\alpha} + jAE_R E_S^* e^{-j\alpha} + jAE_R E_N^* e^{j(\phi - \alpha)} + E_R E_R^* + E_R E_N^* e^{j(\phi)} + jAE_N E_S^* e^{-j(\phi + \alpha)} + jAE_N E_N^* e^{-j\alpha} + E_N E_R^* e^{-j\phi} + E_N E_N^*)$$

$$M_2 = \left| \frac{1}{2} (AE_S e^{j(\omega t + \phi + \alpha)} + AE_N e^{j(\omega t + \alpha)} - E_R e^{j(\omega t + \phi)} - E_N e^{j\omega t}) E_{C2} \right|^2 \quad (3.4.9)$$

$$= \frac{1}{4} E_{C2}^2 (A^2 E_S E_S^* + A^2 E_S E_N^* e^{j\phi} - AE_S E_R^* e^{j\alpha} - AE_S E_N^* e^{j(\phi + \alpha)} + A^2 E_N E_S^* e^{-j\phi} + A^2 E_N E_N^* - AE_N E_R^* e^{-j(\phi - \alpha)} - AE_N E_N^* e^{j\alpha} + -AE_R E_S^* e^{-j\alpha} - AE_R E_N^* e^{j(\phi - \alpha)} + E_R E_R^* + E_R E_N^* e^{j\phi} + -AE_N E_S^* e^{-j(\phi + \alpha)} - AE_N E_N^* e^{-j\alpha} + E_N E_R^* e^{-j\phi} + E_N E_N^*)$$

$$M_3 = \left| \frac{1}{2} (AE_S e^{j(\omega t + \phi + \alpha)} + AE_N e^{j(\omega t + \alpha)} - jE_R e^{j(\omega t + \phi)} - jE_N e^{j\omega t}) E_{C3} \right|^2 \quad (3.4.10)$$

$$= \frac{1}{4} E_{C1}^2 (A^2 E_S E_S^* + A^2 E_S E_N^* e^{j\phi} + jAE_S E_R^* e^{j\alpha} + jAE_S E_N^* e^{j(\phi + \alpha)} + A^2 E_N E_S^* e^{-j\phi} + A^2 E_N E_N^* + jAE_N E_R^* e^{-j(\phi - \alpha)} + jAE_N E_N^* e^{j\alpha} + -jAE_R E_S^* e^{-j\alpha} - jAE_R E_N^* e^{j(\phi - \alpha)} + E_R E_R^* + E_R E_N^* e^{j\phi} + -jAE_N E_S^* e^{-j(\phi + \alpha)} - jAE_N E_N^* e^{-j\alpha} + E_N E_R^* e^{-j\phi} + E_N E_N^*).$$

Blocking the signal path before the recombining beamsplitter results in images of the pure reference (R). The reference images for each detector with the associated square root of each are:

$$R_0 = \left| \frac{1}{2} (E_R e^{j(\omega t + \phi)} + E_N e^{j\omega t}) E_{C0} \right|^2 = \quad (3.4.11)$$

$$\frac{1}{4} E_{C0}^2 (E_R E_R^* + E_R E_N^* e^{j\phi} + E_N E_R^* e^{-j\phi} + E_N E_N^*)$$

$$\sqrt{R_0} = \frac{1}{2} E_{C0} |E_R + E_N| \quad (3.4.12)$$

$$R_1 = \left| j \frac{1}{2} (E_R e^{j(\omega t + \phi)} + E_N e^{j\omega t}) E_{C1} \right|^2 = \quad (3.4.13)$$

$$\frac{1}{4} E_{C1}^2 (E_R E_R^* + E_R E_N^* e^{j\phi} + E_N E_R^* e^{-j\phi} + E_N E_N^*)$$

$$\sqrt{R_1} = \frac{1}{2}E_{C1}|E_R + E_N| \quad (3.4.14)$$

$$R_2 = \left|\frac{1}{2}(E_R e^{j(\omega t+\phi)} + E_N e^{j\omega t})E_{C2}\right|^2 = \quad (3.4.15)$$

$$\frac{1}{4}E_{C2}^*(E_R E_R^* + E_R E_N^* e^{j\phi} + E_N E_R^* e^{-j\phi} + E_N E_N^*)$$

$$\sqrt{R_2} = \frac{1}{2}E_{C2}|E_R + E_N| \quad (3.4.16)$$

$$R_3 = \left|j\frac{1}{2}(E_R e^{j(\omega t+\phi)} + E_N e^{j\omega t})E_{C3}\right|^2 = \quad (3.4.17)$$

$$\frac{1}{4}E_{C3}^2(E_R E_R^* + E_R E_N^* e^{j\phi} + E_N E_R^* e^{-j\phi} + E_N E_N^*)$$

$$\sqrt{R_3} = \frac{1}{2}E_{C3}|E_R + E_N|. \quad (3.4.18)$$

Then blocking the reference before the recombining beamsplitter and capturing images of the pure signal (S) gives:

$$S_0 = \left|\frac{1}{2}(AE_S e^{j(\omega t+\phi+\alpha)} + AE_N e^{j(\omega t+\alpha)})E_{C0}\right|^2 = \quad (3.4.19)$$

$$\frac{1}{4}E_{C0}^2(A^2 E_S E_S^* + A^2 E_S E_N^* e^{j\phi} + A^2 E_N E_S^* e^{-j\phi} + A^2 E_N E_N^*)$$

$$S_1 = \left|\frac{1}{2}(AE_S e^{j(\omega t+\phi+\alpha)} + AE_N e^{j(\omega t+\alpha)})E_{C1}\right|^2 = \quad (3.4.20)$$

$$\frac{1}{4}E_{C1}^2(A^2 E_S E_S^* + A^2 E_S E_N^* e^{j\phi} + A^2 E_N E_S^* e^{-j\phi} + A^2 E_N E_N^*)$$

$$S_2 = \left|\frac{1}{2}(AE_S e^{j(\omega t+\phi+\alpha)} + AE_N e^{j(\omega t+\alpha)})E_{C2}\right|^2 = \quad (3.4.21)$$

$$\frac{1}{4}E_{C2}^2(A^2 E_S E_S^* + A^2 E_S E_N^* e^{j\phi} + A^2 E_N E_S^* e^{-j\phi} + A^2 E_N E_N^*)$$

$$S_3 = \left|\frac{1}{2}(AE_S e^{j(\omega t+\phi+\alpha)} + AE_N e^{j(\omega t+\alpha)})E_{C3}\right|^2 = \quad (3.4.22)$$

$$\frac{1}{4}E_{C3}^2(A^2 E_S E_S^* + A^2 E_S E_N^* e^{j\phi} + A^2 E_N E_S^* e^{-j\phi} + A^2 E_N E_N^*).$$

The optical quadrature image is reconstructed with the summation:

$$E_r = \sum_{n=0}^{3} j^n \frac{M_n - R_n - S_n}{\sqrt{R_n}} = \quad (3.4.23)$$

$$E_r = \frac{1}{2}\left(\frac{AE_S E_R^* e^{j\alpha}(E_{C0} + E_{C1} + E_{C2} + E_{C3}) + AE_S^* E_R e^{-j\alpha}(E_{C0} - E_{C1} + E_{C2} - E_{C3})}{|E_R + E_N|} + \right. \quad (3.4.24)$$

$$\frac{(AE_S E_N^* e^{j(\phi+\alpha)} + AE_N e^{j\alpha}(E_R e^{j\phi} + E_N)^*) \cdot (E_{C0} + E_{C1} + E_{C2} + E_{C3})}{|E_R + E_N|} +$$

$$\left.\frac{(AE_S^* E_N e^{-j(\phi+\alpha)} + AE_N^* e^{-j\alpha}(E_R e^{j\phi} + E_N)) \cdot (E_{C0} - E_{C1} + E_{C2} - E_{C3})}{|E_R + E_N|}\right).$$

Separating the signal (G) and noise (g) terms in (3.4.24)

$$G = AE_S E_R^* e^{j\alpha}(E_{C1} + E_{C2} + E_{C3}) + \quad (3.4.25)$$
$$AE_S^* E_R e^{-j\alpha}(E_{C0} - E_{C1} + E_{C2} - E_{C3})$$

$$g = (AE_S E_N^* e^{j(\phi+\alpha)} + AE_N e^{j\alpha}(E_R e^{j\phi} + E_N)^*) \cdot \quad (3.4.26)$$
$$(E_{C0} + E_{C1} + E_{C2} + E_{C3}) +$$
$$(AE_S^* E_N e^{-j(\phi+\alpha)} + AE_N^* e^{-j\alpha}(E_R e^{j\phi} + E_N)) \cdot$$
$$(E_{C0} - E_{C1} + E_{C2} - E_{C3})$$

and substituting them back into (3.4.24) produces the simplified version of the sample image $$E_r = \frac{1}{2}\left(\frac{G}{|E_R + E_N|} + \frac{g}{|E_R + E_N|}\right). \quad (3.4.27)$$

A blank image is also constructed with the sample moved out of the field of view. Since the blank image is taken some time after the sample image, a new noise term is substituted into the field from the laser:

$$E_0 e^{j(\omega t+\phi)} + E_{BN} e^{j\omega t}. \quad (3.4.28)$$

The sample is moved out of the field of view and the mixed signal and reference image (BM), pure reference image (BR), and pure signal image (BS) are captured as previously described with the noise term of the blank image ($B_{BN}$) replacing the noise term in the sample image ($E_N$). The blank image is reconstructed using the summation:

$$E_{r,blank} = \sum_{n=0}^{3} j^n \frac{BM_n - BR_n - BS_n}{\sqrt{BR_n}} = \quad (3.4.29)$$

$$E_{r,blank} = \frac{1}{2} \begin{pmatrix} \frac{(E_S E_R^*(E_{C0} + E_{C1} + E_{C2} + E_{C3}) + E_S^* E_R(E_{C0} - E_{C1} + E_{C2} - E_{C3}))}{|E_R + E_{BN}|} + \\ \frac{(E_S E_{BN}^* e^{j\phi} + E_{BN}(E_R e^{j\phi} + E_{BN})^*) \cdot (E_{C0} + E_{C1} + E_{C2} + E_{C3})}{|E_R + E_{BN}|} + \\ \frac{(E_S^* E_{BN} e^{-j\phi} + E_{BN}^*(E_R e^{j\phi} + E_{BN})) \cdot (E_{C0} - E_{C1} + E_{C2} - E_{C3})}{|E_R + E_{BN}|} \end{pmatrix}. \quad (3.4.30)$$

Separating the signal terms (H) and the noise terms (h) in (3.4.30):

$$H = \quad (3.4.31)$$
$$E_S E_R^*(E_{C0} + E_{C1} + E_{C2} + E_{C3}) + E_S^* E_R(E_{C0} - E_{C1} + E_{C2} - E_{C3})$$

$$h = \quad (3.4.32)$$
$$(E_S E_{BN}^* e^{j\phi} + E_{BN}(E_R e^{j\phi} + E_{BN})^*) \cdot (E_{C0} + E_{C1} + E_{C2} + E_{C3}) +$$
$$(E_S^* E_{BN} e^{-j\phi} + E_{BN}^*(E_R e^{j\phi} + E_{BN})) \cdot (E_{C0} - E_{C1} + E_{C2} - E_{C3})$$

and substituting them back into (3.4.30) produces the simplified version of the blank image:

$$E_{r,blank} = \frac{1}{2}\left(\frac{H}{|E_R + E_{BN}|} + \frac{h}{|E_R + E_{BN}|}\right). \quad (3.4.33)$$

The sample image (3.4.27) is divided by the blank image (3.4.33) producing:

$$\frac{E_r}{E_{r,blank}} = \frac{|E_R + E_{BN}|}{|E_R + E_N|}\left(\frac{G+g}{H+h}\right) = \frac{|E_R + E_{BN}|}{|E_R + E_N|}\left(\frac{G+g}{H}\left(\frac{1}{1+h/H}\right)\right). \quad (3.4.34)$$

The Taylor series expansion $$\frac{1}{1+h/H} \approx 1 - h/H + (h/H)^2 \ldots \quad (3.4.35)$$

is substituted into (3.4.34) to separate the sample terms from the noise terms. The noise terms are very close to zero because they are dependent on the noise fluctuations in the laser. Therefore, all noise terms of order two and above will be assumed to be zero. This leaves the first two terms of (3.4.35) that are substituted into (3.4.34)

$$\frac{E_r}{E_{r,blank}} = \frac{|E_R + E_{BN}|}{|E_R + E_N|}\left(\frac{G}{H}\left(1 - \frac{h}{H}\right) + \frac{g}{H}\right) \quad (3.4.36)$$

where $$G = AE_S E_R^* e^{j\alpha}(E_{C0} + E_{C1} + E_{C2} + E_{C3}) + \quad (3.4.37)$$
$$AE_S^* E_R e^{-j\alpha}(E_{C0} - E_{C1} + E_{C2} - E_{C3})$$

$$g = (AE_S E_N^* e^{j(\phi+\alpha)} + AE_N e^{j\alpha}(E_R e^{j\phi} + E_N)^*) \cdot \quad (3.4.38)$$
$$(E_{C0} + E_{C1} + E_{C2} + E_{C3}) +$$
$$(AE_S^* E_N e^{-j(\phi+\alpha)} + AE_N^* e^{-j\alpha}(E_R e^{j\phi} + E_N)) \cdot$$
$$(E_{C0} - E_{C1} + E_{C2} - E_{C3})$$

$$H = \quad (3.4.39)$$
$$E_S E_R^*(E_{C0} + E_{C1} + E_{C2} + E_{C3}) + E_S^* E_R(E_{C0} - E_{C1} + E_{C2} - E_{C3})$$

$$h = \quad (3.4.40)$$
$$(E_S E_{BN}^* e^{j\phi} + E_{BN}(E_R e^{j\phi} + E_{BN})^*) \cdot (E_{C0} + E_{C1} + E_{C2} + E_{C3}) +$$
$$(E_S^* E_{BN} e^{-j\phi} + E_{BN}^*(E_R e^{j\phi} + E_{BN})) \cdot (E_{C0} - E_{C1} + E_{C2} - E_{C3}).$$

To verify (3.4.36), we remove the noise terms and show that we return to our original noise-free expression Eq. (3.2.28). To start, the expansion is expressed with no fixed pattern noise. If there was no fixed pattern noise in the paths:

$$E_{C0} = E_{C1} = E_{C2} = E_{C3} = 1. \quad (3.4.41)$$

Substituting (3.4.41) into (3.4.37), (3.4.38), (3.4.39), and (3.4.40):

$$G = 4AE_S E_R^* e^{j\alpha} \quad (3.4.42)$$

$$g = 4(AE_S E_N^* e^{j(\phi+\alpha)} + AE_N e^{j\alpha}(E_R e^{j\phi} + E_N)^*) \quad (3.4.43)$$

$$H = 4E_S E_R^* \quad (3.4.44)$$

$$h = 4(E_S E_{BN}^* e^{j\phi} + E_{BN}(E_R e^{j\phi} + E_{BN})^*). \quad (3.4.45)$$

With these new terms (3.4.36) becomes:

$$\frac{E_r}{E_{r,blank}} = \frac{|E_R + E_{BN}|}{|E_R + E_N|} \quad (3.4.46)$$

$$\left(Ae^{j\alpha} + Ae^{j\alpha}\left(\frac{(E_S e^{j\phi}(E_N^* - E_{BN}^*) + E_R^* e^{-j\phi}(E_N - E_{BN}) + E_N E_N^* - E_{BN} E_{BN}^*)}{E_S E_R^*}\right)\right).$$

Then, assuming there are no noise fluctuations in the laser, $E_N = E_{BN}$ and:

$$\frac{E_r}{E_{r,blank}} = Ae^{j\alpha} \qquad (3.4.47)$$

therefore confirming the expansion in (3.4.36).

The image of phase is created from the calculated phase ($\alpha$) in Eq. (3.4.47). However, the image is not quantitative because $2\pi$ ambiguities are produced from the phase cycling between 0 and $2\pi$. A two-dimensional phase unwrapping algorithm is used to remove these ambiguities and produce an image of total phase that can be transformed into an image of optical path length deviation (Townsend, et. al., 2003).

Differential Interference Microscopy

The method of differential interference contrast (DIC) for microscopic observation of phase objects was invented by George Nomarski in 1953 (Nomarski, 1953; Nomarski, 1955; Allen et al., 1969; Mansuripur, 2002). A phase object, such as a glass bead or a phase grating, can only be observed in a conventional microscope by diffraction of the illuminated light along any edges within the sample caused by second order effects. No detail within the sample can be observed because there are only changes in the phase of the illuminating light and not a change in amplitude that can be detected by the human eye or conventional detectors. DIC microscopy produces images from the gradient of optical path lengths along a given direction, in order to provide contrast for varying changes in phase. A white light source is sheared in a Wollaston prism into reference and signal beams with a difference less than the spatial resolution of the microscope. When the two beams are recombined with another Wollaston prism, the interference will result in higher or lower intensity than the background, depending on the increase or decrease in the difference of optical path length along the shear direction between the two paths. As the gradient of optical path length difference increases, the contrast within the image increases.

A microscope with a single camera port can be modified to acquire images of differential interference contrast (DIC), optical quadrature microscopy, and optionally epi-fluorescence, which is useful to validate the accuracy of the cell counting method according to the invention. FIG. 22 shows an example of a configuration in which an OQM set up has been modified to add DIC and epifluorescence. Signal path mirror 44 has been replaced with Dichroic beamsplitter 1 (82), which is a notch filter that allows light from the laser providing illumination for the OQM to enter the optical path with in the microscope that is directed through the sample. Dichroic beamsplitter 1 also allows as much light as possible from halogen lamp 80, the illumination source for DIC, into the same pathway through the sample and the optical components required for DIC. In a set up using 633 nm laser light for OQM, for example, Dichroic 1 can be have a 50 nm notch filter centered at approximately 633 nm; however, other filter windows could be used, such as for example approximately 10 nm, 20 nm, or 100 nm, or any value in the range of about 10-100 nm. The optical components for DIC, which include linear polarizer 83, prisms 84 and 85, and analyzer 86, and for epi-fluorescence, including mercury lamp 88 and filter cube 87, are positioned within microscope base 100 and can be removed from the signal path during acquisition of an OQM image in order to prevent light losses associated with these components. Dichroic beamsplitter 2 (90) diverts light for a DIC or epi-fluorescence image to CCD, 74 (camera 4) or another imaging device. Dichroic beamsplitter 2 can be, e.g., a 50 nm bandpass filter centered around the wavelength of the OQM illumination source, such as 633 nm. Other bandpass windows could be used, such as for example approximately 10 nm, 20 nm, or 100 nm, or any value in the range of about 10-100 nm. Preferably, Dichroic beamsplitters 1 and 2 are chosen to maximize the amount of light from the illumination source reaching the sample and to maximize the amount of light transmitted by or emitted by the sample reaching CCD 74, while still allowing the passage of light from laser 20 to pass along the signal path without disruption during OQM.

Registration of Images

Live embryos or other tissue specimens can be imaged in a liquid culture medium allowing the sample to float. This introduces a problem with registration between the different imaging modes because a z-stack is collected with epi-fluorescence to determine the ground truth number of cells, requiring the microscope stage to be physically moved up and down along the z-axis. A focused image can be collected in each mode before stacks of images are collected to ensure the best registration between modes. A Matlab routine can be used to display images from both the optical quadrature and DIC modes. Matching landmarks within the sample, (e.g., an embryo) can be manually selected in both images to ensure a good registration. Points outside the embryo cannot be used because they may not move as much as the embryo, if at all. The easiest points to select are generally places where cells begin to overlap and an intersection can be seen.

Since the optical quadrature image shows the total phase of the beam going through the embryo, and the exact overlap position of cells is unknown, the perimeter of the sample is preferably used to register the phase image to the DIC image. FIG. 3 shows the selected points along the perimeter of a mouse embryo used to register the DIC image to the optical quadrature image.

To register an image, the input points, base points, input image (image being registered) and base image (reference registration image) can be input into a cross-correlation function, for example, using Matlab. One such cross-correlation function, cpcorr, defines 11-by-11 regions around each control point in the input image and around the matching control point in the base image, and then calculates the correlation between the values at each pixel in the region. Next, the cpcorr function looks for the position with the highest correlation value and uses this as the optimal position for the control point. The cpcorr function only moves control points up to 4 pixels based on the results of the cross correlation. If the function cannot correlate some of the control points, it returns the unmodified values.

Inputting the modified control points into the Matlab function cp2tform produces an affine spatial transformation. During acquisition of the data set the embryo may rotate about the z-axis but does not change shape within the time between images. From this observation a linear conformal transformation is sufficient. The most general linear transformation can be described by the equation:

$$\begin{pmatrix} x_1 \\ y_1 \end{pmatrix} = \begin{pmatrix} a & b \\ c & d \end{pmatrix} \cdot \begin{pmatrix} x_0 \\ y_0 \end{pmatrix} + \begin{pmatrix} e \\ f \end{pmatrix} \qquad (5.1.1)$$

where $x_1$ and $y_1$ are the transformed points, $x_0$ and $y_0$ are the base points, e is the translation in the x direction and f is the translation in the y direction. The equation defining a conformal linear transformation defines the matrix:

$$\begin{pmatrix} a & b \\ c & d \end{pmatrix} = sc \cdot \begin{pmatrix} \cos(\theta) & \sin(\theta) \\ -\sin(\theta) & \cos(\theta) \end{pmatrix}, \quad (5.1.2)$$

where sc is the scale constant for both the x and y directions and θ is the angle of rotation.

The affine transformation is used when the image exhibits stretching and shearing. An affine transform is the most general expression for (5.1.1) with the matrix in (5.1.2) set to $$\begin{pmatrix} a & b \\ c & d \end{pmatrix} = \begin{pmatrix} sc_x & 0 \\ 0 & sc_y \end{pmatrix} \cdot \begin{pmatrix} \cos(\theta) & \sin(\theta) \\ \sin(\theta) & \cos(\theta) \end{pmatrix} \cdot \begin{pmatrix} 1 & sh \\ 0 & 1 \end{pmatrix} \quad (5.1.3)$$

where $sc_x$ is the scaling constant for the x direction, $sc_y$ is the scaling constant for the y direction, and sh is the shear constant. If the embryo is only rotated about the z-axis and translated, the product of the matrix in (5.1.3) with its complex conjugate transpose must be approximately equal to the identity matrix. In order for this to be true the following must be satisfied:

$$sc_x = sc_y = 1 \quad (5.1.4)$$

$$sh = 0. \quad (5.1.5)$$

Satisfying (5.1.5) shows that no shear exists between the two images, and satisfying (5.1.4) shows that there is no scale change (i.e. the embryo does not change size or shape).

Finally, the input image can be registered to the base image by applying the affine transformation with the Matlab function imtransform.

Maximum Optical Path Length Deviation of a Single Cell

The optical quadrature image of phase is converted to an image of optical path length with the equation $$\phi = \frac{2\pi \cdot nd}{\lambda} \quad (5.2.1)$$

where ϕ is the phase, λ is the wavelength of the laser, n is the index of refraction of the sample, d is the thickness of the sample, and the product of the index of refraction and thickness of the sample (nd) is the optical path length. The optical path lengths in the resultant image (OPD image) are compared as optical path length deviations since the total index of refraction and thickness of the sample are unknown. The OPD image can be multiplied by $10^6$ to remove all decimals from the color scale, because the optical path length deviation of an embryo is on the order of micrometers. The index of refraction of the culture medium was determined to be approximately 1.35. Assuming the index of refraction of the cell is approximately equal to 1.37, which is the index of refraction of the cytoplasm (Dunn, et. al., 1997), the deviation of the index of refraction is equal to 0.02. If the thickness of the embryo is estimated as 100 micrometers, the maximum optical path length deviation (nd) of the sample should be approximately 2 micrometers. This corresponds to the approximate maximum optical path length deviations found in the OPD images.

The OPD and DIC images are observed side-by-side to identify an area of cells that are not overlapped and are approximately the same size as the other visible cells. In FIG. 4 cells of approximately the same size are overlapped with an approximate optical path length deviation of 1.5 μm or more.

To determine the maximum optical path length deviation of a single cell, the optical path length deviations are plotted along a line going through the center of the cell. Ideally, a cell with no overlap with other cells would be chosen, but this is hardly possible in embryos beyond the eight cell stage. The cell chosen should be generally the same size as the other cells, with at least half of the cell showing no overlap with other cells. For example, in FIG. 4 the cell in the upper right region of the sample was chosen because approximately ¾ of the cell is not overlapped, and the cell is approximately the same size as the rest of the cells that can be seen. The cell in the upper left region was not chosen because it is much larger than the rest of the cells in the image, and the OPD image shows some areas in the center of the cell with an OPD value of approximately 1.5 μm, probably representing cell overlap. It is possible that larger cells will have on average a larger optical path length deviation. However, in a preferred embodiment of the present cell counting method, a single maximum optical path length deviation is applied for all the cells in the sample; in this case it is preferable to choose a cell that is approximately the same size as the other cells.

The normal line on the OPD image in FIG. 5A can be created by manually selecting a starting and ending point on the OPD image. The starting point should be in the culture medium region, outside the zona pellucida (zona), which surrounds the developing cells. If the starting point is too close to the zona it will be too difficult to determine the difference in optical path length deviation between the zona and the culture medium, which is important for selection of the minimum optical path length deviation. The ending point should be chosen within the overlapped region of cells, so the estimated maximum optical path length deviation can be easily seen.

The plotted points in FIG. 5B are labeled according to their biological origins. At the bottom of the plot is a noisy line of nearly constant optical path length deviation representing the optical path length of the culture medium. This section may be more or less noisy depending on whether the interference rings were divided out correctly by the blank image in the original construction of the optical quadrature image. If the interference rings in the blank image were not in the same location as in the mixed image, the interference rings will be seen in the final image. As the normal line starts to go into the zona pellucida, the optical path length deviation begins to increase following a parabolic shape toward a maximum point. Since the zona is like a shell of a certain thickness with a higher index of refraction than the culture medium, the optical path length deviation will begin to decrease once the normal line passes through that thickness and remain approximately constant until it reaches the cell. If the cell is pressed against the zona, the decrease will be small and possibly unnoticeable. If the cell is some distance from the zona, the optical path length deviation will decrease to the deviation caused by the top and bottom thicknesses of the zona. At the present time it is uncertain what makes up the fluid-filled perivitelline space, which is between the zona pellucida and the developing cells. For the present analysis, it is assumed that the perivitelline space has the same index of refraction as the culture medium. This assumption means the optical path length deviation will not be changed by the amount of perivitelline space. Once the line reaches the cell, the optical path length deviation increases again in a parabolic fashion as expected. If the cell is not overlapped, a full parabola will be seen. However, beyond the eight cell stage the parabola will only be seen for the region of a cell that is not overlapped. Once a zone of cell overlap is reached, the optical path length deviation will increase above the expected parabolic shape pertaining to the optical path length deviation of a single cell.

In order to obtain the maximum optical path length deviation of a single cell, a parabolic fit can be obtained using several points along the parabolic region of the optical path length plot. For example, six points were selected along the plot in FIG. 5B.

The first point selected was the minimum optical path length deviation of one cell, which physically represents the optical path length deviation from the culture medium plus contributions from the top and bottom of the zona pellucida in the particular area of the cell in question. In one embodiment, the minimum optical path length deviation is approximated as ¾ of the maximum optical path length deviation of the zona pellucida before the cell. The color scale representing optical path length deviation can be rescaled using the minimum optical path length deviation of a cell as the lowest value on the scale. This has the visual effect of subtracting out or reducing contributions due to the culture medium and the zona pellucida. FIG. 6A shows the OPD image of a mouse embryo with the original color scale. For comparison, FIG. 6B shows the OPD image after the minimum color scale was reset to the selected minimum optical path length deviation (in this case, ¾ of the maximum optical path length deviation of the zona pellucida).

The remaining five points were selected along the parabolic region corresponding to the non-overlapped region of the selected cell. A parabolic fit to the data points was obtained, representing the optical path length deviation of a single cell. The five points were input into the Matlab function polyfit to determine the three coefficients of a parabolic equation in the form $$y = P_1 \cdot x^2 + P_2 \cdot x + P_3. \tag{5.2.1}$$

The parabola obtained is plotted in FIG. 7A. The actual OPD data for the cell can be plotted alongside, so as to evaluate the appropriateness of the parabolic fit. For example, FIG. 7B presents the same curve as shown in FIG. 5B.

The total optical path length deviation of a single cell can be obtained as the difference between the maximum point along the fitted parabola and the selected minimum optical path length deviation. This value can be used to define twice the radius in the z-direction for the model ellipsoidal cell described below. The maximum optical path length deviation of the overall OPD image also can be recorded and used to set the maximum of the optical path length deviation color scale. In a preferred embodiment, the remaining steps in the cell counting procedure use OPD images all of which have the minimum color scale value set to the minimum optical path length deviation of a single cell and the maximum color scale value set to maximum optical path length deviation of the first OPD image.

Elliptical Fit to Cell Boundary

The OPD and DIC images can be observed side-by-side to determine the elliptical boundary of a cell. If the cell boundaries can be found on the DIC image, an annotated ellipse is added to the DIC image.

In a preferred embodiment, points are selected for the center of the ellipse (center), the maximum radius of the ellipse (max), and the minimum radius of the ellipse (min). The minimum (a) and maximum (b) radii are calculated by the equations $$a = \sqrt{(\min_{columns} - center_{columns})^2 + (\min_{rows} - center_{rows})^2} \tag{5.3.1}$$

$$b = \sqrt{(\max_{columns} - center_{columns})^2 + (\max_{rows} - center_{rows})^2} \tag{5.3.2}$$

where the subscript rows and columns designate the row and column locations within the image. The equation for an ellipse in Cartesian coordinates in terms of a and b is $$\frac{x^2}{a^2} + \frac{y^2}{b^2} = 1. \tag{5.3.3}$$

Substituting $$x = r\cos(\theta) \tag{5.3.4}$$

$$y = r\sin(\theta) \tag{5.3.5}$$

and rearranging like terms, the equation for an ellipse in polar coordinates and in terms of its radius (r) is $$r = \sqrt{\frac{a^2 * b^2}{b^2 \cos(\vartheta) + a^2 \sin(\vartheta)}}. \tag{5.3.6}$$

By substituting a and b from (5.3.1) and (5.3.2), and an array from 0 to π for θ, r becomes an array containing the varying radius of a non-rotated ellipse centered at the point center for angles between 0 and π. The number of radii lengths within r is dependent on the increment chosen between 0 and π, so if an increment of 0.1 is chosen there will be 32 radii within r. This array is used to create the rotated ellipse after the rotation angle is calculated.

Figure 8:
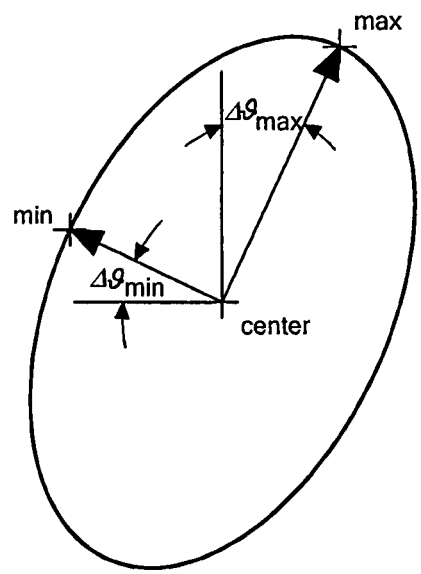
FIG. 8 shows an ellipse representing a cell boundary, with labeled points center, max and min selected by the user and the angle for the minimum radius ($\Delta\theta_{min}$) and the maximum radius ($\Delta\theta_{max}$). The overall rotation angle for the created ellipse ($\Delta\theta$) is calculated as the average of $\Delta\theta_{min}$ and $\Delta\theta_{max}$.
Figure 9:
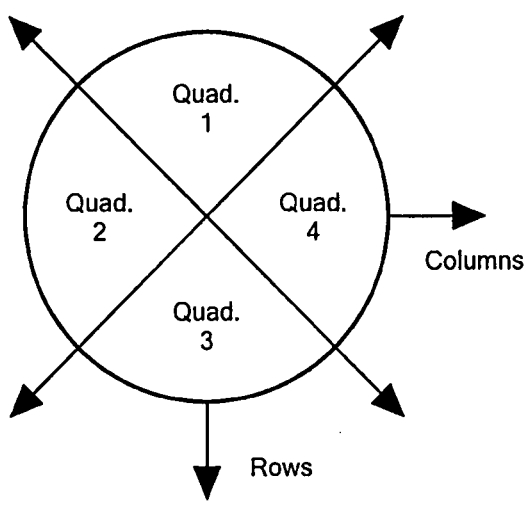
FIG. 9 shows quadrants rotated by $\pi/4$ to determine the inverse tangent of the row and column distances from the point center.

An if-test described by (5.3.7) can be applied to determine the angle of rotation for the minimum radius ($\Delta\theta_{min}$) and the maximum radius ($\Delta\theta_{max}$) as seen in FIG. 8. The average of the two can be taken to establish the overall angle of rotation ($\Delta\theta$) for the ellipse because if the radii are chosen by hand, they will not differ by exactly π/4. To use the inverse tangent for determining the rotation angles, the quadrant location of one of the radii must be known. However, the quadrants must be rotated by π/4 as shown in FIG. 9.

Figure 10:
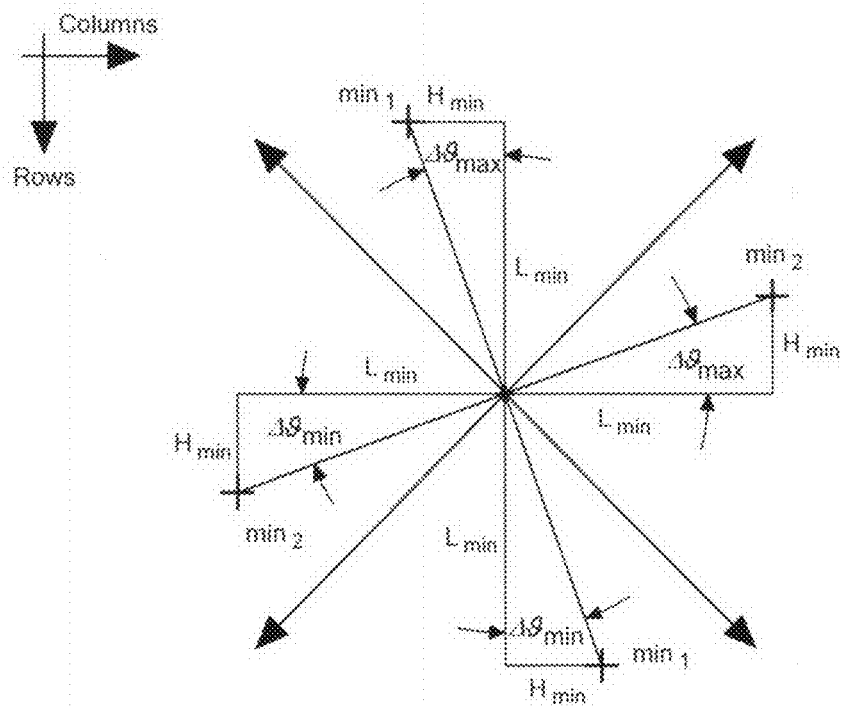
FIG. 10 shows a graphical representation of the two options for determining the inverse tangent for the rotation angle of the minimum and maximum radii.

Since the inverse tangent is symmetric over 7 there are two options for the quadrant location. So, if $$\left| \frac{\min_{rows} - center_{rows}}{\min_{columns} - center_{columns}} \right| > 1, \tag{5.3.7}$$

the location of the minimum radius is in Quadrant 1 or Quadrant 3 ($min_1$ in FIG. 10). Then $\Delta\theta_{min}$ can be determined by the equations $$L_{min} = \min_{rows} - center_{rows} \tag{5.3.8}$$

$$H_{min} = \min_{columns} - center_{columns} \tag{5.3.9}$$

$$\Delta\vartheta_{min} = -\arctan\left(\frac{H_{min}}{L_{min}}\right), \tag{5.3.10}$$

where $L_{min}$ is the length of the minimum radius vector, and $H_{min}$ is the height of the minimum radius vector as seen in FIG. 10. The corresponding $\Delta\theta_{max}$ is then calculated by the equations:

$$L_{max} = \max_{columns} - center_{columns} \quad (5.3.11)$$

$$H_{max} = \max_{rows} - center_{rows} \quad (5.3.12)$$

$$\Delta\vartheta_{max} = \arctan\left(\frac{H_{max}}{L_{max}}\right). \quad (5.3.13)$$

Either (5.3.10) or (5.3.13) must be negative, but the sign of (5.3.10) must match the sign of the array for the rotation angle ($\Delta\theta_{rot}$). Since the points are selected manually and the max and min points will never differ by exactly $\pi/2$, the rotation angle ($\Delta\theta$) is calculated as the average rotation angle of the minimum and maximum radii:

$$\Delta\vartheta = \frac{\Delta\vartheta_{max} + \Delta\vartheta_{min}}{2}. \quad (5.3.14)$$

If the minimum radius is in Quadrant 2 or Quadrant 4 ($min_2$ in FIG. 10), the only change to the equations for (5.3.8), (5.3.9), (5.3.11), and (5.3.12) are a change in subscripts from rows to columns and columns to rows.

An array of angles is created, like the array for the non-rotated ellipse, to determine the row and column locations of the points along the ellipse; however, the rotation angles ($\Delta\theta_{rot}$) range from $\Delta\theta$ to $\pi+\Delta\theta$, instead of 0 to $\pi$, and the sign is dependent on (5.3.10).

The row and column locations of half the ellipse are calculated by $$ellipse_{rows}(z) = center_{rows} + r(z)*\cos(\Delta\theta_{rot}) \quad (5.3.15)$$

$$ellipse_{columns}(z) = center_{columns} + r(z)*\sin(\Delta\theta_{rot}), \quad (5.3.16)$$

where z ranges from 1 to the total number of values in the array r (length(r)). The second half of the ellipse is then calculated by:

$$ellipse_{rows}(z+length(r)) = center_{rows} - r(z)*\cos(\Delta\theta_{rot}) \quad (5.3.17)$$

$$ellipse_{columns}(z+length(r)) = center_{columns} - r(z)*\sin(\Delta\theta_{rot}). \quad (5.3.18)$$

Ellipsoidal Model Cell

A zeros matrix can be created with the same number of rows and columns as the OPD image to simplify subtraction of the model cell from the OPD image. The equation for an ellipsoid in Cartesian coordinates is $$\frac{x^2}{a^2} + \frac{y^2}{b^2} + \frac{z^2}{c^2} = 1, \quad (5.4.1)$$

where x and y represent the row and column distances from the point center, c represents half the maximum optical path length deviation of a single cell, and (5.3.1) and (5.3.2) are used to determine a and b. Setting (5.4.1) in terms of z gives the equation for a non-rotated ellipsoid of optical path length deviation:

$$z = \sqrt{c^2 * \left(1 - \left(\frac{x^2}{a^2} + \frac{y^2}{b^2}\right)\right)}. \quad (5.4.2)$$

However, it was empirically determined that the optical path length deviation of mouse embryo cells may not follow a perfect ellipsoid. FIG. 11 shows the original OPD image of an embryo with an elliptical boundary around a cell and the color scale set from the minimum to the maximum optical path length deviation of the image.

FIG. 12A shows the image of an ellipsoidal model cell using (5.4.3) with the color scale set from 0 to the maximum optical path length deviation of a cell. The subtraction of that model cell from the original OPD image in FIG. 11 can be seen in FIG. 12B. A range of ellipsoids with increasing degrees of flattening are represented by the equations:

$$\frac{x^2}{a^2} + \frac{y^2}{b^2} + \frac{z}{c} = 1, \quad (5.4.3)$$

$$\left(\frac{x^2}{a^2} + \frac{y^2}{b^2}\right)^2 + \frac{z}{c} = 1, \quad (5.4.4)$$

$$\left(\frac{x^2}{a^2} + \frac{y^2}{b^2}\right)^{\frac{5}{2}} + \frac{z}{c} = 1, \quad (5.4.5)$$

$$\left(\frac{x^2}{a^2} + \frac{y^2}{b^2}\right)^4 + \frac{z}{c} = 1. \quad (5.4.6)$$

FIG. 13A corresponds to the ellipsoidal model cell of (5.4.5) with the color scale set from 0 to the maximum optical path length deviation of a cell, and FIG. 13B shows the subtraction of that model cell from the original OPD image in FIG. 11.

In FIG. 12B, pixels within the subtracted area have approximately the same value as the maximum optical path length deviation of the zona pellucida. In FIG. 13B, some pixels within the subtracted area are equal to the optical path length deviation of the culture medium, which would signify that there is no contribution in optical path length deviation from the top and bottom portions of the zona pellucida. Using an ellipsoidal model cell corresponding to (5.4.6), the pixel values that were equal to the optical path length deviation of the culture medium in FIG. 13B became less than the optical path length deviation of the culture medium (not shown), indicating too much optical path length deviation has been subtracted from the image. Since the zona pellucida obviously has some optical path length deviation greater than the culture medium, because otherwise the optical path length deviation would either be constant or decreasing around the cells, (5.4.4) was chosen as the best equation to create the model cell. These results are summarized in Table 1 with the plot of a cross section for each equation to show the general shape of half the ellipse.

TABLE 1

Summary of results for different equations of ellipsoidal model cells being subtracted from the OPD image

| Equation | Description | After subtraction | Plot |
|---|---|---|---|
| $\frac{x^2}{a^2} + \frac{y^2}{b^2} + \frac{z^2}{c^2} = 1$ | Perfect Ellipsoid | Apparent discontinuity along cell boudary | ⌒ |
| $\frac{x^2}{a^2} + \frac{y^2}{b^2} + \frac{z}{c} = 1$ | Parabolic Ellipsoid | Points outside the center of the cell still have an opd larger than the zona | ⌒ |
| $\left(\frac{x^2}{a^2} + \frac{y^2}{b^2}\right)^2 + \frac{z}{c} = 1$ | Slightly Flattened Ellipsoid | All points within cell boundary have opd less than zona but greater then culture medium. | ⌒ |

TABLE 1-continued

Summary of results for different equations of ellipsoidal model cells being subtracted from the OPD image

| Equation | Description | After subtraction | Plot |
|---|---|---|---|
| $\left(\frac{x^2}{a^2}+\frac{y^2}{b^2}\right)^{\frac{5}{2}}+\frac{z}{c}=1$ | Flattened Ellipsoid | Some points within cell boundary have opd equal to culture meduim. | |
| $\left(\frac{x^2}{a^2}+\frac{y^2}{b^2}\right)+\frac{z}{c}=1$ | Severely Flattened Ellipsoid | More points within cell boundary have opd less then culture meduim | |

The choice of a flattened ellipsoid as a cell boundary model is consistent with high resolution DIC images of mammalian embryos.

To begin rotation of the ellipsoid, the row and column distance of each pixel within the original ellipse to the point center is determined. An if-test can be used to confirm that no point is farther from the point center than the maximum radius calculated in (5.3.6). The angle of each point is calculated by the equation $$\phi = \arctan\left(\frac{Z}{Y}\right), \quad (5.4.7)$$

where Y is the distance in rows and Z is the distance in columns, seen in FIG. 14. If Z is negative, $\pi$ is added to $\phi_1$, and if Z is positive and Y is negative, $2\pi$ is added to $\phi_2$. The new angle for each point ($\phi_{new}$) is then determined by subtracting $\Delta\theta_{rot}$. The rotated ellipsoid is finally reconstructed using the sine and cosine of $\phi_{new}$ to determine the new location of each point within the original ellipsoid.

This method of rotation rotates the ellipsoid, but pixelation produces zeros within the ellipsoid. An if-test is used to look for zeros within the ellipsoid matrix and if the points in the next column and in the next row are greater than zero, the zero is filled with the average of the four surrounding points. This method of filling in zeros will not work for points on the bottom and right boundary of the ellipsoid, but the cell count will not be hindered if a few individual pixels on a cell boundary are not subtracted.

The ellipsoid matrix can then be subtracted from the OPD image, revealing either the optical path length deviation of the culture medium or additional cells underneath. Subsequently, the processes described above to determine the elliptical fit for a new cell boundary and a corresponding ellipsoidal model cell can be repeated. Each ellipsoidal model cell is subtracted from the previous, model cell-subtracted OPD image, making note of the cumulative number of cells subtracted. This process is continued until all detectable cell boundaries on the DIC image have been used, and the model cells corresponding to those cell boundaries all have been subtracted from the original OPD image.

Final Cell Boundaries on the OPD Image

If the maximum optical path length deviation of one cell is calculated correctly and the cell boundaries are selected appropriately on the DIC image, elliptical cells may be seen in the QPD image, particularly after subtraction of model cell images of the visible layer of cells, that could not be seen in the DIC image. After subtraction of all cell found with the DIC image, the remaining areas within the OPD image with optical path length deviations larger than the zona pellucida can be analyzed by size/shape and by optical path length deviation.

The cells within the subtracted OPD image should be in the same size range as the boundaries chosen within the DIC image. An elliptical area is twice the size of the previously modeled cells probably corresponds to two cells next to each other, applying the assumption that all cells of the embryo are of similar size and shape. If an elliptical area is smaller, it may be a polar body, a cell fragment, or part of a cell that was not correctly identified in an earlier step. The difference is cell radii should be within $$\sqrt[3]{\frac{1}{2}} = 0.793 \approx 20\%$$

of the previous cell boundaries, assuming the maximum change is caused by a recent cell division resulting in each daughter cell having half the total volume of the precursor cell.

Once all the cells are subtracted from the original OPD image, the final cell count is complete. Any remaining optical path length deviation in the OPD image can be analyzed for polar bodies and fragmentation if the subtraction is perfected.

Fragmentation sometimes happens in early cleavage-stage embryos, when the first blastomeres, or cells, divide (Gunasheela et al., 2003; Sathananthan et al., 2003). Fragmentation can be a sign of an unhealthy embryo, because embryos with fragments may also have multinucleated blastomeres with chromosomal aberrations (Gunasheela et al., 2003). However, time-lapsed video recording has shown that embryos may develop despite fragmentation, because fragments can be absorbed back into the remaining cells (Hardarson, et al., 2004; Hardarson, et al., 2002).

Another area of potential confusion in cell counting of embryos is the polar body. The first and second polar bodies are extruded as a result of meiotic division of the oocyte where the chromosomes duplicate, divide, and create a mature egg, or ovum, within the zona pellucida (Alberts et al., 1994). More than half of the first polar bodies degenerate within a few hours after ovulation, when the oocyte is released from the ovary, and the vast majority disintegrate during the next 12 hours in a mouse embryo (Wakayama & Yanagimachi, 1998; Evsikov & Evsikov, 1995). Normally, the chromosomes within both the first and second polar bodies degenerate without contributing to embryonic development (Wakayama & Yanagimachi, 1998) so an embryo could have one, two, or no polar bodies when imaged during different stages of development. The polar body generally has a circular boundary and is much smaller than the cells in embryos with lower cell numbers as seen in FIG. 15. However, once the embryo reaches higher cell numbers, cell division eventually produces blastomeres that are closer in size to any polar body that has not degenerated by this stage, as seen in FIG. 16.

Most polar bodies can be seen in the DIC image of an embryo. However it is possible for polar bodies to be hidden underneath other cells and therefore invisible in some DIC images. Observation of optical quadrature images has shown that the polar body may or may not have an optical path length deviation greater than the maximum optical path length deviation of a single cell. A polar body can have a greater optical path length deviation than that of a single cell in the early stages of development because the polar body has the same number of chromosomes as the ovum but within a smaller volume. However, if a higher refractive index (n) is multiplied with a smaller thickness (d), the resulting optical path length deviation can be approximately the same as for individual embryo cells.

Automation of the Cell Counting Method

A cell counting method according to the invention can require operator input at one or more stages, or can be partially or fully automated. For example, such steps as identifying and selecting cells, recognizing and fitting cell boundaries, and constructing a model cell can be taken with user input or decided by algorithm-driven software acting on the images. A cell counting method can be designed to require operator input at one or more key points in the process to enhance accuracy, or automated to enhance throughput.

Tissue samples for cell counting, such as living embryos, can be transferred to and from a viewing chamber by a human operator or by a robotic mechanism. The tissue sample can be centered in the field of view either by a human operator, or by a microscope having, e.g., electrical or hydraulic positioning mechanisms in each of the X, Y, and Z directions. The images of the tissue sample can be manually or automatically focused. Imaging modality of the microscope system can be switched manually or by computer control.

In order to automate image registration, a plurality of matching landmarks must be chosen in each of the first and second images. Points of cell boundary overlap are useful landmarks in embryos at the blastomere stage. These are easily identifiable as intersection points of the cell boundary arcs sensed using edge detection at the perimeter of the embryo. A feature extraction algorithm can be designed to identify the coordinates of a sufficient number (e.g., 2, 3, 4, 5, 6, 7, 8, 9, 10, or more) of cell boundary intersections at the perimeter of the embryo in each of the first and second images, and this set of points can be used for image registration. A variety of suitable transforms are known in the art for performing image registration, including linear conformal, affine, projective, polynomial, piecewise linear, and locally weighted mean. Examples of such transformation models can be found, for example, in the Matlab Image Processing Toolbox (42).

In some embodiments of the method of cell counting, the maximum OPD value of a cell is determined for a single cell at the periphery of the tissue sample, where only a minimal portion, preferably less than 50% of the area of the cell's image, overlaps with other cells in the sample. This value can be used to construct each of the model cells to be subtracted from the QPD image for cell counting purposes. The selection of the particular cell for maximum OPD determination can be performed by a human operator, or it can be automated. An edge detection algorithm can be employed to locate the outer border of the tissue sample, where it interfaces with the culture medium. Then, the centroid of the perimeter can be determined, and the distance from the centroid to each point of the perimeter can be calculated. The minima from this calculation will represent cell boundary intersection points. The center of each cell can be determined, and the phase value is plotted for a straight line extending from outside the cell (i.e., in the culture medium) through the cell center. Parabolic fits, e.g., by least squares analysis, can be performed for each cell, and the quality of the fits can be used to select the cell for maximum QPD determination.

Similarly, the selection of cells for modeling and subtraction can be performed manually, based on the operator's impression of the boundary image, or automatically. For automatic cell boundary detection, an edge detection algorithm can be applied to the second image, e.g., a DIC image. Suitable edge detection methods are known in the art; examples include Gonzalez, R. C., Woods, R. E., Eddins, S. L. *Digital Image Processing using MATLAB*, Upper Saddle River, N.J.: Pearson Prentice Hall, 2004, pp. 384-393.; and Kass, M., Witkin, A. P., Terzopoulos, D., *Snakes: Active contour models*, ICCV87, pp. 259-268, 1987. The boundary coordinates can be fitted to a formula representing the cell shape in cross-section. For example, depending on the tissue sample, an appropriate model for cell shape could be an ellipse, including a circle, a flattened ellipse, or a truncated ellipse. An automated system can either apply the same, e.g., user selected, cell shape model to all cells, or it can apply several different models to each cell and select the best fit. Once a cell boundary has been identified and fitted, and a maximum OPD value is known, then an ellipsoidal model cell can be determined and the model cell subtracted. Again, several choices are available for the shape of the model cell, including a sphere, a perfect ellipsoid, a parabolic ellipsoid, and an ellipsoid with various degrees of flattening. Either a predetermined shape can be applied to all cells, or each cell can be fitted to several shapes and the best fit selected.

Where no further cell boundaries can be detected reliably in the second (e.g., DIC) image, further cells can often be detected in the first image based on the phase signal. Algorithms such as edge detection and blob or feature detection can be used. [ L. Bretzner and T. Lindeberg (1998). "Feature Tracking with Automatic Selection of Spatial Scales". *Computer Vision and Image Understanding* 71: pp 385-392.; T. Lindeberg (1993). "Detecting Salient Blob-Like Image Structures and Their Scales with a Scale-Space Primal Sketch: A Method for Focus-of-Attention". *International Journal of Computer Vision* 11 (3): pp 283-318.; T. Lindeberg (1998). "Feature detection with automatic scale selection". *International Journal of Computer Vision* 30 (2): pp 77-116.; Damerval, C.; Meignen, S., Blob Detection With Wavelet Maxima Lines, *Signal Processing Letters, IEEE,* 14(1), 2007, pp. 39-42. Hinz, S., Fast and subpixel precise blob detection and attribution, *Image Processing,* 2005. ICIP 2005. 3, 2005, pp. III-457-60.

A threshold can be set for either detection method, either manually or automatically. For automatic detection, a threshold value to fit the chosen cell shape can be determined empirically based on statistics of error including subtracting too much phase from a previous cell, and having residual phase from fragmentation or not subtracting enough phase in a previous cell. Multiple cells also can be chosen automatically by the program, while the user determines which chosen cells is most appropriate.

In order to distinguish and, optionally, count either polar bodies in an embryo or cell fragments, cell cross-sectional area or cell volume limits can be used. For example, significant volumes having above threshold OPD (i.e., a volume detected as corresponding to a cell, cell fragment, or polar body) can be rejected for cell counting purposes if the volume is below a threshold (e.g., 50% of the average blastomere cell volume in the sample), but if the volume fits other criteria it can be counted as a polar body or cell fragment. Such criteria, which can be user selected or determined from the overall sample, can include volume (minimum and maximum), shape (minimum fit quality to elliptical shape), and OPD profile of a linear transect (e.g., parabolic).

EXAMPLES

Example 1

Adapting a Microscope to Perform Optical Quadrature, DIC, and Epi-Fluorescence

A Nikon ECLIPSE TE200 has one camera port on the base of the microscope, so all imaging modalities must be captured through a single output. The optics within the microscope are designed to produce the image of the sample at the end of the threads on the port because that is the location of the CCD chip if a CCD camera is attached. This configuration is ideal for capturing epi-fluorescence images because it contains the least amount of optics in the path that can reflect the fluorescent light. However, optical quadrature requires mixing of the reference path with the signal path, which cannot be done within the microscope base without major changes to the microscope body. Consequently, all CCD cameras were positioned away from the microscope body.

In the initial design, the microscope was already adapted for optical quadrature. An adjustable relay lens sent all light from the microscope to the recombining beamsplitter of the optical quadrature imaging setup. In this configuration all DIC and epi-fluorescence images were captured with one of the four cameras installed for optical quadrature, after losses from the multiple elements in the relay lens, a 50% loss from the recombining beamsplitter, and another loss from the polarized beamsplitter. This gave DIC images a poor signal-to-noise ratio and did not pass enough light to produce usable epi-fluorescence images. The design was modified by adding another CCD camera dedicated to capturing DIC and epi-fluorescence images (DIC/fluorescence CCD) while the other four CCDs were used exclusively for capturing optical quadrature images.

In order to reflect most of the visible wavelengths to the DIC/fluorescence CCD while passing the 632.8 nm HeNe laser light, a narrow bandpass dichroic beamsplitter was added to the light path. The dichroic beamsplitter passed a 50 nm window centered at 633 nm and reflected all other wavelengths from 45° incidence.

A telescope system was added to remove losses from the multiple elements in the relay lens and to increase the distance between the camera port and the recombining beamsplitter. To limit the number of elements in the path and reduce Fresnel reflections of the epi-fluorescence light, a simple one-to-one telescope consisting of two lenses was used. The object and image distance was set to give enough room to insert the dichroic beamsplitter in the path, while also allowing a convenient location for the DIC/fluorescence CCD. This design also removed the zoom capabilities of the relay lens, thereby reducing the possibility for misalignment due to inadvertent movement during imaging. A black box was placed over the telescope lenses, dichroic, and entrance to the DIC/fluorescence CCD during imaging, so as to limit the amount of room light reaching the DIC/fluorescence CCD.

A Matrox Genessis framegrabber was used to capture simultaneous images from the four optical quadrature CCDs.

A piezo stage on the microscope allowed the user to move the sample along the z-axis in order to create z-stacks by computer control. The piezo control box had an RS232 input that carried signals from the computer. An RS232 AB switch was installed to allow the user to switch control of the piezo stage from one computer to the other. Reminder messages were incorporated into the software to remind the user to have the switch set to the correct output depending on which mode was being imaged.

Software to control image acquisition was written in Matlab.

A schematic representation of the combined DIC-optical quadrature microscope is shown in FIG. 22.

Example 2

Cell Counting of Mouse Embryos Using DIC and Optical Quadrature Microscopy

Live mouse embryos at the 8-26 cell stage were counted using DIC and optical quadrature microscopic images according to the method of the present invention.

C57BL/6J and CBA/CaJ strains of mice were purchased from the Jackson Laboratory (Bar Harbor, Me.) and bred in the laboratory. The mice were handled according to the Institutional Animal Care and Use Committee (IACUC) regulations in an Association for the Assessment and Accreditation of Laboratory Animal Care (AAALAC) approved facility. C57BL/6 female mice, 2-6 months old, were superovulated according to standard procedures (Nagy et al., 2003). A first injection of 5 IU of eCG (Sigma, St. Louis, Mo.) was administered, followed 48 h later by 10 IU of hCG (Sigma). Individual C57BL/6 female mice were mated overnight with a single CBA/Ca male and evaluated for the presence of a vaginal plug the next morning, indicating that mating had occurred. Two-cell embryos were collected from plug positive females the day after plug detection. The embryos from all mice were pooled, washed, and placed in a dish containing M2 medium (Specialty Media, Phillipsburg, N.J.).

DIC and optical quadrature images were obtained for 81 live mouse embryos using the instrumentation set up described in Example 1. The images were analyzed as described below to determine the number of cells in each embryo.

The images were obtained with live embryos in a liquid culture medium, allowing the samples to float. An image registration function called image-registration, described below, was created using functions included in the Matlab Image Processing Toolbox. This program could be used to register either two DIC/fluorescence images or an optical quadrature image to a DIC or fluorescence image. The Control Point Selection Tool, cpselect, could display images of class uint8, uint16, double, and logical, but the tool prefers to display images of the same class. As a result, images of different classes, such as a double optical quadrature image and a uint8 DIC image will not display as expected in the Control Point Selection GUI. Once the range of phase in the optical quadrature image was scaled to values between 0 and 1, both DIC and phase images displayed correctly in the GUI. Therefore, the software asked the user whether an optical quadrature image was being registered, so the display could be automatically corrected.

In order to register the images, matching landmarks were manually selected on both images to determine the registration transform. Only landmarks within the embryo were selected, because objects in the culture medium may not move in register with the embryo itself. Since the optical quadrature image gives the total phase of the beam going through the embryo, and the exact overlap of cells is unknown, the perimeter of the sample was used to register the phase image to the DIC image. Points along the entire perimeter of the sample were chosen to ensure the best registration. The intersection points of cell boundaries along the perimeter of the embryo were selected. See FIG. 3.

After selection of the registration landmarks, the affine transform was created, and images were created for the original base image and the transformed input image. The transformed image was only shown in a figure and was not permanently applied to the input image. The user then determined whether the registration was satisfactory, and the program was rerun if it was not. If satisfactory, the output transform created by the program was saved and applied to the input image.

Next, the maximum optical path length deviation of a single cell was determined. The optical quadrature image of phase was converted to an image of optical path length (OPD image) with Eq. (5.3.1). The OPD and DIC images were observed side-by-side to determine an area of cells that was not overlapped and where the visible cells were approximately the same size as the other visible cells in the embryo. To determine the maximum optical path length deviation of a single cell, the optical path length deviations along a line going through the center of a cell with little to no overlap of other cells along the minor axis was plotted. A cell that was generally the same size as the other cells, with about half of the cell containing no overlap of other cells, was chosen. The maximum optical path length deviation value of the chosen cell was used for all the cells in the sample for the purpose of calculating a model ellipsoidal cell; therefore, care was taken to choose a cell that was approximately the same size as the other cells. The normal line was created by manually selecting starting and ending points on the OPD image (an example is shown in FIG. 5A). The starting point was in the culture medium, outside the zona pellucida. The ending point was chosen within the overlapped region of cells. The software then plotted a profile of the optical path length deviation along the line (FIG. 5B). Six points were selected along the optical path length deviation profile. The first point was the minimum optical path length deviation of one cell. The minimum optical path length deviation was approximated as ¾ of the maximum optical path length deviation of the zona pellucida beyond the cell. The remaining five points were selected from the parabolic region of the profile. Two points were selected along the increasing slope, a third was selected near the maximum, a fourth at the maximum, and a fifth somewhere past the maximum. For overlapped cells, the fourth and fifth points were user approximated based on the non-overlapped portion of the profile. The five points were input into the Matlab function polyfit to determine the three coefficients of a parabolic equation. The parabola was then superimposed on the profile plot to determine whether the fit was appropriate. If the maximum point of the parabola did not match the expected maximum of the parabolic shape visible in the profile plot, then the six points were selected again and the fit repeated until an appropriate parabola was created. The total optical path length deviation of a single cell was recorded as the difference of the maximum point of the fitted parabola and the selected minimum optical path length deviation. The maximum optical path length deviation of the overall OPD image was also recorded. For the remaining steps in the counting procedure, the same color scale was applied to all of the OPD images. The lowest point of the color scale was set at the selected minimum optical path length deviation, and the highest point of the color scale was set at the overall maximum optical path length deviation of the original OPD image.

Once the total optical path length deviation of a single cell had been calculated, the OPD image was displayed, and the user selected two points from outside the zona pellucida to crop the image and thereby reduce any unnecessary background.

The next step was to determine an elliptical fit to the boundary of the first cell to be subtracted from the OPD image. The OPD and DIC images were viewed side-by-side. If cell boundaries could be user identified on the DIC image, then an annotated ellipse was displayed on the DIC image. This feature worked on Matlab version 7, but is not available in earlier versions. The annotated ellipse was adjusted horizontally and vertically to match the boundary of the chosen cell. A guide was used to find the center point of the ellipse (cell) and the user approximated the maximum and minimum radii. The user adjusted the annotated ellipse until it encompassed the entire cell as much as possible. Points were then selected for the center of the ellipse (center), the maximum radius of the ellipse (max), and the minimum radius of the ellipse (min). The ellipse corresponding to the cell boundary chosen by the user was then plotted on the DIC and OPD images to determine whether the boundary fit correctly. If the fitted boundary was unsatisfactory, the user selected the three points again and the fitting was repeated. Once an appropriate elliptical cell boundary was identified, an ellipsoidal model cell was created from the ellipse and subtracted from the OPD image to yield a subtracted OPD image. The ellipsoidal model cell was created within a matrix containing the same number of rows and columns as the OPD image to simplify the subtraction. A figure of the ellipsoidal model cell was displayed on the OPD image so its orientation could be viewed. An additional figure was created to display the subtracted OPD image. The subtracted image revealed either the optical path length deviation of the culture medium or additional cells underneath the just subtracted model cell.

After the first cell had been subtracted, another cell boundary was identified on the DIC image, the corresponding ellipse was chosen, and subtract the corresponding ellipsoidal model cell from the subtracted OPD image. At this point in the script file, the figures and parameters had been automatically saved to the working directory. Lines 148-334 were repeated to select additional cells and complete the cell count. Lines 153, 328, 331, and 334 were changed after the subtraction of every cell to ensure the correct subtracted OPD image was used and the figures and parameters were saved correctly. The selection of cell boundaries and modeling and subtraction of the corresponding ellipsoidal model cells as described above was repeated until all boundaries visible on the DIC image had been used.

If no more cells were visible in the OPD image after the final boundary visible in the DIC image was used, the cell count was complete. However, if more cells were visible in the subtracted OPD image the process continued as follows. If the maximum optical path length deviation of one cell was calculated correctly and the cell boundaries were selected appropriately on the DIC image, then often elliptical cells could be distinguished in the subtracted OPD image that could not be seen in the DIC image. Thus, any remaining areas within the subtracted OPD image with optical path length deviations larger than the zona pellucida were analyzed by considering their size and shape and their optical path length deviation. Cell images within the subtracted OPD image had to be within the same size range as the cell boundaries chosen in the DIC image. For example, an elliptical area twice the size of the previous cells was considered to probably represent two cells next to each other. An elliptical area smaller than the previous cells was considered to be a polar body, a fragmented cell, or part of a cell that was not correctly identified in an earlier step. Cell radii were required to be within $$\sqrt[3]{\frac{1}{2}} = 0.793 \approx 20\%$$

of the average of previously determined cell boundaries, assuming the maximum change was associated with a recent cell division resulting in half the total volume of the cell.

Once all the cells were subtracted from the OPD image, the final cell count was taken as the sum of the number of model cells subtracted from the OPD image.

The step-by-step results of the counting process for an 8-cell mouse embryo are shown in FIG. 17, for a 14-cell mouse embryo in FIG. 18, for a 21-cell embryo in FIG. 19, and for a 26-cell embryo in FIG. 20. For each cell subtraction, the left-hand image shows the elliptical cell boundary identified by the user, and the right-hand image shows the OPD image after subtraction of the corresponding ellipsoidal model cell.

Example 3

Software for Controlling the DIC/Fluorescence CCD

This Example contains software that controls the DIC/Fluorescence CCD. The list of files includes: dic_fl_main.m to provide the options to the user, dic_image.m to acquire DIC images, fl_image.m to acquire Epi-Fluorescence images, brightfield_image.m to acquire images that are not registered to the optical quadrature CCDs, fregister.m to produce a transform that registers the DIC/fluorescence CCD to the optical quadrature CCDs, registration.txt to display the commands required for fregister, and create_folder.m to produce the automatic folder structure. The acquired DIC and epi-fluorescence images are automatically registered to the optical quadrature CCDs by the last saved transform created by fregister. The text file, registration, contains the required commands to be entered on the Matlab program running on the computer controlling the optical quadrature CCDs to capture an image with camera 0 to register the DIC/fluorescence CCD to the optical quadrature CCDs.

```
1  % DIC/Fluorescence CCD camera options - dic_fl_main
2  %
3  % The function give the user all options related to the
4  % DIC/Fluorescence CCD camera.
5  %
6  % Folder structure built into program to provide separate folders for
7  % images of separate modes.
8  %
9  % Author: Bill Warger (2004)
10
11 function E = dic_fl_main;
12
13 choice = 1;
14
15 %Part of automatic folder structure
16 [folder] = create_folder;
17
18 while choice ~ 4;
19 disp(' ')
20 disp('(1) Acquire DIC Image (4) Register Cameras')
21 disp('(2) Acquire Fluorescence Image (5) QUIT')
22 disp('(3) Brightfield - Not Registered to QTM')
23 disp(' ')
24 choice = input('Enter your selection (1-5): ');
25 switch choice
26
27 case 1
28 %Acquire DIC Image
29 E = dic_image;
30
31 case 2
32 %Acquire Fluorescence Image
33 E = fl_image;
34
35 case 3
36 %Brightfield - Not Registered to QTM
37 E = brightfield_image;
38
39 case 4
40 %Register Cameras
41 E = fregister;
42 case 5
43 %QUIT
44 if folder == 'y'
45 cd ..
46 end
47 return
48 otherwise
49 continue
50 end
51 end
52
53 return;
54
55
```

```
1  % Acquire DIC image - dic_image
2  %
3  % Software acquires a DIC image from the DIC/Fluorescence CCD camera.
4  %
5  % The DIC image is registered to the Optical Quadrature CCD cameras.
6  %
7  % Author: Bill Warger (2004)
8
9  function[total_dic_stack] = dic_image;
10
11 %Part of automatic folder structure
12 mkdir DIC
13 cd DIC
14
15 %Make sure RS232 AB switch on B to control piezo
16 disp(' ')
17 disp('*** Make sure piezo switch is on B ***')
18 disp(' ')
19
20 [dic_file] = create_folder;
21
22 %Total number of images
23 nstack = input('Enter the number of pictures (max of 20 in stack): ');
24 increment_size = input('Enter the increment size: ');
25 pause_time = input('Enter the amount of time in seconds between images : ');
26 if isempty(pause_time)
27 pause_time = 0;
28 end
29
30 %Make sure range of stack is within piezo limitations
31 distance=nstack.*increment_size;
32 if distance > 320
33 disp('Error - Stack too large');
34 return;
35 end
36
37 %Initialize Framegrabber
38 vid=videoinput('dt',1);
39 set(vid,'FramesPerTrigger',1);
40 preview(vid);
41
42 %Initialize Serial Port
43 s = port_init('COM1');
44
45 %Break overall stack into stacks of 20 due to memory limitations
46 max_stack = 20;
47
48 %Total number of individual stacks
49 number_stacks=ceil(nstack/max_stack);
50
51 if nstack <= max_stack
52 nstackn = nstack;
```

```
53 end
54
55 a = 1;
56 x = nstack;
57 if nstack > max_stack
58 while x > max_stack
59 nstackn(a) = max_stack;
60 x = x - max_stack;
61 a = a + 1;
62 end
63 nstackn(a) = x;
64 end
65
66 %Initialize last piezo position so piezo knows where to start next stack
67 last_stack = 0;
68
69 %Acquire Images
70 user_entry = input('Press Enter to take DIC image : ', 's');
71 if isempty(user_entry)
72
73 for counter = 1:length(nstackn)
74 %Piezo position for first image of stack
75 piezo_position = 160 + ceil(distance/2) - last_stack;
76 move_piezo(s,piezo_position);
77
78 closepreview(vid)
79
80 for n = 1:nstackn(counter)
81 start(vid);
82 raw_dic_stack(:,:,n)=getdata(vid,1);
83 piezo_position = piezo_position-increment_size;
84 move_piezo(s,piezo_position);
85 pause(pause_time)
86 end
87
88 %Show first image of each stack just in case piezo is not moving
89 figure, imagesc(raw_dic_stack(:,:,1)), axis image,
90 colormap(gray);
91
92 %Save each individual stack, starting with stack_1,
93 %to be loaded before processing with quadpro
94 filename = strcat('raw_dic_stack_',int2str(counter));
95 save(filename, 'raw_dic_stack')
96 clear raw_dic_stack;
97
98 last_stack = last_stack + nstackn(counter)*increment_size;
99 end
100 end
101
102 fclose(instrfind);
103
104 %Put individual stacks of 20 into one large stack
105 if counter > 1
106 b = 1;
107 c = 20;
```

```
108 for a = 1:counter-1
109 clear dic_stack*
110 load(strcat('raw_dic_stack_',int2str(a)))
111 total_raw_dic_stack(:,:,b:c) = raw_dic_stack;
112 b = b + 20;
113 c = c + 20;
114 end
115
116 load(strcat('raw_dic_stack_',int2str(counter)))
117 c = (c - 20)+size(raw_dic_stack,3);
118 total_raw_dic_stack(:,:,b:c) = raw_dic_stack;
119
120 else
121 load raw_dic_stack_1
122 total_raw_dic_stack = raw_dic_stack;
123 end
124
125 save('total_raw_dic_stack', 'total_raw_dic_stack')
126
127 %Delete individual stacks
128 for a = 1:number_stacks
129 delete(strcat('raw_dic_stack_',int2str(a),'.mat'))
130 end
131
132 %Register images to QTM cameras
133 %Load last transform created by fregister
134 load C:\MATLAB6p5p1\work\fluorescence_dic\registration\ftform
135
136 total_dic_stack= imtransform(total_raw_dic_stack,ftform,'xdata',[1
640],'ydata',[1 48
0]);
137 save('total_dic_stack', 'total_dic_stack')
138
139 %Display focused image in center of stack
140 figure, imagesc(total_dic_stack(:,:,ceil(size(total_dic_stack,3)/2))),
141 axis image, colormap(gray), colorbar
142
143 if dic_file == 'y'
144 cd ..
145 end
146
147 cd ..
148
149 return 1 % Acquire Fluorescence image - fl_image
2 %
3 % Software acquires a fluorescence image from the DIC/Fluorescence
4 % CCD camera.
5 %
6 % The fluorescence image is registered to the Optical Quadrature CCD
7 % cameras.
8 %
9 % Author: Bill Warger (2004)
10
```

```
11 function[fl_stack] = fl_image;
12
13 %Part of automatic folder structure
14 mkdir Fluorescence
15 cd Fluorescence
16
17 %Make sure RS232 AB switch on B to control piezo
18 disp(' ')
19 disp('*** Make sure piezo switch is on B ***')
20 disp(' ')
21
22 %Specify excitation wavelength to produce correct file name
23 fl_type = input('Enter channel of fluorescence [U (UV) B (Blue) G (Green)]
: ', 's');
24 if fl_type == 'U'
25 fl_type = 'UV';
26 else if fl_type == 'B'
27 fl_type = 'Bl';
28 else if fl_type == 'G'
29 fl_type = 'Gr';
30 else
31 fl_type = 'UV';
32 disp('Fluorescence channel assumed to be UV')
33 end
34 end
35 end
36
37 [fl_file] = create_folder;
38
39 %Total number of images
40 nstack = input('Enter the number of pictures (max of 20 in stack): ');
41 increment_size = input('Enter the increment size: ');
42 pause_time = input('Enter the amount of time in seconds between images :
');
43 if isempty(pause_time)
44 pause_time = 0;
45 end
46
47 %Make sure range of stack is within piezo limitations
48 distance=nstack.*increment_size;
49 if distance > 320
50 disp('error');
51 return;
52 end
53
54 %Initialize Frame Grabber
55 vid=videoinput('dt',1);
56 set(vid,'FramesPerTrigger',1);
57 preview(vid);
58
59 %Initialize Serial Port
60 s = port_init('COM1');
61
62 %Break overall stack into stacks of 20 due to memory limitations
63 max_stack = 20;
```

```
64
65  %Total number of individual stacks
66  number_stacks=ceil(nstack/max_stack);
67
68  if nstack <= max_stack
69  nstackn = nstack;
70  end
71
72  a = 1;
73  x = nstack;
74  if nstack > max_stack
75  while x > max_stack
76  nstackn(a) = max_stack;
77  x = x - max_stack;
78  a = a + 1;
79  end
80  nstackn(a) = x;
81  end
82
83  %Initialize last piezo position so piezo knows where to start next stack
84  last_stack = 0;
85
86  %Acquire Images
87  user_entry = input('Press Enter to take fluorescence stack : ', 's');
88  if isempty(user_entry)
89
90  for counter = 1:length(nstackn)
91
92  %Piezo position for first image of stack
93  piezo_position = 160 + ceil(distance/2) - last_stack;
94  move_piezo(s,piezo_position);
95  closepreview(vid)
96
97  for n = 1:nstackn(counter)
98  start(vid);
99  if fl_type == 'UV'
100 UV_raw_stack(:,:,n)=getdata(vid,1);
101 else if fl_type == 'Bl'
102 Blue_raw_stack(:,:,n)=getdata(vid,1);
103 else if fl_type == 'Gr'
104 Green_raw_stack(:,:,n)=getdata(vid,1);
105 end
106 end
107 end
108 piezo_position = piezo_position-increment_size;
109 move_piezo(s,piezo_position);
110 pause(pause_time)
111 end
112
113 if fl_type == 'UV'
114 figure, imagesc(UV_raw_stack(:,:,1)), colormap(bone),
115 axis image; colorbar;
116 filename = strcat(fl_type,'_raw_stack_',int2str(counter));
117 save(filename, 'UV_raw_stack')
118 clear UV_raw_stack;
```

```
119 else if fl_type == 'Bl'
120 figure, imagesc(Blue_raw_stack(:,:,1)), colormap(bone),
121 axis image; colorbar;
122 filename = strcat(fl_type,'_raw_stack_',int2str(counter));
123 save(filename, 'Blue_raw_stack')
124 clear Blue_raw_stack;
125 else if fl_type == 'Gr'
126 figure, imagesc(Green_raw_stack(:,:,1)), colormap(bone),
127 axis image; colorbar;
128 filename = strcat(fl_type,'_raw_stack_',int2str(counter));
129 save(filename, 'Green_raw_stack')
130 clear Green_raw_stack;
131 end
132 end
133 end
134 last_stack = last_stack + nstackn(counter)*increment_size;
135 end
136 end
137
138 fclose(instrfind);
139
140 %Put individual stacks of 20 into one large stack
141 if counter == 1
142 load(strcat(fl_type,'_raw_stack_',int2str(counter)))
143
144 if fl_type == 'UV'
145 Total_UV_raw_Stack = UV_raw_stack;
146 save('Total_UV_raw_Stack', 'Total_UV_raw_Stack')
147 else if fl_type == 'Bl'
148 Total_Blue_raw_Stack = Blue_raw_stack;
149 save('Total_Bl_raw_Stack', 'Total_Blue_raw_Stack')
150 else if fl_type == 'Gr'
151 Total_Green_raw_Stack = Green_raw_stack;
152 save('Total_Gr_raw_Stack', 'Total_Green_raw_Stack')
153 end
154 end
155 end
156 end
157
158 if counter > 1
159 b = 1;
160 c = 20;
161 for a = 1:counter-1
162 clear dic*
163 load(strcat(fl_type,'_raw_stack_',int2str(a)))
164 if fl_type == 'UV'
165 Total_UV_raw_Stack(:,:,b:c) = UV_raw_stack;
166 else if fl_type == 'Bl'
167 Total_Blue_raw_Stack(:,:,b:c) = Blue_raw_stack;
168 else if fl_type == 'Gr'
169 Total_Green_raw_Stack(:,:,b:c) = Green_raw_stack;
170 end
171 end
172 end
173
```

```
174 b = b + 20;
175 c = c + 20;
176 end
177
178 load(strcat(fl_type,'_raw_stack_',int2str(counter)))
179 if fl_type == 'UV'
180 c = (c - 20)+size(UV_raw_stack,3);
181 Total_UV_raw_Stack(:,:,b:c) = UV_raw_stack;
182 save('Total_UV_raw_Stack', 'Total_UV_raw_Stack')
183 else if fl_type == 'Bl'
184 c = (c - 20)+size(Blue_raw_stack,3);
185 Total_Blue_raw_Stack(:,:,b:c) = Blue_raw_stack;
186 save('Total_Bl_raw_Stack', 'Total_Blue_raw_Stack')
187 else if fl_type == 'Gr'
188 c = (c - 20)+size(Green_raw_stack,3);
189 Total_Green_raw_Stack(:,:,b:c) = Green_raw_stack;
190 save('Total_Gr_raw_Stack', 'Total_Green_raw_Stack')
191 end
192 end
193 end
194
195 end
196
197 %Delete individual stacks
198 for a = 1:number_stacks
199 delete(strcat(fl_type,'_raw_stack_',int2str(a),'.mat'))
200 end
201
202 %Register images to QTM cameras
203 %Load last transform created by fregister
204 load C:\MATLAB6p5p1\work\fluorescence_dic\registration\ftform
205
206 if fl_type == 'UV'
207 Total_UV_Stack= imtransform(Total_UV_raw_Stack,ftform,'xdata',[1
640],'ydata',[1
480]);
208 save('Total_UV_Stack', 'Total_UV_Stack')
209 else if fl_type == 'Bl'
210 Total_Bl_Stack= imtransform(Total_Blue_raw_Stack,ftform,'xdata',[1
640],'ydat
a',[1 480]);
211 save('Total_Bl_Stack', 'Total_Bl_Stack')
212 else if fl_type == 'Gr'
213 Total_Gr_Stack= imtransform(Total_Green_raw_Stack,ftform,'xdata',[1 640],
'ydata',[1 480]);
214 save('Total_Gr_Stack', 'Total_Gr_Stack')
215 end
216 end
217 end
218
219 %Display focused image in center of stack
220 if fl_type == 'UV'
221 figure, imagesc(Total_UV_Stack(:,:,ceil(size(Total_UV_Stack,3)/2))),
222 axis image, colormap(gray)
223 fl_stack = Total_UV_Stack;
```

```
224 else if fl_type == 'Bl'
225 figure, imagesc(Total_Bl_Stack(:,:,ceil(size(Total_Bl_Stack,3)/2))),
226 axis image, colormap(gray)
227 fl_stack = Total_Bl_Stack;
228 else if fl_type == 'Gr'
229 figure,
230 imagesc(Total_Gr_Stack(:,:,ceil(size(Total_Gr_Stack,3)/2))),
231 axis image, colormap(gray)
232 fl_stack = Total_Gr_Stack;
233 end
234 end
235 end
236
237 if fl_file == 'y'
238 cd ..
239 end
240
241 cd ..
242
243 return
244
245
246

1  % Acquire Brightfield image - brightfield_image
2  %
3  % Software acquires a brightfield image from the DIC/Fluorescence CCD
4  % camera.
5  %
6  % The brightfield image is not registered to the Optical Quadrature
7  % CCD cameras.
8  %
9  % Author: Bill Warger (2004)
10
11 function[total_brightfield_stack] = brightfield_image;
12
13 %Make sure RS232 AB switch on B to control piezo
14 disp(' ')
15 disp('*** Make sure piezo switch is on B ***')
16 disp(' ')
17
18 %Part of automatic folder structure
19 [bright_file] = create_folder;
20
21 %Total number of images
22 nstack = input('Enter the number of pictures (max of 20 in stack): ');
23 increment_size = input('Enter the increment size: ');
24 pause_time = input('Enter the amount of time in seconds between images : ');
25 if isempty(pause_time)
26 pause_time = 0;
27 end
28
29 %Make sure range of stack is within piezo limitations
```

```
30 distance=nstack.*increment_size;
31 if distance > 320
32 disp('Error - Stack too large');
33 return;
34 end
35
36 %Initialize Framegrabber
37 vid=videoinput('dt',1);
38 set(vid,'FramesPerTrigger',1);
39 preview(vid);
40
41 %Initialize Serial Port
42 s = port_init('COM1');
43
44 %Break overall stack into stacks of 20 due to memory limitations
45 max_stack = 20;
46
47 %Total number of individual stacks
48 number_stacks=ceil(nstack/max_stack);
49
50 if nstack <= max_stack
51 nstackn = nstack;
52 end
53
54 a = 1;
55 x = nstack;
56 if nstack > max_stack
57 while x > max_stack
58 nstackn(a) = max_stack;
59 x = x - max_stack;
60 a = a + 1;
61 end
62 nstackn(a) = x;
63 end
64
65 %Initialize last piezo position so piezo knows where to start next stack
66 last_stack = 0;
67
68 %Acquire Images
69 user_entry = input('Press Enter to take DIC image : ', 's');
70 if isempty(user_entry)
71
72 for counter = 1:length(nstackn)
73 %Piezo position for first image of stack
74 piezo_position = 160 + ceil(distance/2) - last_stack;
75 move_piezo(s,piezo_position);
76
77 closepreview(vid)
78
79 for n = 1:nstackn(counter)
80 start(vid);
81 brightfield_stack(:,:,n)=getdata(vid,1);
82 piezo_position = piezo_position-increment_size;
83 move_piezo(s,piezo_position);
84 pause(pause_time)
```

```
85  end
86
87  %Show first image of each stack just in case piezo is not moving
88  figure, imagesc(brightfield_stack(:,:,1)), axis image,
89  colormap(gray);
90
91  % Save each individual stack, starting with stack_1, to be
92  % loaded before processing with quadpro93 filename =
    strcat('brightfield_stack','_',int2str(counter));
94  save(filename, 'brightfield_stack')
95  clear brightfield_stack;
96
97  last_stack = last_stack + nstackn(counter)*increment_size;
98  end
99  end
100
101 fclose(instrfind);
102
103 %Put individual stacks of 20 into one large stack
104 if counter > 1
105 b = 1;
106 c = 20;
107 for a = 1:counter-1
108 clear brightfield*
109 load(strcat('brightfield_stack','_',int2str(a)))
110 total_brightfield_stack(:,:,b:c) = brightfield_stack;
111 b = b + 20;
112 c = c + 20;
113 end
114
115 load(strcat('brightfield_stack','_',int2str(counter)))
116 c = (c - 20)+size(brightfield_stack,3);
117 total_brightfield_stack(:,:,b:c) = brightfield_stack;
118
119 else
120 load brightfield_stack_1
121 total_brightfield_stack = brightfield_stack;
122 end
123 end
124 save('total_brightfield_stack', 'total_brightfield_stack')
125
126 %Delete individual stacks
127 for a = 1:number_stacks
128 delete(strcat('brightfield_stack_',int2str(a),'.mat'))
129 end
130
131 %Display focused image
132 figure,
133
    imagesc(total_brightfield_stack(:,:,ceil(size(total_brightfield_stack,3)/2)))
134 axis image, colormap(gray), colorbar
135
136 if bright_file == 'y'
137 cd ..
```

```
138 end
139
140 cd ..
141
142 return

1 % Registration program for Fluorescence/DIC camera - fregister
2 %
3 % This program registers the Fluorescence/DIC camera to Camera 0 of the
QTM.
4 % Uses prewritten Matlab registration code
5 % - see pages 5-8 to 5-14 in Image Processing Toolbox User's Guide
6 %
7 % Control Point Selection Tool :
8 % - Use top windows to zoom in as close as possible to choose correct
pixels.
9 % - Use bottom windows to move zoom box around entire image
10 % - Use arrow to select and move zoom box
11 % - Use single circle with cross to select corresponding points in
12 % both images
13 % - Select first four points at different corners of image
14 % - Once 7 points are picked start to use double circle with
15 % cross to select one point on camera 4 image and see if it
16 % corresponds on the camera 0 image. Make sure to click on
17 % circle with P to change it to a circle with a cross
18 % - Pick at least 12 points over entire image to get a good registration
19 % - Save selected point to workspace under File
20 %
21 % Author: Bill Warger (2004)
22
23 function[ftform] = fregister
24
25 % Until both computers are networked together better need to copy code
from registr
ation
26 % file to Matlab on Charm to get image from camera0 to reference
27 Charm_Procedure = textread('registration.txt', '%s', 'delimiter', '\n',
'whitespace',' ')';
28 disp('Copy the following procedure lines and paste them into Matlab on
Charm.')
29 disp(' ')
30 Charm_Procedure = char(Charm_Procedure)
31 disp(' ')
32
33 Continue = input('Has the procedure been complete on Charm? (y/n): ','s');
34 if Continue ~= 'y'
35 Continue = input('Has the procedure been complete on Charm? (y/n): ','s');
36 end
37
38 % Charm-2 Commands
39 load('\\Charm\C\MATLAB6p5\work\qtm\camera0.mat') %Acquire image from
Camera 0 on Charm
40
41 %Acquire Registration Data
42 vid=videoinput('dt',1);
```

```
43 set(vid,'FramesPerTrigger',1);
44 preview(vid);
45
46 %Pause to make sure sample is illuminated correctly
47 Continue = input('Press any key to take image on Fluorescence Camera: ');
48 disp(' ');
49 start(vid);
50 camera4=getdata(vid,1);
51 closepreview(vid);
52
53 % Registration Code
54
55 % Run Matlab Registration program to select points
56 % Selection points saved in base workspace instead of function workspace
57 cpselect(camera4, camera0);
58 Continue = input('Select at least 12 pairs of points, save points to workspace under
File, and press Enter', 's');
59
60 % Use cross-correlation to adjust selected points
61 input_points = evalin('base','input_points'); % Moves input_points from base worksp
ace to function workspace
62 base_points = evalin('base','base_points');
63 input_points_corr = cpcorr(input_points, base_points, camera4, camera0);
64
65 % Do transform to form registration variable
66 ftform = cp2tform(input_points_corr, base_points, 'affine');
67
68 %Check registration
69 registered = imtransform(camera4, ftform,'xdata',[1 640],'ydata',[1 480]);
70 figure, imagesc(registered)
71 figure, imagesc(camera0)
72
73 %Save ftform if good registration
74 user_entry = input('Save Registration File? (y/n): ', 's');
75 if user_entry == 'y'
76 save C:\MATLAB6p5p1\work\fluorescence_dic\ftform ftform
77 disp('ftform saved')
78 end
79
80 return
81
```

Example 4

Software for Cell Counting

This Example includes the Matlab code for the function image-registration, to register the embryo images, and the script file to perform the cell counting method in this thesis. After the subtraction of the first cell, lines 148-334 within the cell counting script file must be repeated to select additional cells and complete the cell count. A separate script file containing these lines was created, but was not included to reduce redundancy. Also, lines 153, 328, 331, and 334 must be changed after the subtraction of every cell to ensure the correct subtracted OPD image is used and the figures and parameters are automatically saved correctly.

```
1  % Register two images - image_registration
2  %
3  % Software produces a transform to be applied to image by Matlab
4  % function imtransform.
5  %
6  % GUI goes not like to image two images of different file types so
7  % the user is asked whether an Optical Quadrature image is being
8  % registered to display the images correctly.
9  %
10 % Selection points saved in base workspace instead of function
11 % workspace
12 % Author: Bill Warger (2004)
13
14 function [ftform] = image_registration(image1, image2)
15
16 % image1 = uint8(image1);
17 % image2 = uint8(image2);
18 qtm = input('Are you registering a QTM image? (y/n) ', 's');
19 if qtm == 'y'
20 image1 = (image1 + abs(min(min(image1)))) ./ ...
21 max(max(image1 + abs(min(min(image1)))));
22 image2 = uint8(image2);
23 else
24 image1 = uint8(image1);
25 image2 = uint8(image2);
26 end
27
28 cpselect(image1, image2);
29 Continue = input('Select pairs of points, save points to workspace under File, and press Enter', 's');
30
31 % Moves input_points from base workspace to function workspace
32 input_points = evalin('base','input_points');
33 base_points = evalin('base','base_points');
34
35 % Use cross-correlation to adjust selected points
36 input_points_corr = cpcorr(input_points, base_points, image1,
37 image2);
38 % Create transform to form registration variable
39 ftform = cp2tform(input_points_corr, base_points, 'affine');
40 % Check registration
41 registered = imtransform(image1, ftform,'xdata',[1 480],'ydata',[1 640]);
42 figure, imagesc(registered), axis image
43 figure, imagesc(image2), axis image
```

Example 5

Calibration of Cell Counting Method Using Hoechst Stain

The phase subtraction cell counting method was completed on 15 morphologically normal, live mouse embryos. A z-stack of images was acquired with epi-fluorescence and analyzed to determine the ground truth number of cells. C57BL/6 female mice were superovulated, as described previously, and mated with single CBA/Ca male mice. Plug positive female mice were sacrificed on days 3 and 4 post hCG injection and eight-cell through morula stage embryos were collected in M2 medium. The embryos from each mouse were stained and imaged before the following mouse was sacrificed in order to minimize the amount of time the embryos spent outside of the mouse. Embryos spent less than 60 min outside of the mouse or an incubator. Embryos were stained 30 min in 1 µg/ml Hoechst 33342 (Serologicals Corporation, Norcross, Ga.). Single images were also acquired at the center focus plane of the embryo in DIC and OQM to count the number of cells with this method. Center focus is found when the outer boundary of the developing cells is in focus. The first 5 samples were used as a training set where the number of cells was known before the cell counting method was complete. This training set was used to determine the potential variation in cell sizes for embryos with different cell numbers since the cells divide asynchronously (Rafferty, 1970). As seen in Table I, accurate cell counts were obtained for the five samples once the correct cell boundaries were chosen.

The second set of 10 samples was completed blind, meaning that the number of cells was unknown until after the cell counting method was complete. The phase subtraction cell counting method had a maximum error of one cell for the 10 blind samples and accurately counted up to 26 cells as seen in Table II.

TABLE I

Results of cell counts produced by epi-fluorescence imaging of Hoechst stained nuclei and the phase subtraction cell counting method for a training set of five live mouse embryos. The number of cells was known before the cell count was completed.

|   | Fluorescence Count | Phase Subtraction Count |
|---|---|---|
| 1 | 13 cells | 13 cells |
| 2 | 14 cells | 14 cells |
| 3 | 16 cells | 16 cells |
| 4 | 17 cells | 17 cells |
| 5 | 25 cells | 25 cells |

TABLE II

Results of cell counts produced by epi-fluorescence imaging of Hoechst stained nuclei and the phase subtraction cell counting method for ten live mouse embryos. The number of cells was not known before the cell count was completed.

|   | Fluorescence Count | Phase Subtraction Count |
|---|---|---|
| 1 | 8 cells | 8 cells |
| 2 | 8 cells | 8 cells |
| 3 | 8 cells | 8 cells |
| 4 | 12 cells | 12 cells |
| 5 | 12 cells | 12 cells |
| 6 | 15 cells | 15 cells |
| 7 | 16 cells | 15 cells |
| 8 | 16 cells | 15 cells |
| 9 | 21 cells | 21 cells |
| 10 | 26 cells | 26 cells |

REFERENCES

1. Alberts, B., et al. *Molecular Biology of The Cell*. Garland Publishing, Inc., New York, 1994.
2. Allen, R. D., David, G. B., Nomarski, G. The Zeiss-Nomarski differential interference equipment for transmitted light microscopy. *Z. Wiss. Mikroskopie*, 69 (4): 193-221, 1969.
3. CDC, "2002 Assisted Reproduction Technology Success Rates. National Summary and Fertility Clinic Reports," Atlanta, Ga.: US Department of Health and Human Services, CDC, 2004.
4. Chang, C. *A Contour Signature Method for Counting Cells in Embryos using Quadrature Tomographic Microscopy Images*. Master's Project, Northeastern University, 2005.
5. Coons, A. H., Creech, H. J., Jones, R. N. Immunological properties of an antibody containing a fluorescent group. *Proc. Soc. Exp. Biol. Med.*, 47: 200-202, 1941.
6. Cuche, E., Bevilacqua, F., Depeursinge, C. Digital holography for quantitative phase-contrast imaging. *Optics Letters*, 24(5): 291-293, 1999.
7. Cuche, E., Marquet, P., Depeursinge, C. Spatial filtering for zero-order and twin-image elimination in digital off-axis holography. *Applied Optics*, 39(23): 4070-4075, 2000.
8. De Neubourg, D., Mangelschots, K., Van Royen, E., Vercruyssen, M., Ryckaert G., Valkenburg, M., Barudy-Vasquez, J., Gerris, J. Impact of patients' choice for single embryo transfer of a top quality embryo versus double embryo transfer in the first IVF/ICSI cycle. *Hum. Reprod*, 17: 2621-2625, 2002.
9. Dean, N., Philips, S., Buckett, W., Biljan, M., Lin Tan, S. Impact of reducing the number of embryos transferred from three to two in women under the age of 35 who produced three or more high-quality embryos. *Fertil Steril.*, 74: 820-823, 2000.
10. DiMarzio, C. A. Optical Quadrature Interferometer. U.S. Pat. No. 6,020,963, 2000.
11. Dorrio, B. V., Fernández, J. L. Phase-evaluation methods in whole-field optical measurement techniques. *Meas. Sci. Technol.*, 10: R33-R55, 1999.
12. Dunn, A., Smithpeter, C., Welch, A. J., Richards-Kortum, R. Finite-Difference Time-Domain Simulation of Light Scattering From Single Cells. *Journal of Biomedical Optics*, 2(3): 262-266, 1997.
13. Ebner, T., Yaman, C., Moser, M. Prognostic value of first polar body morphology on fertilization rate and embryo quality in intracytoplasmic sperm injection. *Human Reproduction*, 15(2): 427-430, 2000.
14. Ebner, T., Moser, M., Sommergruber, M., Yaman, C., Pfleger, U., Tews, G. First polar body morphology and blastocyst formation rate in ICSI patients. *Human Reproduction*, 17(9): 2415-2418, 2002.
15. ESHRE Campus Course Report. Prevention of twin pregnancies after IVF/ICSI by single embryo transfer. *Hum. Reprod.*, 16: 790-800, 2001.

16. Evsikov, A. V., Evsikov, S. V. A study of the first and second polar bodies in mouse oogenesis. *Russian J. Dev. Biol.,* 26(3): 196-200, 1995.
17. Feng, J. L., Hall, J. L., Birth of normal mice after electrofusion of the second polar body with the male pronucleus: a possible treatment for oocyte-factor infertility. *Am Soc Reprod Med Ann Meet,* Abstract P-050, 1997.
18. Francon, M., Mallick, S. *Polarization Interferometers.* Wiley-Interscience, London, 1971.
19. Fujii, S., Fukui, A., Yamaguchi, E., Sakamoto, T., Sato, S., Saito, I. Reducing multiple pregnancies by restricting the number of embryos transferred to two at the first embryo transfer attempt. *Hum. Reprod.,* 13: 3550-3554, 1998.
20. Gardner, M., Goldenberg, R., Cliver, S., Tucker, J., Nelson, K., Copper, R. The origin and outcome of preterm twin pregnancies. *Obstet. Gynecol.,* 85: 553-557, 1995.
21. Gardner, D., Lane, M. Culture and selection of viable blastocysts: a feasible proposition for human IVF? *Hum. Reprod,* 3: 367-382, 1997.
22. Gerris, J., De Neubourg, D., Mangelschots, K., Van Royen, E., Vercruyssen, M., Barudy-Vasquez, J., Valkenburg, M., Ryckaert, G. Elective single day 3 embryo transfer halves the twinning rate without decrease in the ongoing pregnancy rate of an IVF/ICSI programme. *Hum. Reprod,* 17: 2626-2631, 2002.
23. Grondahl, M. L. Present and future approaches for oocyte and zygote quality assessment. *ESHRE Campus Symposium,* Copenhagen, Denmark, 2005.
24. Gunasheela, S., Sathananthan, H., Menezes, J. Critical evaluation of human blastocysts for assisted reproduction techniques and embryonic stem cell biotechnology. *Reproductive BioMedicine Online,* 7(2): 219-227, 2003.
25. Guo, P., Devaney, A. J. Digital microscopy using phase-shifting digital holography with two reference waves. *Optics Letters,* 29(8): 857-859, 2004.
26. Gurgan, T., Demirol, A. Why and how should multiple pregnancies be prevented in assisted reproduction treatment programmes? *Reprod Biomed. Online,* 9: 237-244, 2004.
27. Guyer, B., Martin, J., MacDorman, M., Martin, J., Peters, K., Strobino, D. Annual summary of vital statistics—1996. *Pediatrics,* 100: 905-918, 1997.
28. Hardarson, T., Hanson, C., Sjögren, Lundin, K., Human embryos with unevenly sized blastomeres have lower pregnancy and implantation rates: indications for aneuploidy and multinucleation. *Human Reproduction,* 16(2): 313-318, 2001
29. Hardarson, T., Löfman, C., Coull, G., Sjögren, A., Hamberger, L., Edwards, R. G. Internalization of cellular fragments in a human embryo: time-lapse recordings. *Reproductive BioMedicine Online,* 5(1): 36-38, 2002.
30. Hardarson, T. Kinetics in embryo development. *ESHRE Campus Symposium,* Copenhagen, Denmark, 2005.
31. Hnida, C., Engenheiro, E., Ziebe, S., Computer-controlled, multilevel, morphometric analysis of blastomere size as biomarker of fragmentation and multinuclearity in human embryos. *ESHRE Campus Symposium,* Copenhagen, Denmark, 2005.
32. Hogenboom, D. O., DiMarzio, C. A., Gaudette, T. J., Devaney, A. J., Lindberg, S. C. Three-dimensional images generated by quadrature interferometry. *Optics Letters,* 23(10): 783-785, 1998.
33. Hu, Y., Maxson, W., Hoffman, D., Ory, S., Eager, S., Dupré, J., Lu, C. Maximizing pregnancy rates and limiting higher-order multiple conceptions by determining the optimal number of embryos to transfer based on quality. *Fertil. Steril.,* 69: 650-657, 1998.
34. Invitrogen Corporation. Spectra—Hoechst 33258/DNA. 2005. Aug. 7, 2005<http://probes.invitrogen.com/servlets/spectra?fileid=1398dna>.
35. Kiely, J. What is the population-based risk of preterm birth among twins and other multiples? *Clin. Obstet. Gynecol.,* 41: 3-11, 1998.
36. Kinzler, W., Ananth, C., Vintzileos, A. Medical and economic effects of twin gestations. *J. Soc. Gynecol. Investig.,* 7: 321-327, 2000.
37. Krisher, R. L., Bavister, B. D. Correlation of Mitochondrial Organization with Developmental Competence in Bovine Oocytes Matured In Vitro. *Biol. Reprod.,* 56(Suppl. 1): 602, 1997.
38. Krisher, R. L., Bavister, B. D. Responses of oocytes and embryos to the culture environment. *Theriogenology,* The International Embryo Transfer Society Proceedings, 49(1): 103-114, 1998.
39. Lundin, K. Morphological markers of embryo quality. *ESHRE Campus Symposium,* Copenhagen, Denmark, 2005.
40. Maleki, M. H., Devaney, A. J. Phase-retrieval and intensity-only reconstruction algorithms for optical diffraction tomography. *Journal of the Optical Society of America,* A10(5): 1086, 1993.
41. Mansuripur, M. *Classical Optics and its Applications.* Cambridge University Press, Cambridge, 2002.
42. Martin, J., Park, M. Trends in twin and triplet births: 1980-1997. *Natl. Vital Stat. Rep.,* 24: 1-16, 1999.
43. The Mathworks, Inc. *Image Processing Toolbox: For Use with Matlab.* The Mathworks, Inc., Natick, 2002.
44. Milki, A., Fisch, J., Behr, B. Two-blastocyst transfer has similar pregnancy rates and a decreased multiple gestation rate compared with three-blastocyst transfer. *Fertil. Steril.,* 72: 225-228, 1999.
45. Milonni, P. W., Eberly, J. H. *Lasers.* John Wiley & Sons, Inc., New York, 1988.
46. Murphy, D. B. *Fundamentals of Light Microscopy and Electronic Imaging.* Wiley-Liss, Inc., New York, 2001.
47. Nagy, N., Gertsenstein, M., Vintersten, K., Behringer, R. (Eds.). (2003). Manipulating the mouse embryo. Cold Spring Harbor, N.Y.: Cold Spring Harbor Laboratory Press.
48. Newmark, J. A., Warger, II, W. C., Chang, C., Herrera, G. E., Brooks, D. H., DiMarzio, C. A., Warner, C. M. Determination of the Number of Cells in Preimplantation Embryos by Using Noninvasive Optical Quadrature Microscopy in Conjunction with Differential Interference Contrast Microscopy. *Microsc. Microanal.,* 13: 1-10, 2007.
49. Nijs, M., Geerts, L., van Roosendaal, E., Segal-Bertin, G., Vanderzwalmen, P., Schoysman, R. Prevention of multiple pregnancies in an in vitro fertilization program. *Fertil. Steril.,* 59: 245-250, 1993.
50. Nomarski, G., Diapositif interferential à polarization pour l'étude des objects transparents ou opaques appartenant à la classe des objects de phase. French patent 1059 124, 1953.
51. Nomarski, G. Microinterféromètre différential à ondes polarisées. *J. Phys. Radium* 16: 9S-11S, 1955.
52. Pharoah, P Cooke, T. Cerebral palsy and multiple births. *Arch. Dis. Chil. Fetal. Neonatal. Ed.,* 75: F174-F177, 1996.
53. Ploem, J. S. The use of a vertical illuminator with interchangeable dichroic mirrors for fluorescence microscopy with incidental light. Z Wiss Mikrosk. 68(3):129-42, 1967.
54. Rafferty, Jr, K. A. *Methods in Experimental Embryology of the Mouse.* Baltimore, Md.: John Hopkins University Press, 1970, pp. 82.

55. Reynolds, M., Schieve, L., Martin, J., Jeng, G., Macaluso, M. Trends in Multiple Births Conceived Using Assisted Reproductive Technology, United States, 1997-2000. *Pediatrics,* 111: 1159-1162, 2003.
56. Sathananthan, H., Menezes, J., Gunasheela, S. Mechanics of human blastocyst hatching in vitro. *Reproductive BioMedicine Online,* 7(2): 228-234, 2003.
57. Senat, M., Ancel, P., Bouvier-Colle, M., Breart, G. How does multiple pregnancy affect maternal mortality and morbidity? *Clin. Obstet. Gynecol.,* 41: 78-83, 1998.
58. Slayter, E. M., Slayter, H. S. *Light and Electron Microscopy.* Cambridge University Press, Cambridge, 1992.
59. Spellacy, W., Handler, A., Ferre, C. A case-control study of 1,253 twin pregnancies from a 1982-1987 perinatal data base. *Obstet. Gynecol.,* 75: 168-171, 1990.
60. Spencer, M. *Fundamentals of light microscopy.* Cambridge University Press, Cambridge, 1982.
61. Staessen, C., Janssenswillen, C., Van den Abeel, E., Devroey, P., Van Steirteghem, A. Avoidance of triplet pregnancies by elective transfer of two good quality embryos. *Hum. Reprod.,* 8: 1650-1653, 1993.
62. Steptoe, P., Edwards, R., Purdy, J. Clinical aspects of pregnancies established with cleaving embryos grown in vitro. *Br. J. Obstet. Gynaecol.,* 87: 757-768, 1980.
63. B. Strömberg, G. Dahlquist, A. Ericson, O. Finnström, M. Köster, K. Stjernqvist, "Neurological sequelae in children born after in-vitro fertilisation: a population-based study," *Lancet,* 359, pp. 461-465, 2002.
64. Templeton, A., Morris, J. Reducing the risk of multiple births by transfer of two embryos after in vitro fertilization. *N. Engl. J. Med.,* 339: 573-577, 1998.
65. Townsend, D. J., Quarles, K. D., Thomas, A. L., Rockward, W. S., Warner, C. M., Newmark, J. A., DiMarzio, C. A. Quantitative phase measurements using an optical quadrature microscope. *Three-Dimensional and Multidimensional Microscopy: Image Acquisition and Processing X,* SPIE Proceedings, 4964: 59-65, 2003.
66. Tsai, C., Warger, W., DiMarzio, C. Accurate Image Registration for Quadrature Tomographic Microscope. *MICCAI Proceedings,* to be published 2005.
67. Van Royen, E., Mangelschots, K., De Neubourg, D., Valkenburg, M., Van de Meerssche, M., Ryckaert, G., Eestermans, W., Gerris, J. Characterization of a top quality embryo, a step towards single embryo transfer. *Hum. Reprod.,* 14: 2345-2349, 1999.
68. Veeck, L., Zaninović, N. *An Atlas of HUMAN BLASTOCYTS.* The Parthenon Publishing Group, New York, 2003.
69. Verlinsky, Y. Is there any predictive value of first polar body morphology for embryo genotype or developmental potential? *Reproductive BioMedicine Online,* 7(3): 336-341.
70. Wakayama, T., Yanagimachi, R. The First Polar Body Can Be Used for the Production of Normal Offspring in Mice. *Biology of Reproduction,* 59: 100-104, 1998.
71. Warger II, W. C., Newmark, J. A., Chang, C., Brooks, D. H., Warner, C. M., DiMarzio, C. A. Optical quadrature and differential interference contrast to facilitate embryonic cell counts with fluorescence imaging for confirmation. *Imaging, Manipulation, and Analysis of Biomolecules and Cells: Fundamentals and Applications III,* SPIE Proceedings, 5699: 334-341, 2005.
72. Winger, Q. A., Hill, J. R., Watson, A. J., Westhusin, M. E., Characterization of a Bovine cDNA Encoding Citrate Synthase, and Presence of Citrate Synthase mRNA During Bovine Pre-Attachment Development. *Molecular Reproduction and Development,* 55: 14-19, 2000.
73. Xia, P. Intracytoplasmic sperm injection: correlation of oocyte grade based on polar body, perivitelline space and cytoplasmic inclusions with fertilization rate and embryo quality. *Human Reproduction.* 12(8): 1750-1755, 1997.
74. Ziebe, S., Petersen, K., Lindenberg, S., Andersen, A.-G., Gabrielsen, A., Nyboe Andersen, A. Embryo morphology or cleavage stage: how to select the best embryos for transfer after in-vitro fertilization. *Human Reproduction,* 12(7): 1545-1549, 1997.

The invention claimed is:

1. A method of counting a cluster of unstained cells, comprising the steps of:
(a) providing a microscope capable of first and second imaging modalities, wherein the first imaging modality is a full-field phase imaging technique and the second imaging modality provides cell boundary information for the unstained cell cluster;
(b) obtaining a first image of the cell cluster, the image including biological material surrounding the cell cluster and a culture medium in which the cell cluster is suspended, using the first imaging modality and a second image of the cell cluster using the second imaging modality, wherein the first image is an image of optical path length deviation (OPD);
(c) fitting an ellipse to the boundary of a cell in the second image;
(d) determining the maximum optical path length deviation of the cell in the first image and determining the minimum optical path length deviation of the cell as the optical path length deviation of the biological material surrounding the cluster of cells plus the optical path length deviation of the culture medium in which the cell cluster is suspended in the first image, and calculating the total optical path length deviation of the cell as the maximum optical path length deviation of the cell minus the minimum optical path length deviation of the cell;
(e) combining the ellipse with the total optical path length deviation to produce an ellipsoidal model cell of optical path length deviation;
(f) subtracting the model cell from the OPD image to obtain a subtracted OPD image; and
(g) repeating steps (c), (e), and (f), wherein for each repetition of step (f) the model cell is subtracted from the previous subtracted OPD image, until model cells corresponding to all cell boundaries detectable in the second image have been subtracted from the OPD image;
wherein the cell count for the cell cluster is the total number of model cells subtracted in step (f).

2. The method of claim 1, wherein the first imaging modality is selected from the group consisting of optical quadrature microscopy (OQM), polarization interferometry, digital holography, Fourier phase microscopy, Hilbert phase microscopy, and quantitative phase microscopy.

3. The method of claim 1, wherein the second imaging modality is selected from the group consisting of differential interference contrast microscopy (DIC), Hoffman interference contrast microscopy, and brightfield microscopy.

4. The method of claim 1, wherein the first imaging modality is OQM and the second imaging modality is DIC.

5. The method of claim 1, wherein the cell cluster is an embryo.

6. The method of claim 5, wherein the embryo has a cell number in the range of 2-30 cells.

7. The method of claim 5, wherein the embryo has a cell number in the range of 8-26 cells.

8. The method of claim 5, wherein the embryo is mammalian.

9. The method of claim 5, wherein the embryo is human.

10. The method of claim 1, wherein the cell cluster comprises living cells.

11. The method of claim 1, wherein the cell cluster comprises stem cells or differentiated stem cells.

12. The method of claim 1, further comprising the step of:
(b1) performing image registration of the first and second images from step (b) by selecting a plurality of landmarks in one image, selecting a plurality of matching landmarks in the other image, and applying an image registration algorithm, whereby corresponding landmarks in the first and second images are matched to create a single coordinate system for both images.

13. The method of claim 12, wherein the image registration algorithm is based on a transformation model selected from the group consisting of linear conformal, affine, projective, polynomial, piecewise linear, and locally weighted mean models.

14. The method of claim 12, wherein the landmarks and matching landmarks are identified by the operator.

15. The method of claim 12, wherein an automatic edge detection algorithm is applied to both images, and then the plurality of landmarks and matching landmarks are identified using a feature extraction algorithm.

16. The method of claim 1, wherein less than 50% of the image of the cell in step (c) overlaps with the image of another cell in the cell cluster.

17. The method of claim 1, wherein the cell in step (c) is selected by the operator.

18. The method of claim 1, wherein the cell in step (c) is automatically identified by:
(c1) applying an edge detection algorithm to locate the perimeter of the cell cluster;
(c2) estimating the centroid of the perimeter;
(c3) determining the distance from the perimeter to the centroid at each point along the perimeter;
(c4) selecting the minima from (c3) to represent the intersection points between cell boundaries;
(c5) estimating the center of each cell along the boundary of each cell;
(c6) plotting for each cell the image intensity along a line extending from outside the cell boundary through the estimated cell center;
(c7) fitting a parabola to each plot; and
(c8) fitting an ellipse to the boundary of the cell with the best parabolic fit in (c7).

19. The method of claim 1, wherein the step of fitting an ellipse to the cell boundary in (c) comprises selection by an operator of a plurality of points along the cell boundary, an estimated center, a major axis, and a minor axis.

20. The method of claim 1, wherein the cell boundary in (c) is identified automatically by edge detection.

21. The method of claim 1, wherein the ellipse is fitted in (c) by a least squares analysis.

22. The method of claim 1, wherein the ellipse is fitted in (c) by a spline fit to identified boundary segments.

23. The method of claim 1, wherein the ellipse in (c) is a circle, a truncated ellipse, or a flattened ellipse.

24. The method of claim 1, wherein the step of determining the total optical path length deviation of the cell in (d) comprises:
(d1) plotting the phase values along a line from the culture medium outside the cell boundary through the center of the cell;
(d2) fitting a parabola to the plotted values from (d1);
(d3) selecting a minimum phase value corresponding to the biological material surrounding the cell cluster plus the culture medium in which the cell cluster is suspended;
(d4) subtracting the minimum phase value from the maximum of the parabolic fit to obtain the total optical path length deviation of the cell.

25. The method of claim 24, wherein the step of fitting a parabola comprises a least squares analysis.

26. The method of claim 24, wherein the cluster of cells is an embryo and the biological material surrounding the cluster of cells is zona pellucida.

27. The method of claim 1, wherein the step of determining the ellipsoidal model cell in (e) comprises fitting the cell boundary and total optical path length deviation to an equation of an ellipsoid selected from the group consisting of a sphere, a perfect ellipsoid, a parabolic ellipsoid, and a flattened ellipsoid.

28. The method of claim 1, wherein in the instance when no further cell boundaries are detected in the second image, the following steps are performed:
(h) fitting an ellipse to the boundary of a cell in the subtracted OPD image;
(i) producing an ellipsoidal model cell of the cell;
(j) subtracting the ellipsoidal model cell from the subtracted OPD image to obtain a new subtracted OPD image; and
(k) repeating steps (h)-(j) until no further cell boundaries can be detected in the subtracted OPD image,
wherein the cell count for the cell cluster is the total number of model cells subtracted in step (f) plus the total number of model cells subtracted in step (j).

29. The method of claim 28, wherein the step of fitting an ellipse to the boundary of a cell in (h) comprises blob detection.

30. The method of claim 29, wherein the total cell count is reached when blob detection fails to detect at least a preset threshold value of phase.

31. The method of claim 28, wherein the step of fitting an ellipse to the boundary of a cell in (h) comprises edge detection.

32. The method of claim 1, wherein the OPD image is obtained using a HeNe laser with emission at 632.8 nm as the illumination source.

33. The method of claim 1, wherein determining the maximum optical path length deviation and calculating the total optical path length deviation as described in step (d) are repeated for each cell identified in step (c).

34. The method of claim 1, further comprising detecting one or more polar bodies or cell fragments in the cell cluster.

* * * * *